US012165589B2

(12) United States Patent
Guo et al.

(10) Patent No.: US 12,165,589 B2
(45) Date of Patent: Dec. 10, 2024

(54) PIXEL DRIVING CIRCUIT AND DISPLAY PANEL

(71) Applicant: YUNGU (GU'AN) TECHNOLOGY CO., LTD., Hebei (CN)

(72) Inventors: Enqing Guo, Hebei (CN); Cuili Gai, Hebei (CN); Kangguan Pan, Hebei (CN); Junfeng Li, Hebei (CN); Rubo Xing, Hebei (CN); Fa-Hsyang Chen, Hebei (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 18/350,227

(22) Filed: Jul. 11, 2023

(65) Prior Publication Data

US 2023/0351966 A1 Nov. 2, 2023

Related U.S. Application Data

(63) Continuation of application No. PCT/CN2022/101978, filed on Jun. 28, 2022.

(30) Foreign Application Priority Data

Jun. 30, 2021 (CN) ......................... 202110738517.0
Nov. 25, 2021 (CN) ......................... 202111415701.8
Dec. 7, 2021 (CN) ......................... 202111485817.9

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01);
(Continued)

(58) Field of Classification Search
CPC ............... G09G 3/3233; G09G 3/3266; G09G 2300/0426; G09G 2300/0819;
(Continued)

(56) References Cited

U.S. PATENT DOCUMENTS

2015/0009108 A1* 1/2015 Song .................... G09G 3/3225 345/80
2015/0269885 A1 9/2015 Ma
(Continued)

FOREIGN PATENT DOCUMENTS

CN 106531074 A 3/2017
CN 109087610 A 12/2018
(Continued)

OTHER PUBLICATIONS

International Search Report mailed on Sep. 2, 2022, in corresponding International Application No. PCT/CN2022/101978, 6 pages.
(Continued)

*Primary Examiner* — Brent D Castiaux
(74) *Attorney, Agent, or Firm* — Maier & Maier, PLLC

(57) ABSTRACT

A pixel circuit, a driving method, and a display panel. The pixel circuit includes a driving module, a data write module, a first compensation module, a second compensation module, a light-emitting module, a storage module, and a coupling module. The data write module is configured to write a voltage related to a data voltage to a control terminal of the driving module. The driving module is configured to provide a drive signal for the light-emitting module according to the voltage of the control terminal to drive the light-emitting module to emit light. A first terminal of the second compensation module is connected to the control terminal of the driving module, a second terminal of the second compensation module is connected to a first terminal of the first compensation module, and a second terminal of the first
(Continued)

compensation module is connected to a first terminal of the driving module.

20 Claims, 39 Drawing Sheets

(52) U.S. Cl.
CPC ............... *G09G 2300/0819* (2013.01); *G09G 2300/0852* (2013.01); *G09G 2310/08* (2013.01); *G09G 2320/0233* (2013.01); *G09G 2320/0247* (2013.01); *G09G 2340/0435* (2013.01)

(58) Field of Classification Search
CPC ... G09G 2300/0852; G09G 2300/0809; G09G 2310/08; G09G 2310/06; G09G 2320/0233; G09G 2320/0247; G09G 2320/0214; G09G 2320/045; G09G 2340/0435
See application file for complete search history.

(56) References Cited

U.S. PATENT DOCUMENTS

| | | | | |
|---|---|---|---|---|
| 2018/0144684 | A1 | 5/2018 | Jeon et al. | |
| 2018/0151123 | A1 | 5/2018 | Li et al. | |
| 2019/0164491 | A1* | 5/2019 | Kim | H10K 59/131 |
| 2021/0319747 | A1* | 10/2021 | Jeon | G09G 3/3233 |

FOREIGN PATENT DOCUMENTS

| | | | |
|---|---|---|---|
| CN | 106875893 | B | 3/2019 |
| CN | 110277060 | A | 9/2019 |
| CN | 110895915 | A | 3/2020 |
| CN | 111383600 | A | 7/2020 |
| CN | 111445848 | A | 7/2020 |
| CN | 111508422 | A | 8/2020 |
| CN | 111710296 | A | 9/2020 |
| CN | 111724745 | A | 9/2020 |
| CN | 111883044 | A | 11/2020 |
| CN | 110767163 | B | 1/2021 |
| CN | 112164361 | A | 1/2021 |
| CN | 112289267 | A | 1/2021 |
| CN | 112382235 | A | 2/2021 |
| CN | 112397025 | A | 2/2021 |
| CN | 112397028 | A | 2/2021 |
| CN | 112419982 | A | 2/2021 |
| CN | 112466255 | A | 3/2021 |
| CN | 112509518 | A | 3/2021 |
| CN | 212724668 | U | 3/2021 |
| CN | 112639951 | A | 4/2021 |
| CN | 112735314 | A | 4/2021 |
| CN | 112820242 | A | 5/2021 |
| CN | 112885304 | A | 6/2021 |
| CN | 112908265 | A | 6/2021 |
| CN | 112992055 | A | 6/2021 |
| CN | 113140179 | A | 7/2021 |
| CN | 113192460 | A | 7/2021 |
| CN | 113223458 | A | 8/2021 |
| CN | 113284454 | A | 8/2021 |
| CN | 113314073 | A | 8/2021 |
| CN | 113314074 | A | 8/2021 |
| CN | 113362765 | A | 9/2021 |
| CN | 113516951 | A | 10/2021 |
| CN | 114023260 | A | 2/2022 |
| CN | 216119516 | U | 3/2022 |
| CN | 216450366 | U | 5/2022 |
| CN | 216928002 | U | 7/2022 |
| KR | 1020200015862 | A | 2/2020 |
| WO | 2020233024 | A1 | 11/2020 |

OTHER PUBLICATIONS

International Search Report mailed on Aug. 12, 2022, in corresponding International Application No. PCT/CN2022/101912, 6 pages.
International Search Report mailed on Sep. 16, 2022, in corresponding International Application No. PCT/CN2022/101979, 4 pages.
Office Action issued on Nov. 2, 2022, in corresponding Chinese Application No. 202111415701.8, 16 pages (partial English translation provided).
Office Action issued on Jan. 12, 2023 in corresponding Chinese Application No. 202111415101.8, 8 pages (partial English translation provided).
Office Action issued on Jun. 28, 2024 in corresponding Korean Application No. 10-2023-7023471, 14 pages.
Extended Search Report issued on Jul. 5, 2024, in corresponding European Application No. 22832054.5, 12 pages.
Search Report issued on Aug. 12, 2024, in corresponding Chinese Application No. 202110738517.0, 8 pages.
Office Action issued on Aug. 14, 2024, in corresponding Chinese Application No. 202110738517.0, 24 pages.
Office Action issued on Jun. 26, 2024 in corresponding Korean Application No. 10-2023-7021808, 13 pages.
Office Action issued on Aug. 23, 2024, in corresponding Chinese Application No. 202111485817.9, 21 pages.
Search Report issued on Aug. 20, 2024, in corresponding Chinese Application No. 2021114858179, 8 pages.

* cited by examiner

PIXEL DRIVING CIRCUIT AND DISPLAY PANEL

CROSS-REFERENCE TO RELATED APPLICATION

This is a continuation of International Patent Application NO. PCT/CN2022/101978, filed on Jun. 28, 2022, which claims Chinese Patent Application No. 202111415701.8 filed with the China National Intellectual Property Administration (CNIPA) on Nov. 25, 2021, Chinese Patent Application No. 202110738517.0 filed with the CNIPA on Jun. 30, 2021, Chinese Patent Application No. 202111485817.9 filed with the CNIPA on Dec. 7, 2021, the disclosures of which are incorporated herein by reference in their entireties.

TECHNICAL FIELD

The present disclosure relates to the field of display technologies, for example, a pixel driving circuit and a display panel.

BACKGROUND

A pixel driving circuit in a display panel can emit light in a corresponding grayscale according to a data signal, making the display panel display a specific image and having a significant application in the display panel. With the development of display technologies, the application of the display panel is becoming increasingly widespread. Correspondingly, the requirements for the display quality of the display panels are getting higher and higher, and the requirements for the pixel driving circuit are also getting higher and higher.

However, the existing pixel driving circuit has the problem of substandard flicker at a low frequency.

SUMMARY

The present disclosure provides a pixel driving circuit to improve the flicker phenomenon of the pixel driving circuit.

In a first aspect, an embodiment of the present disclosure provides a pixel driving circuit. The pixel driving circuit includes a driving module, a light-emitting module, a data write module, a threshold compensation module, a storage module, a first initialization module, a first holding module, and a first blocking module.

The driving module is configured to generate a drive current.

The light-emitting module is configured to emit light in response to the drive current.

The data write module is configured to write a voltage corresponding to a data signal to a control terminal of the driving module in a charging stage.

The threshold compensation module is configured to compensate for a threshold voltage of the driving module in the charging stage and connected between an anti-leakage node and the control terminal of the driving module.

The storage module is configured to maintain the potential of the control terminal of the driving module.

The first initialization module is configured to initialize the control terminal of the driving module in an initialization stage and connected between an initialization signal input terminal and the anti-leakage node.

The first holding module is configured to hold the potential of the anti-leakage node.

The first blocking module is configured to block a conduction path between the anti-leakage node and the light-emitting module in a light-emitting stage.

In a second aspect, an embodiment of the present disclosure provides a pixel driving circuit. The pixel driving circuit includes a driving module, a light-emitting module, a data write module, a threshold compensation module, a storage module, a first initialization module, and a first holding module.

The driving module is configured to generate a drive current.

The light-emitting module is configured to emit light in response to the drive current.

The data write module is configured to write a voltage corresponding to a data signal to a control terminal of the driving module in a charging stage.

The threshold compensation module is configured to compensate for a threshold voltage of the driving module in the charging stage. A first terminal of the threshold compensation module is connected to the control terminal of the driving module.

The storage module is configured to maintain the potential of the control terminal of the driving module.

The first initialization module is configured to initialize the control terminal of the driving module in an initialization stage and connected to an initialization signal input terminal.

The first holding module is configured to hold the potential of an anti-leakage node.

The threshold compensation module is a double-gate transistor, the anti-leakage node is a double-gate node of the threshold compensation module, and the first initialization module is electrically connected to a second terminal of the threshold compensation module.

In a third aspect, an embodiment of the present disclosure also provides a display panel. The display panel includes the pixel driving circuit of any one of the embodiments of the present disclosure.

In solutions of the embodiments of the present disclosure, the adopted pixel driving circuit includes: the driving module configured to generate the drive current; the light-emitting module configured to emit light in response to the drive current; the data write module configured to write the data signal to the control terminal of the driving module in the charging stage; the threshold compensation module configured to grasp the threshold voltage of the driving module to the control terminal of the driving module in the charging stage; the storage module configured to maintain the potential of the control terminal of the driving module; the first initialization module configured to initialize the control terminal of the driving module in the initialization stage; the anti-leakage node, where the threshold compensation module is connected between the anti-leakage node and the control terminal of the driving module, and the first initialization module is connected between the initialization signal input terminal and the anti-leakage node; the first holding module configured to hold the potential of the anti-leakage node; and the first blocking module configured to block the conduction path between the anti-leakage node and the light-emitting module in the light-emitting stage. In the light-emitting stage, only one leakage path is set at the control terminal of the driving module so that the leakage current can be greatly reduced. Moreover, the first holding module can stabilize the potential of the anti-leakage node, i.e. the potential difference between the anti-leakage node and the control terminal of the driving module, preventing the leakage current from increasing, i.e. improving the leakage phenomenon, thereby improving the flicker phenomenon of the pixel driving circuit.

DETAILED DESCRIPTION

As described in BACKGROUND, a pixel circuit has the problem of poor brightness uniformity in a low grayscale. In the existing art, the pixel circuit in a 7T1C structure is generally used for compensating for a threshold voltage of a driving module (a drive transistor). When a compensation module is turned on, a data voltage related to the threshold voltage of the driving module is written to a storage capacitor. Therefore, the capacitor stores threshold voltage information of the driving module. However, due to the short row-scanning time corresponding to the compensation module, the error of the threshold voltage information stored in the capacitor is relatively large so that the threshold voltage of the driving module cannot be completely compensated. Moreover, in the working process of the pixel circuit, a subthreshold swing (SS) of the driving module fluctuates, causing drive currents generated by different driving modules in the same grayscale to be inconsistent, making unsatisfactory compensation effects, thereby resulting in poor brightness uniformity when the pixel circuit displays in a low grayscale.

Figure 1:
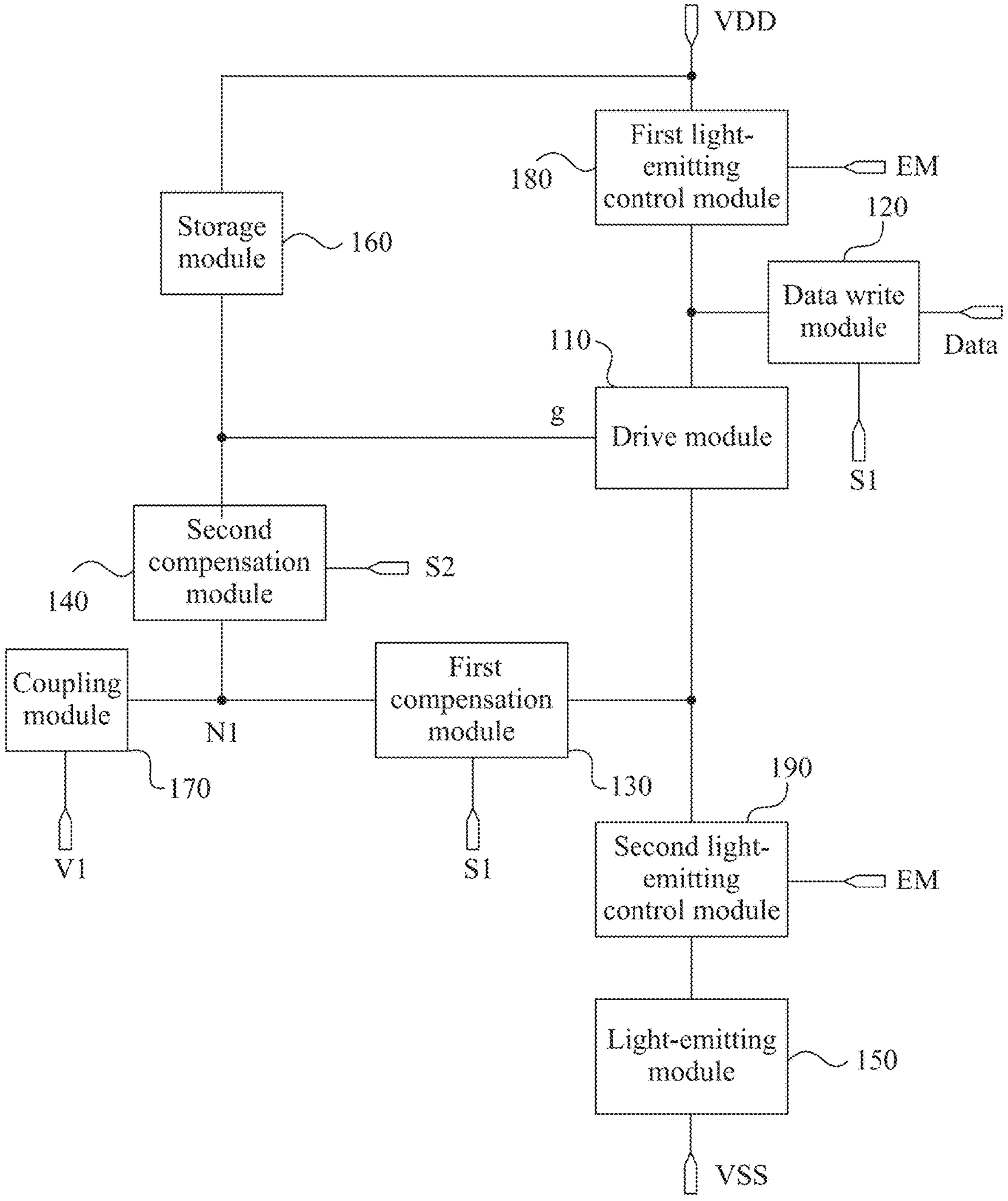
FIG. 1 is a structure diagram of a pixel circuit according to an embodiment of the present disclosure.

For the preceding problems, embodiments of the present disclosure provide a pixel circuit to improve the display brightness uniformity and the display effect. FIG. 1 is a structure diagram of a pixel circuit according to an embodiment of the present disclosure. Referring to FIG. 1, the pixel circuit provided by the embodiment of the present disclosure includes: a driving module 110, a data write module 120, a first compensation module 130, a second compensation module 140, a light-emitting module 150, a storage module 160, and a coupling module 170. The data write module 120 is configured to write a voltage related to a data voltage to a control terminal g of the driving module 110. The control terminal g of the driving module 110 is configured to provide a drive signal for the light-emitting module 150 according to the voltage of the control terminal g to drive the light-emitting module 150 to emit light.

A first terminal of the second compensation module 140 is connected to the control terminal g of the driving module 110. A second terminal of the second compensation module 140 is connected to a first terminal of the first compensation module 130. A second terminal of the first compensation module 130 is connected to a first terminal of the driving module 110. The first compensation module 130 is configured to perform threshold compensation for the driving module 110. The storage module 160 is configured to store the voltage of the control terminal g of the driving module 110. The coupling module 170 is configured to couple a jump voltage V1 to at least one of the second terminal of the second compensation module 170 or an inner node of the second compensation module 170.

Exemplarily, the first compensation module 130 and the second compensation module 140 are connected in sequence between the control terminal g of the driving module 110 and the first terminal of the driving module 110. The coupling module 170 is connected to one end of the first compensation module 130 connected to the second compensation module 140. The coupling module 170 is configured to couple the jump voltage V1 to at least one of the second terminal of the second compensation module 140 or the inner node of the second compensation module 140 after the first compensation module 130 compensates for a threshold of the control terminal g of the driving module 110, thereby playing a role of finely tuning the voltage of the control terminal g of the driving module 110. The data write module 120 may be connected to a second terminal of the driving module 110. The data write module 120 is configured to write the voltage related to the data voltage on a data line Data to the control terminal g of the driving module 110, and the storage module 160 stores a voltage related to the threshold of the driving module 110.

In this embodiment, the pixel circuit may include at least a data write and threshold compensation stage, a compensation adjustment stage, and a light-emitting stage during the display of one frame. In the data write and threshold compensation stage, the data write module 120, the first compensation module 130, and the second compensation module 140 are on. The data voltage on the data line Data is written to the control terminal g of the driving module 110 through the data write module 120, the driving module 110, the first compensation module 130, and the second compensation module 140. A threshold voltage of the control terminal g of the driving module 110 is compensated through the first compensation module 130.

In the compensation adjustment stage, the coupling module 170 couples the jump voltage V1 to at least one of the second terminal of the second compensation module 140 or the inner node of the second compensation module 140 to change a potential of the at least one of the second terminal of the second compensation module 140 or the inner node of the second compensation module 140, thereby finely tuning the voltage of the control terminal g of the driving module 110. Exemplarily, in the compensation process, the compensated voltage of the control terminal g of the driving module 110 should be Vdata+Vth, where Vdata is the data voltage on the data line Data, and Vth is the threshold voltage of the driving module 110. However, due to short conduction time of the first compensation module 130, the voltage of the control terminal g of the driving module 110 is not equal to Vdata+Vth. Moreover, due to the subthreshold swing problem of the driving module 110, a relatively large error exists between the voltage of the control terminal g of the driving module 110 and Vdata+Vth after the data write and threshold compensation stage ends, causing drive currents generated by different driving modules 110 in the same grayscale to be different. In the low grayscale, since the data voltage Vdata is relatively low, a tiny error can cause a relatively large change in the drive current. The voltage of the control terminal g of the driving module 110 is finely adjusted in the compensation adjustment stage to ensure that the drive current generated by the respective driving module 110 according to the voltage of the control terminal g of the respective driving module 110 in the light-emitting stage is consistent, improving the display brightness uniformity, and thereby improving the display effect.

In the pixel circuit provided by the embodiment of the present disclosure, after the threshold voltage of the driving module is compensated, the jump voltage is coupled by the coupling module to at least one of the second terminal of the second compensation module or the inner node of the second compensation module to change the potential of the at least one of the second terminal of the second compensation module or the inner node of the second compensation module. Since the second compensation module is connected to the control terminal of the driving module, when the potential of the second terminal of the second compensation module or the potential of the inner node of the second compensation module changes, the potential of the control terminal of the driving module can be finely adjusted to improve the threshold compensation effect. Therefore, in the low grayscale, it is ensured that under the action of the voltage of the control terminal of the driving module finely adjusted, the drive currents generated by different driving modules in the same grayscale voltage are the same, making the brightness of the light-emitting modules the same, thereby improving the brightness uniformity, and facilitating improving the display effect. Even if the drive frequency changes, good compensation effect can also be achieved through reasonably level coupling.

Optionally, in this embodiment, the jump voltage V1 jumps after the second compensation module 140 is turned off. In other words, after the threshold compensation for the driving module 110 is completed through the first compensation module 130 and the second compensation module 140 in the pixel circuit, the second compensation module 140 is turned off. In this case, the jump voltage V1 jumps from a high level to a low level or from a low level to a high level (which may be set according to the actual situation). Since the potential of the first terminal of the coupling module 170 changes, the coupling of the coupling module 170 is triggered, the voltage change amount of the first terminal of the coupling module 170 is coupled to a second terminal of the coupling module 170. That is, the potential of a first node N1 is coupled by the coupling module 170. Therefore, the voltage of the control terminal g of the driving module 110 can be finely adjusted to improve the threshold compensation effect.

Figure 2:
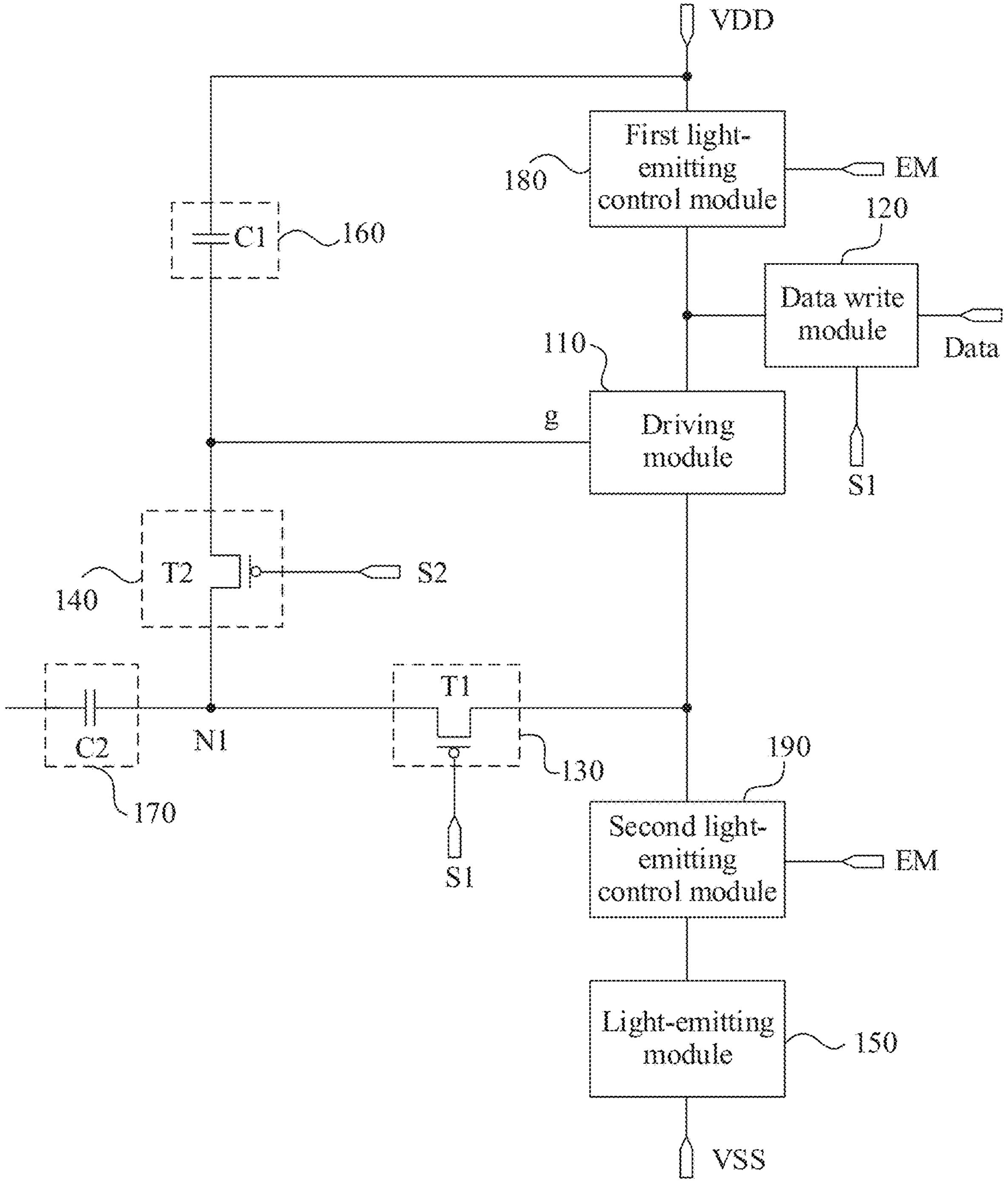
FIG. 2 is a structure diagram of another pixel circuit according to an embodiment of the present disclosure.

Optionally, FIG. 2 is a structure diagram of another pixel circuit according to an embodiment of the present disclosure. Referring to FIG. 2, on the basis of the preceding solutions, the first compensation module 130 includes a first transistor T1. The second compensation module 140 includes a second transistor T2. The storage module 160 includes a first capacitor C1. The coupling module 170 includes a second capacitor C2. A gate of the first transistor T1 is connected to a first scan line S1. A first electrode of the first transistor T1 is connected to the first terminal of the driving module 110. A second electrode of the first transistor T1 is connected to a second electrode of the second transistor T2. A first electrode of the second transistor T2 is connected to the control terminal g of the driving module 110. The gate of the second transistor T2 is connected to a second scan line S2. A first electrode of the first capacitor C1 is connected to a fixed voltage. A second electrode of the first capacitor C1 is connected to the control terminal g of the driving module 110. A first electrode of the second capacitor C2 is connected to a pulse voltage. A second electrode of the second capacitor C2 is connected to the second electrode of the second transistor T2.

Exemplarily, the first capacitor C1 is connected between the fixed voltage and the control terminal g of the driving module 110. The first capacitor C1 is configured to store the voltage of the control terminal g of the driving module 110. The fixed voltage may be a first power-supply voltage VDD provided by a first power-supply line, or an external voltage. In the data write and threshold compensation stage, the data write module 120 and the first transistor T1 are turned on in response to a scan signal on the first scan line S1. The second transistor T2 is turned on in response to a scan signal on the second scan line S2. The data voltage on the data line Data is written to the control terminal g of the driving module 110 through the data write module 120, the driving module 110, the first transistor T1, and the second transistor T2. Then, the data write module 120 and the first transistor T1 are turned off in response to the scan signal on the first scan line S1. After the second transistor T2 is turned off in response to the scan signal on the second scan line S2, a pulse voltage of a first electrode of the second capacitor C2 jumps, and a potential of the first node N1 changes. Since the second transistor T2 is in an OFF state, and the potential of the control terminal g of the driving module 110 is not equal to the potential of the first node N1, under the action of the leakage of the second transistor T2, the voltage of the control terminal g of the driving module 110 can be finely adjusted, so that for different pixel circuits, the drive currents generated by the driving modules 110 are consistent in the low grayscale, to compensate for insufficient threshold compensation for the driving module 110 in the data writing and threshold compensation stage, improving the compensation effect, and thereby facilitating improving the display brightness uniformity.

Table 1 shows the acquired brightness values of nine points within a panel using a 7T1C pixel circuit in 32 grayscales. Table 2 shows the acquired brightness values of the same nine points within a panel using the pixel circuit provided by the embodiments of the present disclosure in 32 grayscales.

TABLE 1

| | | | |
|---|---|---|---|
| Brightness value | 5.556 | 5.681 | 5.393 |
| | 5.803 | 5.829 | 5.694 |
| | 6.239 | 6.439 | 6.349 |
| Uniformity | | 83.76% | |

TABLE 2

| | | | |
|---|---|---|---|
| Brightness value | 5.525 | 5.563 | 5.425 |
| | 5.586 | 5.607 | 5.482 |
| | 5.671 | 5.768 | 5.664 |
| Uniformity | | 94.05% | |

According to the data in Table 1 and Table 2, it can be seen that the compensated voltage of the control terminal g of the driving module 110 is adjusted so that in the same grayscale, the panel brightness uniformity can be significantly improved, thereby improving the compensation effect.

In this embodiment, the jump voltage V1 is a pulse signal having the jump capability, i.e. a pulse voltage. After the second transistor T2 is turned off in response to the scan signal on the second scan line S2, the rising edge or the falling edge of the pulse voltage arrives, making the voltage of the first electrode of the second capacitor C2 jump.

Figure 3:
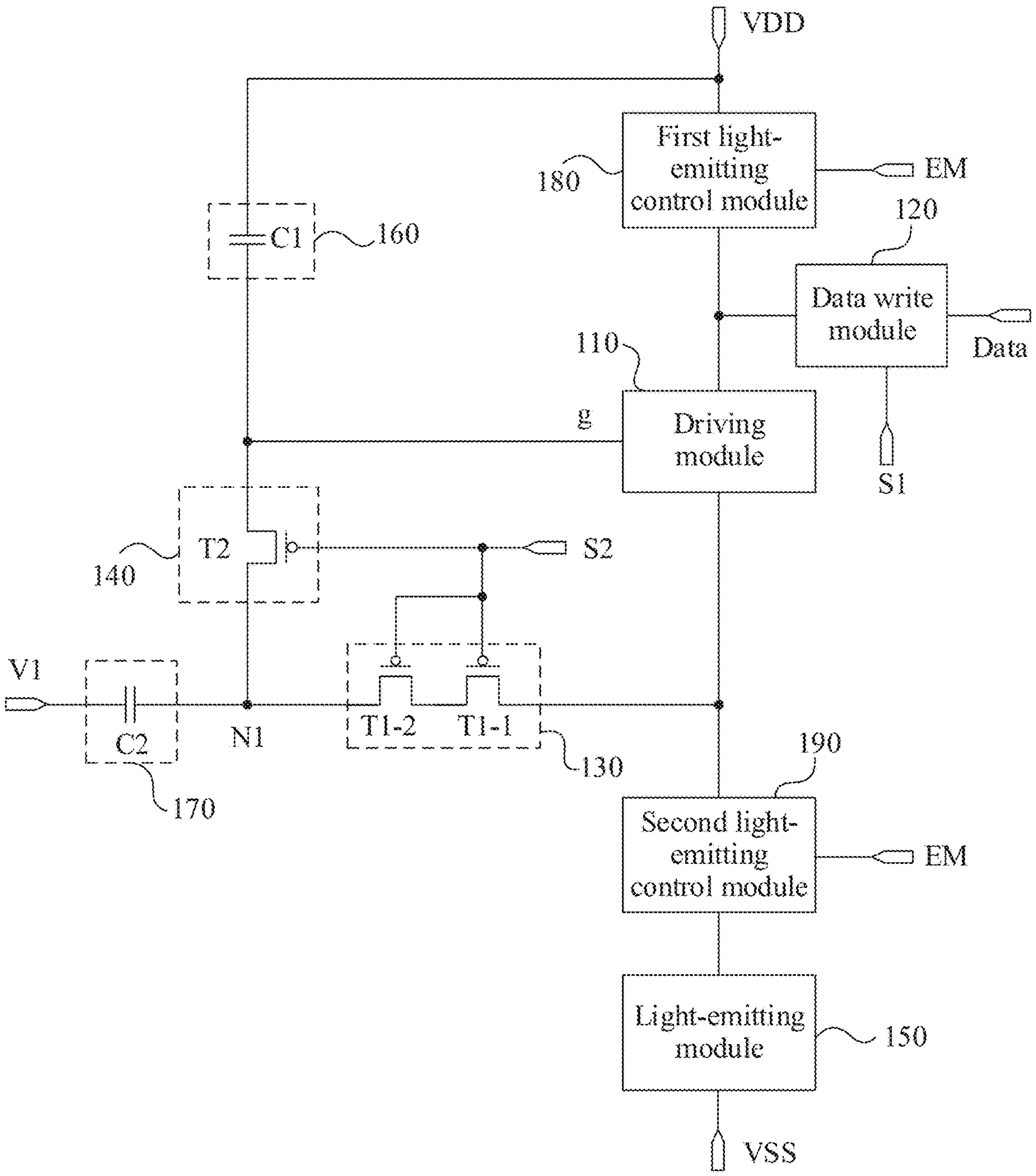
FIG. 3 is a structure diagram of another pixel circuit according to an embodiment of the present disclosure.

In the preceding solutions, the first compensation module 130 and the second compensation module 140 respond to different scan signals, and are not turned on at the same time. Apparently, the first compensation module 130 and the second compensation module 140 may also be connected to the same scan line to synchronize states of the first compensation module 130 and the second compensation module 140. FIG. 3 is a structure diagram of another pixel circuit according to an embodiment of the present disclosure. Referring to FIG. 3, the first compensation module 130 includes the first transistor T1. The second compensation module 140 includes the second transistor T2. The storage module 160 includes the first capacitor C1. The coupling module 170 includes the second capacitor C2. The gate of the first transistor T1 is connected to the second scan line S2. The first electrode of the first transistor T1 is connected to the first terminal of the driving module 110. The second electrode of the first transistor T1 is connected to the second electrode of the second transistor T2. The first electrode of the second transistor T2 is connected to the control terminal g of the driving module 110. The gate of the second transistor T2 is connected to the second scan line S2. The first electrode of the first capacitor C1 is connected to the fixed voltage. The second electrode of the first capacitor C1 is connected to the control terminal g of the driving module 110. The first electrode of the second capacitor C2 is connected to the pulse voltage. The second electrode of the second capacitor C2 is connected to the second electrode of the second transistor T2.

Exemplarily, in this embodiment, the first transistor T1 may be a double-gate transistor. In conjunction with FIG. 3, the first transistor T1 includes two sub-transistors T1-1 and T1-2. Gates of the two sub-transistors are short-circuited. The first transistor T1 is configured to be the double-gate transistor so that the leakage current of the first transistor T1 can be reduced after the first transistor T1 is turned off, so as to maintain the stability of the voltage of the control terminal g of the driving module 110, preventing a relatively large interference generated by adjusting the voltage of the control terminal g by the coupling module 170 and the second transistor T2. Moreover, the gates of the first transistor T1 and the second transistor T2 are connected to the same scan line (the second scan line S2) so that the first transistor T1 and the second transistor T2 are turned on or off at the same time. For the working process, reference can be made to the related description in the preceding solutions, and details are not repeated herein. Optionally, the short-circuited gates of the sub-transistors T1-1 and T1-2 of the first transistor T1 may be connected to the first scan line S1.

Figure 4:
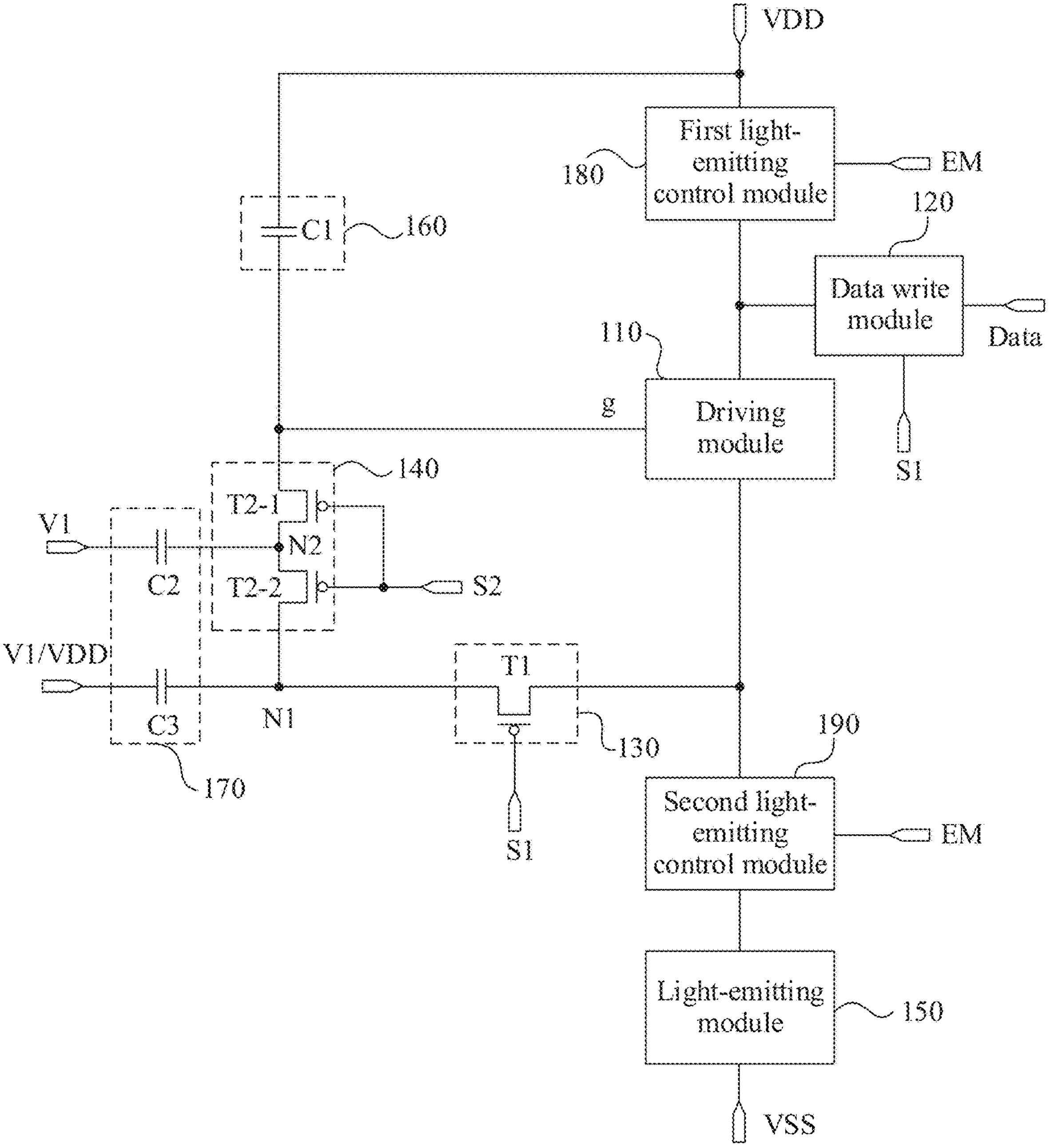
FIG. 4 is a structure diagram of another pixel circuit according to an embodiment of the present disclosure.

Optionally, FIG. 4 is a structure diagram of another pixel circuit according to an embodiment of the present disclosure. Referring to FIG. 4, the first compensation module 130 includes the first transistor T1. The second compensation module 140 includes the second transistor T2. The second transistor T2 is a double-gate transistor. The second transistor T2 includes a first sub-transistor T2-1 and a second sub-transistor T2-2. The first electrode of the first transistor T1 is connected to the first terminal of the driving module 110. The second electrode of the first transistor T1 is connected to a second electrode of the second sub-transistor T2-2. A first electrode of the second sub-transistor T2-2 is connected to a second electrode of the first sub-transistor T2-1. A first electrode of the first sub-transistor T2-1 is connected to the control terminal g of the driving module 110. The gate of the first transistor T1 is connected to the first scan line S1. The gate of the second transistor T2 is connected to the second scan line S2.

The coupling module 170 is configured to couple the jump voltage V1 to the second electrode of the first sub-transistor T2-1 or the second electrode of the second sub-transistor T2-2.

Exemplarily, the second transistor T2 is the double-gate transistor which has a relatively small leakage current so that in the low grayscale, the voltage of the control terminal g of the driving module 110 can be finely adjusted to improve the voltage adjustment accuracy. In this embodiment, the storage module 160 includes the first capacitor C1. The coupling module 170 includes the second capacitor C2 and a third capacitor C3. The first electrode of the first capacitor C1 is connected to the fixed voltage. The second electrode of the first capacitor C1 is connected to the control terminal g of the driving module 110. The first electrode of the second capacitor C2 is connected to the pulse voltage. The second electrode of the second capacitor C2 is connected to the second electrode of the first sub-transistor T2-1. A first electrode of the third capacitor C3 is connected to the pulse voltage. A second electrode of the third capacitor C3 is connected to the second electrode of the second sub-transistor T2-2. Since both the second capacitor C2 and the third capacitor C3 are connected to the pulse voltage, after the first sub-transistor T2-1 and the second sub-transistor T2-2 are turned off, the level of the pulse voltage jumps, the second capacitor C2 couples the voltage change amount of the jump voltage V1 to a second node N2, the third capacitor C3 couples the voltage change amount of the jump voltage V1 to the first node N1, and the potential of the second node N2 and the potential of the first node N1 are changed at the same timing to finely adjust the voltage of the control terminal g of the driving module 110.

Referring to FIG. 4, the first electrode of the third capacitor C3 may also be connected to the fixed voltage. For example, the first electrode of the third capacitor C3 is connected to the first power-supply voltage VDD provided by the first power-supply line. Apparently, in other embodiments, the fixed voltage may be another voltage having a stable value. Since the fixed voltage does not jump, the third capacitor C3 can maintain the stability of the potential of the first node N1, thereby reducing the leakage between the control terminal g of the driving module 110 and the second compensation module 140, facilitating finely tuning the voltage of the control terminal g of the driving module 110.

Figure 5:
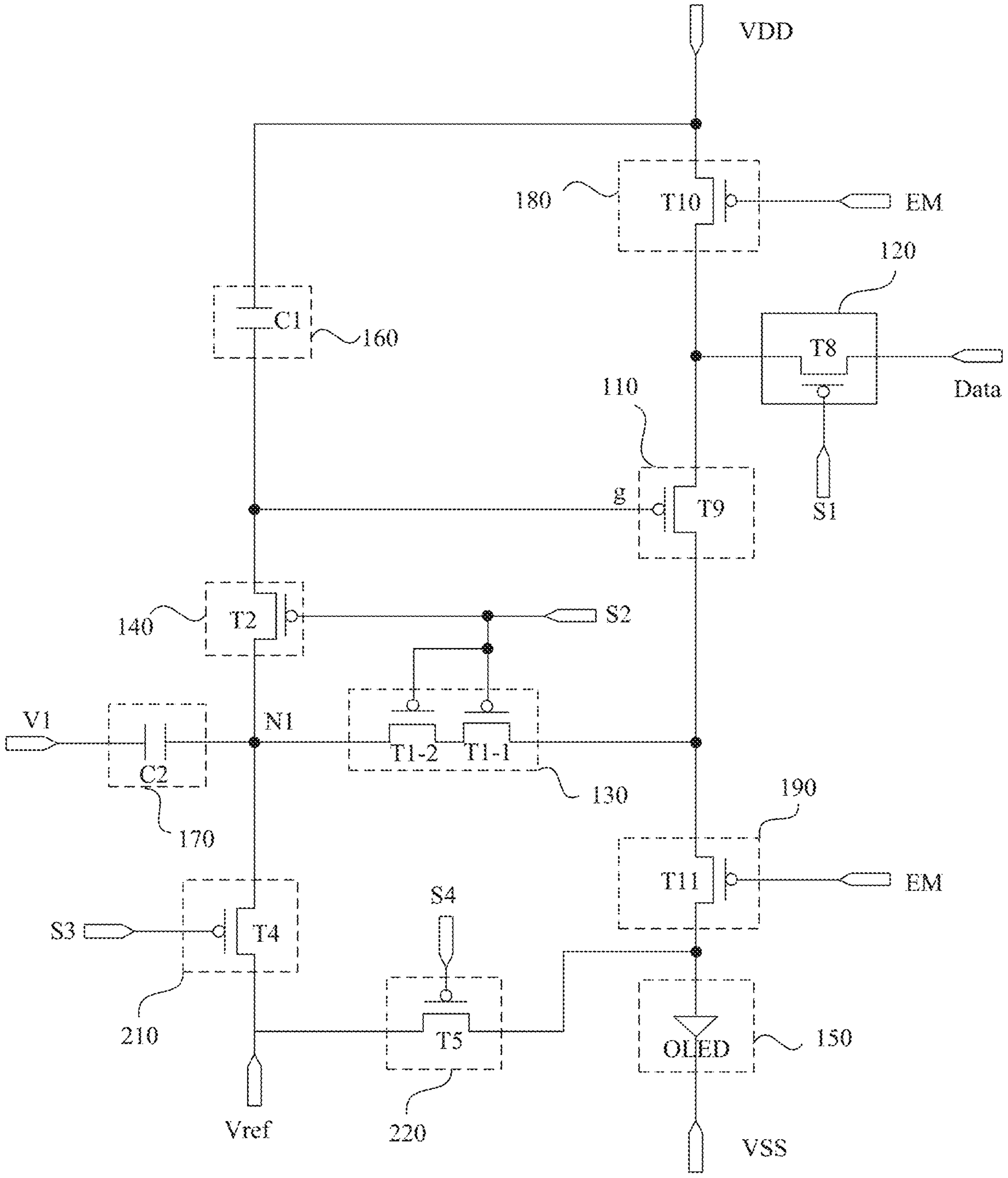
FIG. 5 is a structure diagram of another pixel circuit according to an embodiment of the present disclosure.

Optionally, FIG. 5 is a structure diagram of another pixel circuit according to an embodiment of the present disclosure. Referring to FIG. 5, on the basis of each of the preceding solutions, the pixel circuit further includes a first initialization module 210 and a second initialization module 220. The first initialization module 210 includes a fourth transistor T4. The second initialization module 220 includes a fifth transistor T5. A gate of the fourth transistor T4 is connected to a third scan line S3. A first electrode of the fourth transistor T4 is connected to an initialization signal line Vref. A second electrode of the fourth transistor T4 is connected to a second electrode of the second transistor T2. A gate of the fifth transistor T5 is connected to a fourth scan line S4. A first electrode of the fifth transistor T5 is connected to the initialization signal line Vref. A second electrode of the fifth transistor T5 is connected to a first terminal of the light-emitting module 150. Optionally, the fourth transistor T4 may be a double-gate transistor.

The pixel circuit provided by the embodiments of the present disclosure further includes a first light-emitting control module 180 and a second light-emitting control module 190. The data write module 120 includes an eighth transistor T8. The driving module 110 includes a ninth transistor T9. The first light-emitting control module 180 includes a tenth transistor T10. The second light-emitting control module 190 includes an eleventh transistor T11. A first electrode of the tenth transistor T10 is connected to a first power-supply line. A second electrode of the tenth transistor T10 is connected to a first electrode of the ninth transistor T9. A second electrode of the ninth transistor T9 is connected to the first terminal of the light-emitting module 150 through the eleventh transistor T11. A second terminal of the light-emitting module 150 is connected to a second power-supply line. Both the gate of the tenth transistor T10 and the gate of the eleventh transistor T11 are connected to light-emitting control signal lines EM.

Figure 6:
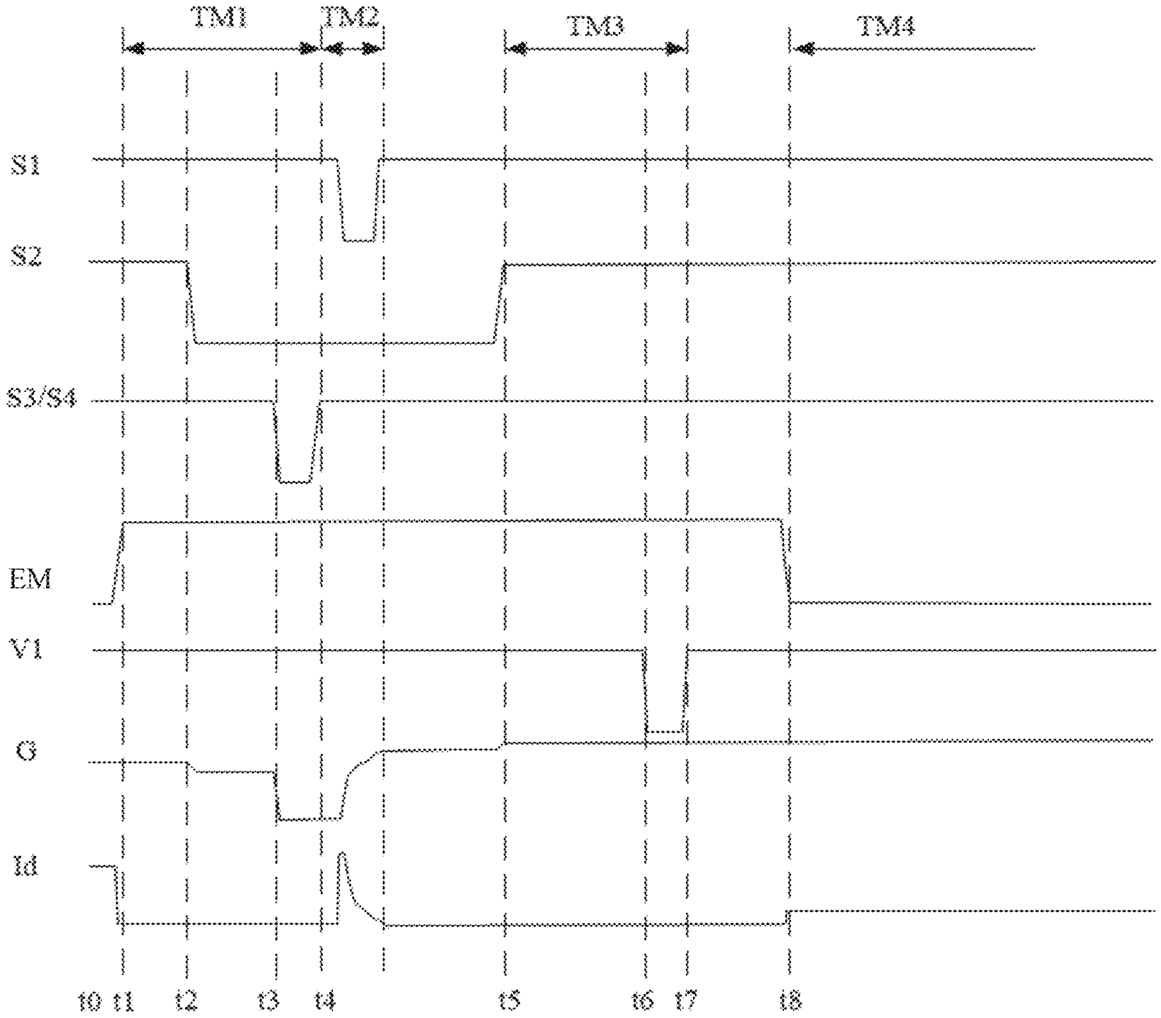
FIG. 6 is a control timing diagram of a pixel circuit according to an embodiment of the present disclosure.

FIG. 6 is a control timing diagram of a pixel circuit according to an embodiment of the present disclosure, which may be applicable to the pixel circuit shown in FIG. 5. This embodiment, exemplarily, shows that the first transistor T1, the second transistor T2, the fourth transistor T4, the fifth transistor T5, the eighth transistor T8, the ninth transistor T9, the tenth transistor T10, and the eleventh transistor T11 are all P-type transistors. Referring to FIGS. 5 and 6, the working process of the pixel circuit provided by the embodiments of the present disclosure may include an initialization stage TM1, a data write and threshold compensation stage TM2, a compensation adjustment stage TM3, and a light-emitting stage TM4. For ease of description, the initialization signal line and an initialization voltage provided by the initialization signal line are represented by the same marker, the scan line and a scan signal provided by the scan line are represented by the same marker, and the light-emitting control signal line and a light-emitting control signal provided by the light-emitting control signal line are represented by the same marker.

In the initialization stage TM1, the first initialization module 210 transmits the initialization voltage Vref provided by the initialization signal line to the control terminal g of the driving module 110 to initialize the control terminal g of the driving module 110, and the second initialization module 220 transmits the initialization voltage Vref provided by the initialization signal line to the light-emitting module 150 to initialize the light-emitting module 150. At a timing of t1, a light-emitting control signal EM, a first scan signal S1, a second scan signal S2, a third scan signal S3, and a fourth scan signal S4 are all at high levels. The first transistor T1, the second transistor T2, the fourth transistor T4, the fifth transistor T5, the eighth transistor T8, the ninth transistor T9, the tenth transistor T10, and the eleventh transistor T11 are all in OFF states. The gate voltage of the ninth transistor T9 maintains the state in the previous frame. At a timing of t2, the falling edge of the second scan signal S2 arrives, the second transistor T2 and the first transistor T1 are turned on (in this embodiment, the first transistor T1 may be connected to the first scan line S1 or the second scan line S2) so that partial charges at the gate g of the ninth transistor T9 can be discharged and the voltage of the gate g of the ninth transistor T9 is reduced. At a timing of t3, the falling edge of the third scan signal S3 and the falling edge of the fourth scan signal S4 arrive, the fourth transistor T4 and the fifth transistor T5 are turned on, the initialization voltage Vref is transmitted to the gate g of the ninth transistor T9 and a first electrode (the anode) of the organic light-emitting diode (OLED) separately to complete the potential initialization of the gate g of the ninth transistor T9 and the first electrode (the anode) of the OLED.

The data write and threshold compensation stage TM2, the data write module 120, the first compensation module 130, and the second compensation module 140 respond to corresponding scan signals respectively, to write the data voltage to the gate g of the ninth transistor T9 and implement threshold compensation for the ninth transistor T9. At a timing of t4, the fourth transistor T4 and the fifth transistor T5 are turned off in response to high-level signals, the falling edge of the first scan signal S1 arrives, the eighth transistor T8 is turned on in response to the first scan signal S1 at a low level, the data voltage on the data line Data is transmitted to the gate g of the ninth transistor T9, and the first transistor T1 and the second transistor T2 implement the threshold compensation for the ninth transistor T9. In this case, the gate voltage of the ninth transistor T9 is Vdata+Vth', and the first capacitor C1 stores the compensated gate voltage.

Exemplarily, due to relatively short duration of the ON state of the eighth transistor T8, the threshold voltage Vth of the ninth transistor T9 is not completely compensated, and is compensated by only Vth'. That is, in this case, the gate voltage of the ninth transistor T9 is raised (the threshold voltage Vth of the ninth transistor T9 is a negative value). According to the formula of the drive current, when the gate voltage of the ninth transistor T9 increases, the drive current reduces, making the display brightness reduced, and affecting the brightness uniformity.

In the compensation adjustment stage TM3, the coupling module 170 couples the jump voltage V1 to the first node N1 to finely adjust the gate voltage of the ninth transistor T9. In this embodiment, the jump voltage V1 is a pulse voltage. The pulse of a voltage signal of the jump voltage V1 is after the pulse of a second scan signal S2 transmitted by the second scan line. At a timing of t5, the rising edge of the second scan signal S2 arrives, and the second transistor T2 is turned off. At a timing of t6, the falling edge of the pulse signal arrives, the pulse voltage jumps from a high level to a low level. The second capacitor C2 couples the pulse voltage to the second electrode of the second capacitor C2 according to the voltage change amount of the first electrode of the second capacitor C2. According to law of conservation of charge, the voltage of the first node N1 reduces. Therefore, a voltage difference exists between the gate g of the ninth transistor T9 and the first node N1. Due to the leakage of the second transistor T2, the gate voltage of the ninth transistor T9 can be finely adjusted through the voltage of the first node N1 so that the gate voltage of the ninth transistor T9 is reduced to increase the drive current, thereby compensating for the reduction of the drive current due to the incompletion compensation for the threshold voltage Vth of the ninth transistor T9, improving the compensation effect, and ensuring the display brightness uniformity. At a timing of t7, the pulse voltage jumps from a low level to a high level. The width of the pulse voltage (i.e. the time difference between the timing t7 and the timing t6) may be set according to the fluctuation range of the subthreshold swing of the driving module 110 to solve the problem of subthreshold swing fluctuation of the driving module 110 by the pulse voltage jumping. The timing t7 is before the timing t8, preventing the nonuniform display caused by the unstable gate potential of the ninth transistor T9 after the OLED emits light.

Apparently, in other embodiments, it is also possible to increase the gate voltage of the ninth transistor T9 by coupling to reduce the drive current. Details are not repeated in this embodiment, and reference can be made to the preceding related description.

Optionally, in the compensation adjustment stage TM3, the pulse voltage V1 jumps from a high level to a low level in the case where the second compensation module 140 is turned off and jumps from a low level to a high level before the light-emitting module 150 emits light. Alternatively, the pulse voltage V1 jumps from a low level to a high level in the case where the second compensation module 140 is turned off and jumps from a high level to a low level before the light-emitting module 150 emits light.

In the light-emitting stage TM4, the light-emitting control signal EM is at a low level, the tenth transistor T10 and the eleventh transistor T11 are on, and the first transistor T1, the second transistor T2, the fourth transistor T4, the fifth transistor T5, and the eighth transistor T8 are off. The ninth transistor T9 generates a drive current to drive the OLED to emit light. According to the preceding analysis, it can be seen that the threshold compensation effect is improved so that in the low grayscale, the drive current in the same grayscale is consistent, thereby improving the display brightness uniformity. Moreover, since the compensation effect is achieved by finely tuning the gate voltage of the ninth transistor T9 after the threshold voltage of the ninth transistor T9 is compensated, the problem of subthreshold swing fluctuation of the ninth transistor T9 can be solved, improving the threshold compensation effect.

Figure 7:
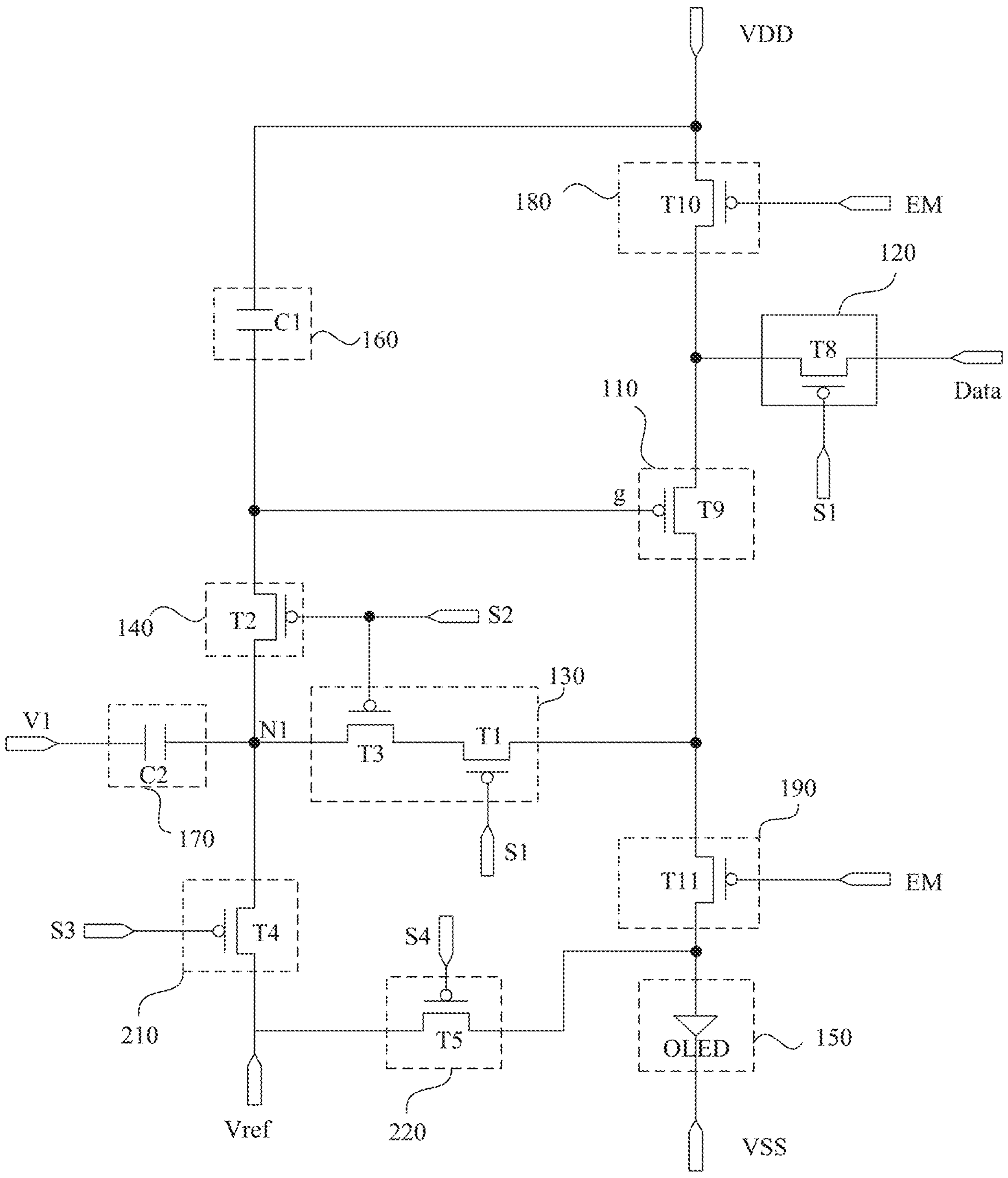
FIG. 7 is a structure diagram of another pixel circuit according to an embodiment of the present disclosure.

Optionally, FIG. 7 is a structure diagram of another pixel circuit according to an embodiment of the present disclosure. Referring to FIG. 7, on the basis of the preceding solutions, the first compensation module 130 further includes a third transistor T3. A gate of the third transistor T3 is connected to the second scan line S2. A first electrode of the third transistor T3 is connected to the second electrode of the first transistor T1. A second electrode of the third transistor T3 is connected to the second electrode of the second transistor T2. The difference from the pixel circuit shown in FIG. 5 is that: the first transistor T1 and the second transistor T2 are connected to different scan signal lines, the second transistor T2 and the third transistor T3 are connected to the same scan signal line, and the first transistor T1 may be a double-gate transistor or a single-gate transistor. Optionally, similar to the embodiment shown in FIG. 5, the fourth transistor T4 may also be a double-gate transistor. That is, the fourth transistor T4 includes two sub-transistors, and short-circuited gates of the two sub-transistors are connected to the third scan line S3. The pixel circuit shown in FIG. 7 in this embodiment is also applicable to the control timing shown in FIG. 6. Reference can be made to the related description of the preceding embodiments, and details are not repeated herein.

Optionally, the first compensation module may include the first transistor. The second compensation module may include the second transistor. The second transistor includes the double-gate transistor. The double-gate transistor includes the first sub-transistor and the second sub-transistor.

The first electrode of the first transistor is connected to the first terminal of the driving module. The second electrode of the first transistor is connected to the second electrode of the second sub-transistor. The first electrode of the second sub-transistor is connected to the second electrode of the first sub-transistor. The first electrode of the first sub-transistor is connected to the control terminal of the driving module. The gate of the first transistor is connected to the first scan line. The gate of the second transistor is connected to the second scan line.

The coupling module includes a third capacitor.

The first electrode of the third capacitor is connected to the jump voltage or the fixed voltage. The second electrode of the third capacitor is connected to the second electrode of the second sub-transistor.

Optionally, the coupling module may further include the second capacitor. The first electrode of the second capacitor is connected to the pulse voltage. The second electrode of the second capacitor is connected to the second electrode of the first sub-transistor.

The first compensation module may further include the third transistor. The gate of the third transistor is connected to the second scan line. The first electrode of the third transistor is connected to the second electrode of the first transistor. The second electrode of the third transistor is connected to the second electrode of the second transistor.

In the case where the first electrode of the third capacitor is connected to the fixed voltage, the fixed voltage is the first power-supply voltage on the first power-supply line or the initialization voltage on the initialization signal line.

In the case where the first electrode of the third capacitor is connected to the jump voltage, the jump voltage is a pulse voltage.

Figure 8:
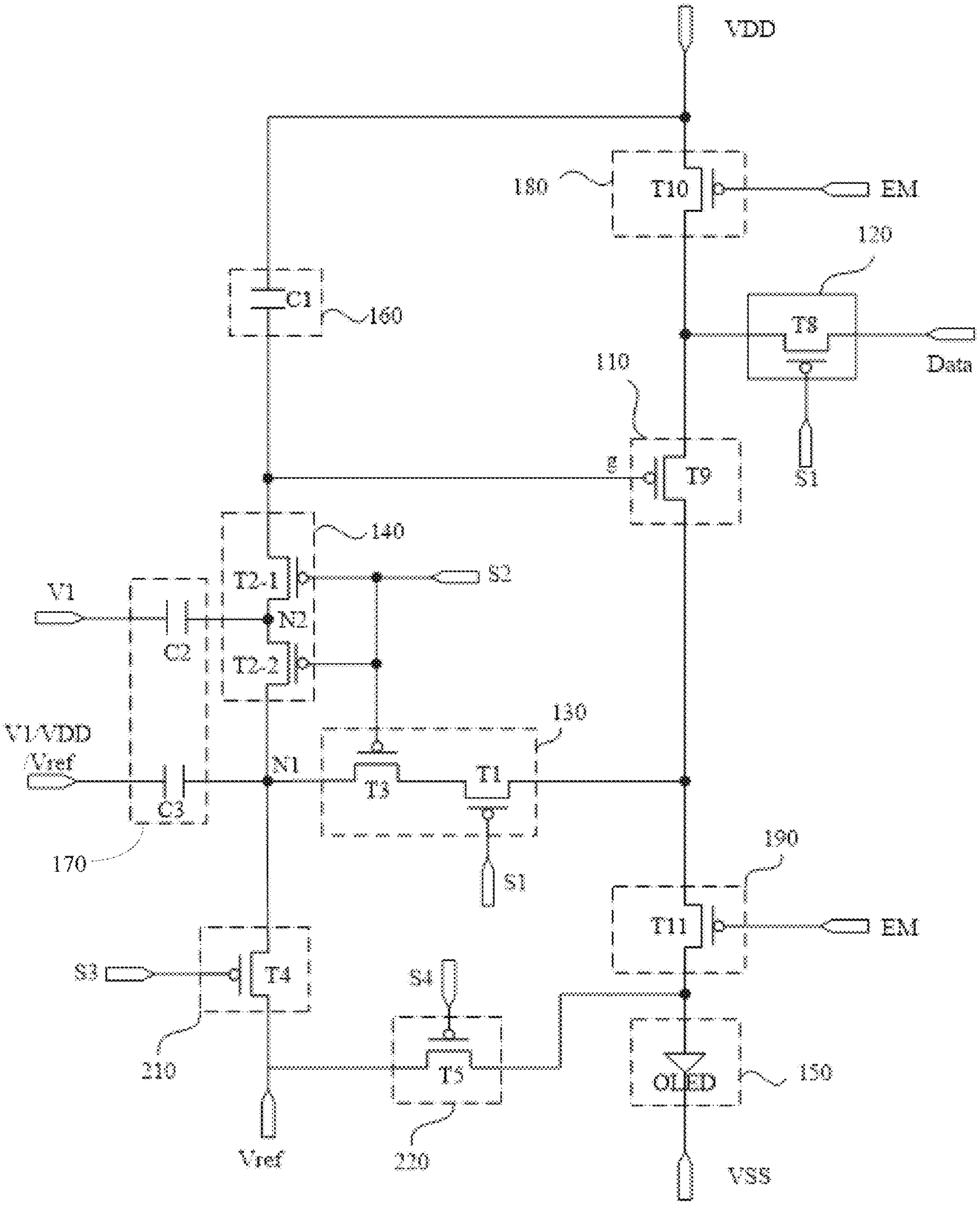
FIG. 8 is a structure diagram of another pixel circuit according to an embodiment of the present disclosure.

Optionally, FIG. 8 is a structure diagram of another pixel circuit according to an embodiment of the present disclosure. Referring to FIG. 8, on the basis of the preceding solutions, the second compensation module 140 includes the second transistor T2 that is a double-gate transistor. The second transistor T2 includes the first sub-transistor T2-1 and the second sub-transistor T2-2. The first electrode of the first transistor T1 is connected to the first terminal of the driving module 110. The second electrode of the first transistor T1 is connected to the second electrode of the second sub-transistor T2-2. The first electrode of the second sub-transistor T2-2 is connected to the second electrode of the first sub-transistor T2-1. The first electrode of the first sub-transistor T2-1 is connected to the control terminal g of the driving module 110. The coupling module 170 includes the second capacitor C2 and the third capacitor C3. The first electrode of the second capacitor C2 is connected to the pulse voltage. The second electrode of the second capacitor C2 is connected to the second electrode of the first sub-transistor T2-1. As shown in FIG. 8, the first electrode of the third capacitor C3 is connected to the pulse voltage or the fixed voltage. When the first electrode of the third capacitor C3 is connected to the fixed voltage, for example, the first electrode of the third capacitor C3 is connected to the first power-supply voltage VDD on the first power-supply line or the initialization voltage Vref on the initialization signal line. Since the fixed voltage does not jump, the third capacitor C3 can maintain the stability of the potential of the first node N1, and the second electrode of the third capacitor C3 is connected to the second electrode of the second sub-transistor T2-2. On the basis of the pixel circuit structure shown in FIG. 8, the fourth transistor T4 may also be a double-gate transistor. Referring to FIGS. 6 and 8, the working process of the pixel circuit provided by the embodiments of the present disclosure may include the initialization stage TM1, the data write and threshold compensation stage TM2, the compensation adjustment stage TM3, and the light-emitting stage TM4.

In the initialization stage TM1, the first initialization module 210 transmits the initialization voltage Vref provided by the initialization signal line to the control terminal g of the driving module 110 to initialize the control terminal g of the driving module 110, and the second initialization module 220 transmits the initialization voltage Vref provided by the initialization signal line to the light-emitting module 150 to initialize the light-emitting module 150. At a timing of t1, the light-emitting control signal EM, the first scan signal S1, the second scan signal S2, the third scan signal S3, and the fourth scan signal S4 are all at high levels, the first transistor T1, the second transistor T2, the fourth transistor T4, the fifth transistor T5, the eighth transistor T8, the ninth transistor T9, the tenth transistor T10, and the eleventh transistor T11 are all in OFF states, and the gate voltage of the ninth transistor T9 maintains the state of the previous frame. At a timing of t2, the falling edge of the second scan signal S2 arrives, and the second transistor T2 and the third transistor T3 are turned on so that partial charges at the gate g of the ninth transistor T9 can be discharged and the voltage of the gate g of the ninth transistor T9 is reduced. At a timing of t3, the falling edge of the third scan signal S3 and the falling edge of the fourth scan signal S4 arrive, and the fourth transistor T4 and the fifth transistor T5 are turned on. The initialization voltage Vref is transmitted to the gate g of the ninth transistor T9 to complete the potential initialization of the gate g of the ninth transistor T9. The initialization voltage Vref is transmitted to the first electrode (the anode) of the OLED to complete the potential initialization of the first electrode of the OLED.

In the data write and threshold compensation stage TM2, the data write module 120, the first compensation module 130, and the second compensation module 140 respond to corresponding scan signals respectively, to write the data voltage to the gate g of the ninth transistor T9 and implement the threshold compensation for the ninth transistor T9. At a timing of t4, the fourth transistor T4 and the fifth transistor T5 are turned off in response to high-level signals. The falling edge of the first scan signal S1 arrives, the first transistor T1 and the eighth transistor T8 are turned on in response to the first scan signal S1 at a low level. The data voltage on the data line Data is transmitted to the gate g of the ninth transistor T9, and the threshold compensation for the ninth transistor T9 is achieved by the first transistor T1 and the second transistor T2. In this case, the gate voltage of the ninth transistor T9 is Vdata+Vth', and the first capacitor C1 stores the compensated gate voltage.

In the compensation adjustment stage TM3, the pulse voltage is coupled to the first node N1 through the coupling module 170 to finely adjust the gate voltage of the ninth transistor T9. When both the second capacitor C2 and the third capacitor C3 are connected to the pulse voltages, at a timing of t5, the rising edge of the second scan signal S2 arrives, and the second transistor T2 and the third transistor T3 are turned off. At a timing of t6, the pulse voltage jumps from a high level to a low level. The second capacitor C2 couples the voltage change amount of the first electrode of the second capacitor C2 to the second electrode of the second capacitor C2. The third capacitor C3 couples the voltage change amount of the first electrode of the third capacitor C3 to the second electrode of the third capacitor C3. According to the charge conservation principle, the voltage of the first node N1 and the voltage of the second node N2 change. Therefore, a voltage difference exists between the gate g of the ninth transistor T9 and the first node N1, and a voltage difference exists between the gate g of the ninth transistor T9 and the second node N2. Due to the leakage of the first sub-transistor T2-1 and the second sub-transistor T2-2, the gate voltage of the ninth transistor T9 changes relative to the first node N1 or the second node N2, achieving the effect of the fine adjustment. In this manner, the gate voltage of the ninth transistor T9 changes, causing the drive current to be changed, thereby compensating for the inconsistency of the drive currents caused by the incomplete compensation for the threshold voltage Vth of the ninth transistor T9, thereby improving the compensation effect, and ensuring the display brightness uniformity.

Optionally, when the first electrode of the third capacitor C3 is connected to the fixed voltage, for example, the first electrode of the third capacitor C3 is connected to the first power-supply voltage VDD or the initialization voltage Vref, the fixed voltage does not jump, so the third capacitor C3 can maintain the stability of the potential of the first node N1, thereby reducing the leakage between the control terminal g of the driving module 110 and the second compensation module 140, facilitating finely tuning the voltage of the control terminal g of the driving module 110 through the voltage change in the second node N2.

In the light-emitting stage TM4, the light-emitting control signal EM is at a low level, the tenth transistor T10 and the eleventh transistor T11 are on, the first transistor T1, the second transistor T2, the fourth transistor T4, the fifth transistor T5, and the eighth transistor T8 are off, and the ninth transistor T9 generates the drive current to drive the OLED to emit light. According to the preceding analysis, it can be seen that the threshold compensation effect is improved so that in a low grayscale, the drive current in the same grayscale is consistent, thus improving the display brightness uniformity. Moreover, since the compensation effect is achieved by finely tuning the gate voltage of the ninth transistor T9 after the threshold voltage of the ninth transistor T9 is compensated, the problem of subthreshold swing fluctuation of the ninth transistor T9 can be solved, improving the threshold compensation effect.

In this embodiment, the first transistor T1 and the fourth transistor T4 may be double-gate transistors, reducing the leakage, facilitating maintaining the stability of the gate voltage of the ninth transistor T9, and preventing the flicker phenomenon caused by the instability of the drive current of the OLED.

In this embodiment, the fourth scan signal S4 and the third scan signal S3 are the same signal and provided by the same scan line so that the number of scan lines can be saved, and pixels per inch (PPI) can be improved. Apparently, in other embodiments, the fourth scan signal S4 and the first scan line signal S1 may also be the same and provided by the first scan signal line so that the number of scan lines can also be saved. In the working process of the pixel circuit, the initialization of the first electrode of the OLED is completed while the data is written.

Figure 9:
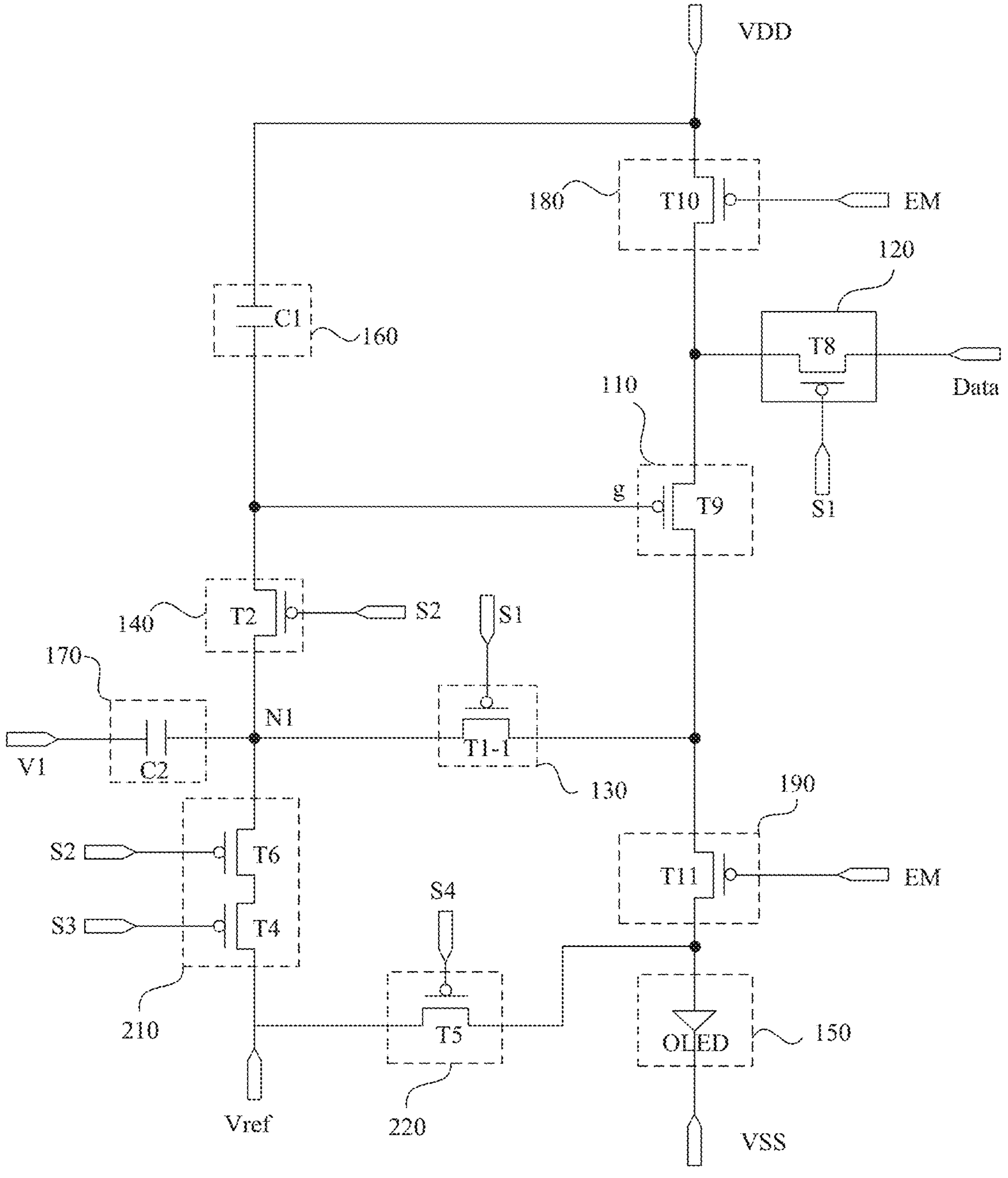
FIG. 9 is a structure diagram of another pixel circuit according to an embodiment of the present disclosure.

Optionally, FIG. 9 is a structure diagram of another pixel circuit according to an embodiment of the present disclosure. Referring to FIG. 9, on the basis of each of the preceding solutions, the first initialization module 210 further includes a sixth transistor T6. The gate of the sixth transistor T6 is connected to the second scan line S2. The first electrode of the sixth transistor T6 is connected to the second electrode of the fourth transistor T4. The second electrode of the sixth transistor T6 is connected to the second electrode of the second transistor T2. The pixel circuit shown in FIG. 9 is also applicable to the control timing shown in FIG. 6. When the second scan signal S2 is at a low level, the second transistor T2 and the sixth transistor T6 are turned on at the same time. The working principle thereof is similar to that described above, and details are not repeated herein.

In this embodiment, it is possible to combine the solutions provided in FIGS. 8 and 9. For the working principle thereof, reference can be made to the related description in each of the preceding solutions, and details are not repeated herein.

Figure 10:
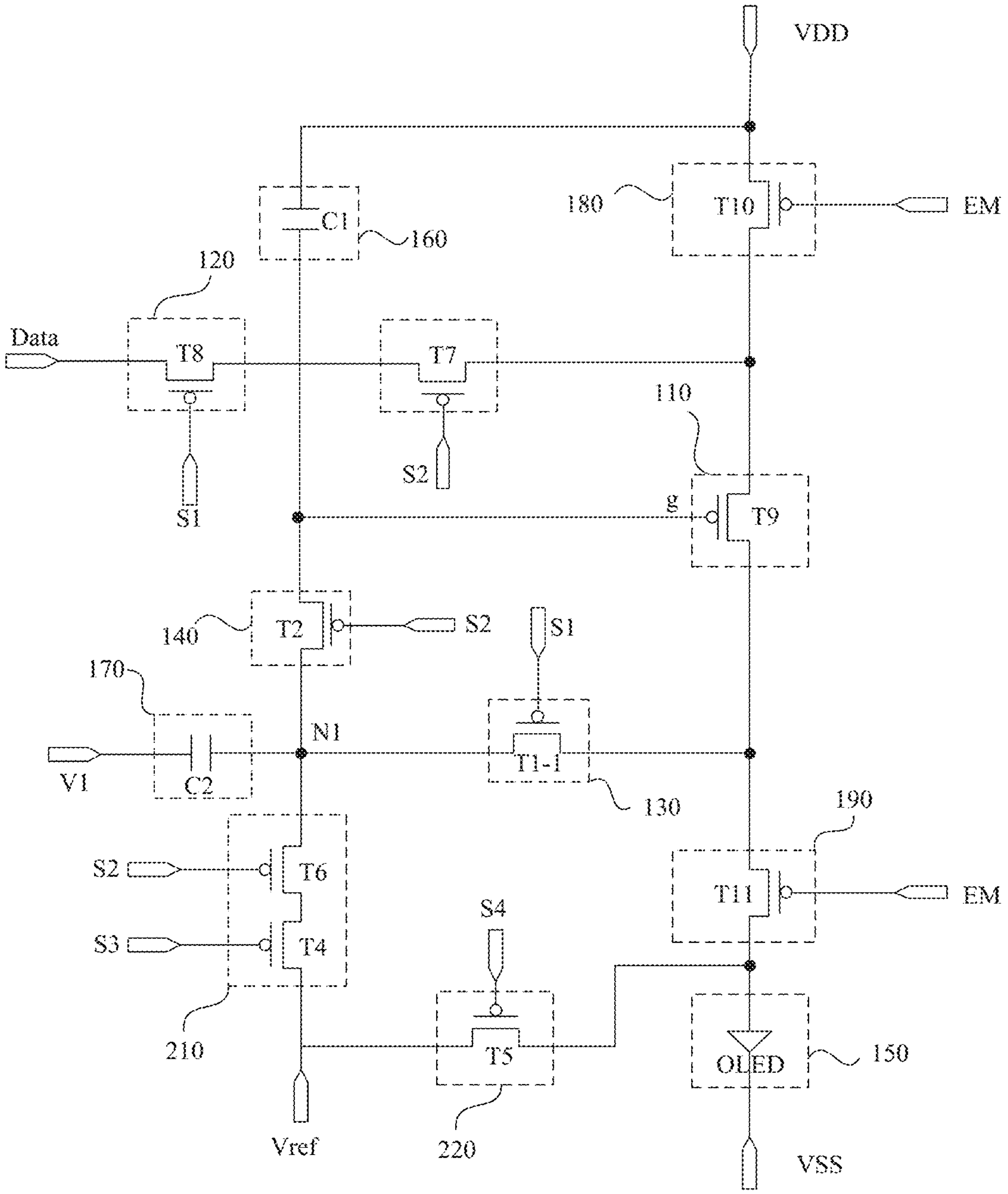
FIG. 10 is a structure diagram of another pixel circuit according to an embodiment of the present disclosure.

Optionally, FIG. 10 is a structure diagram of another pixel circuit according to an embodiment of the present disclosure. Referring to FIG. 10, on the basis of each of the preceding solutions, the pixel circuit provided by the embodiments of the present disclosure further includes a seventh transistor T7. The data write module 120 includes the eighth transistor T8. The gate of the seventh transistor T7 is connected to the second scan line S2. A second electrode of the seventh transistor T7 is connected to the second terminal of the driving module 110. A first electrode of the seventh transistor T7 is connected to a second electrode of the eighth transistor T8. A first electrode of the eighth transistor T8 is connected to the data line Data. The gate of the eighth transistor T8 is connected to the first scan line S1. Here, the seventh transistor T7, the second transistor T2, and the sixth transistor T6 are all connected to the second scan line S2. In this embodiment, the seventh transistor T7 and the sixth transistor T6 do not affect the working process of the pixel circuit. During the layout, transistors are added to reduce the difficulty in manufacturing and improve the layout. Optionally, the positions of the seventh transistor T7 and the eighth transistor T8 are interchanged. The data write module 120 includes the eighth transistor T8. The gate of the seventh transistor T7 is connected to the second scan line S2. The first electrode of the seventh transistor T7 is connected to the data line Data. The second electrode of the seventh transistor T7 is connected to the first electrode of the eighth transistor T8. The second electrode of the eighth transistor T8 is connected to the second terminal of the driving module 110. The gate of the eighth transistor T8 is connected to the first scan line S1.

Optionally, the first terminal of the coupling module 170 is not connected to the jump voltage V1 but to the fixed voltage VDD. The circuit of the fixed voltage VDD is simpler compared with the circuit of the jump voltage, so the effect of simplifying the pixel circuit can be achieved.

It is to be understood that the solutions provided by any embodiment of the present disclosure can be combined with each other to improve the compensation effect and the display brightness uniformity.

Figure 11:
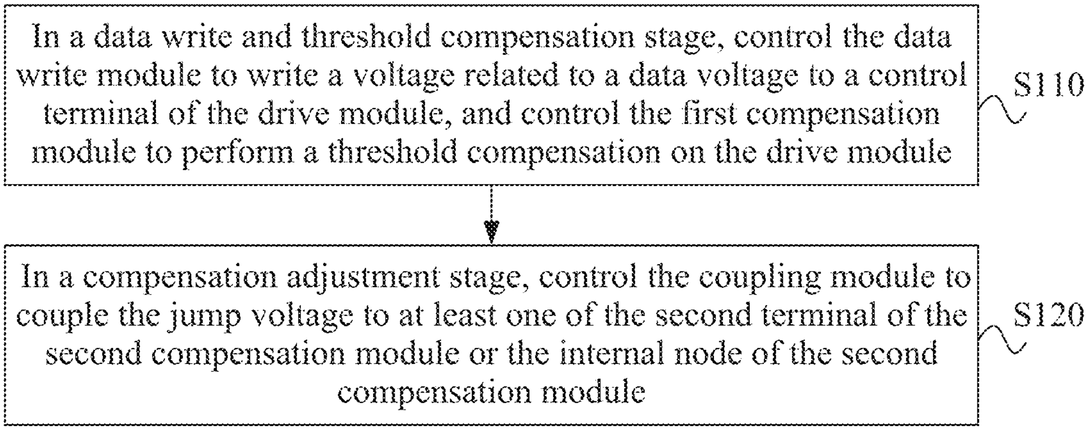
FIG. 11 is a flowchart of a driving method of a pixel circuit according to an embodiment of the present disclosure.

Optionally, embodiments of the present disclosure also provide a driving method of a pixel circuit. FIG. 11 is a flowchart of a driving method of a pixel circuit according to an embodiment of the present disclosure. Referring to FIGS. 1 and 11, the pixel circuit includes a driving module 110, a data write module 120, a first compensation module 130, a second compensation module 140, a light-emitting module 150, a storage module 160, and a coupling module 170. The data write module 120 is connected to the driving module 110. A first terminal of the second compensation module 140 is connected to a control terminal g of the driving module 110. A second terminal of the second compensation module 140 is connected to a first terminal of the first compensation module 130. A second terminal of the first compensation module 130 is connected to a first terminal of the driving module 110. The storage module 160 is connected to the control terminal g of the driving module 110. A first terminal of the coupling module 170 is connected to a jump voltage. A second terminal of the coupling module 170 is connected to the second terminal of the second compensation module 140 or an inner node of the second compensation module 140.

The driving method of the pixel circuit provided by the embodiments of the present disclosure includes the steps below.

In S110: In a data write and threshold compensation stage, the data write module is controlled to write a voltage related to a data voltage to the control terminal of the driving module, and the first compensation module is controlled to perform threshold compensation for the driving module.

In S120: In a compensation adjustment stage, the coupling module is controlled to couple a jump voltage to at least one of the second terminal of the second compensation module or the inner node of the second compensation module.

The driving method of the pixel circuit is applicable to the pixel circuit provided by any embodiment of the present disclosure. Reference of a control method thereof can be made to the preceding related description, and details are not repeated herein.

In the driving method of the pixel circuit provided by the embodiments of the present disclosure, after a threshold voltage of the driving module is compensated, the coupling module couples the jump voltage to at least one of the second terminal of the second compensation module or the inner node of the second compensation module to change the potential of the second terminal of the second compensation module or the potential of the inner node of the second compensation module. The second compensation module is connected to the control terminal of the driving module, so when the potential of the second terminal of the second compensation module or the potential of the inner node of the second compensation module changes, the potential of the control terminal of the driving module can be finely adjusted to improve the threshold compensation effect. Therefore, in the low grayscale, it is ensured that under the action of the voltage of the control terminal of the driving module being finely adjusted, the drive current generated by the driving module in the same grayscale voltage is the same, making the brightness of the light-emitting module the same, thereby improving the brightness uniformity, and facilitating improving the display effect.

Referring to FIGS. 5 and 9, the pixel circuit further includes a first initialization module 210, a second initialization module 220, a first light-emitting control module 180, and a second light-emitting control module 190. A control terminal of the first initialization module 210 is connected to a third scan line S3. A first terminal of the first initialization module 210 is connected to an initialization signal line Vref. A second terminal of the first initialization module 210 is connected to the second terminal of the second compensation module 140. A control terminal of the second initialization module 220 is connected to a fourth scan line S4. A first terminal of the second initialization module 220 is connected to the initialization signal line Vref. A second terminal of the second initialization module 220 is connected to a first terminal of the light-emitting module 150. A control terminal of the first light-emitting control module 180 and a control terminal of the second light-emitting control module 190 are both connected to the light-emitting control signal lines EM. A first terminal of the first light-emitting control module 180 is connected to a first power-supply line VDD. A second terminal of the first light-emitting control module 180 is connected to a second terminal of the driving module 110. A first terminal of the second light-emitting control module 190 is connected to the first terminal of the driving module 110. A second terminal of the second light-emitting control module 190 is connected to the first terminal of the light-emitting module 150. The second terminal of the light-emitting module 150 is connected to a second power-supply line VSS. A control terminal of the data write module 120 is connected to a first scan line S1. A control terminal of the first compensation module 130 is connected to the first scan line S1 or a second scan line S2. A control terminal of the second compensation module 140 is connected to the second scan line S2.

The first compensation module 130 includes a first transistor T1. The second compensation module 140 includes a second transistor T2. The first initialization module 210 includes a fourth transistor T4. The second initialization module 220 includes a fifth transistor T5. The data write module 120 includes an eighth transistor T8. The control terminal g of the driving module 110 includes a ninth transistor T9. The first light-emitting control module 180 includes a tenth transistor. The second light-emitting control module 190 includes an eleventh transistor T11. The storage module 160 includes a first capacitor C1. The coupling module 170 includes a second capacitor C2. The driving method of the pixel circuit includes:

In an initialization stage TM1, a third scan signal S3 output from the third scan line controls the first initialization module 210 to be turned on. A fourth scan signal S4 output from the fourth scan line controls the second initialization module 220 to be turned on. The first initialization module 210 transmits an initialization voltage Vref provided by the initialization signal line to the control terminal g of the driving module 110 to initialize the control terminal g of the driving module 110. The second initialization module 220 transmits an initialization voltage Vref provided by the initialization signal line to the light-emitting module 150 to initialize the light-emitting module 150. At a timing of t1, a light-emitting control signal EM, a first scan signal S1, a second scan signal S2, the third scan signal S3, and the fourth scan signal S4 are all at high levels. The first transistor T1, the second transistor T2, the fourth transistor T4, the fifth transistor T5, the eighth transistor T8, the ninth transistor T9, the tenth transistor T10, and the eleventh transistor T11 are all in OFF states. The gate voltage of the ninth transistor T9 maintains the state of the previous frame. At a timing of t2, the falling edge of the second scan signal S2 arrives, and the second transistor T2 and the first transistor T1 are turned on (in this embodiment, the first transistor T1 may be connected to the first scan line S1 or the second scan line S2) so that partial charges at the gate g of the ninth transistor T9 can be discharged and the voltage of the gate g of the ninth transistor T9 can be reduced. At a timing of t3, the falling edge of the third scan signal S3 and the falling edge of the fourth scan signal S4 arrive. The fourth transistor T4 and the fifth transistor T5 are turned on. The initialization voltage Vref is transmitted to the gate g of the ninth transistor T9 to complete potential initialization of the gate g of the ninth transistor T9. The initialization voltage Vref is transmitted to a first electrode (the anode) of the OLED to complete potential initialization of the OLED.

In the data write and threshold compensation stage TM2, the first scan signal S1 output from the first scan line controls the data write module 120 to be turned on, the first scan signal S1 output from the first scan line or the second scan signal S2 output from the second scan line controls the first compensation module 130 to be turned on, and the second scan signal S2 output from the second scan line controls the second compensation module 140 to be turned on. The data write module 120, the first compensation module 130, and the second compensation module 140 respond to corresponding scan signals, respectively, to write the data voltage to the gate g of the ninth transistor T9 and implement threshold compensation for the ninth transistor T9. At a timing of t4, the fourth transistor T4 and the fifth transistor T5 are turned off in response to high-level signals. The falling edge of the first scan signal S1 arrives. The eighth transistor T8 is turned on in response to the first scan signal S1 at a low level. The data voltage on the data line Data is transmitted to the gate g of the ninth transistor T9. The first transistor T1 and the second transistor T2 implement the threshold compensation for the ninth transistor T9. In this case, the gate voltage of the ninth transistor T9 is Vdata+Vth'. The first capacitor C1 stores the compensated gate voltage.

ON time of the eighth transistor T8 is relatively short, causing the threshold voltage Vth of the ninth transistor T9 to be not sufficiently compensated and only Vth' to be compensated. That is, in this case, the gate voltage of the ninth transistor T9 is raised (the threshold voltage Vth of the ninth transistor T9 is a negative value). According to the formula of the drive current, when the gate voltage of the ninth transistor T9 increases, the drive current reduces, making the display brightness reduced and affecting the brightness uniformity.

In the compensation adjustment stage TM3, the first scan signal S1 output from the first scan line or the second scan signal S2 output from the second scan line controls the first compensation module 130 to be turned off. The second scan signal S2 output from the second scan line controls the second compensation module 140 to be turned off. The coupling module 170 couples the jump voltage V1 to at least one of the second terminal of the second compensation module 140 or the inner node of the second compensation module 140. The coupling module 170 couples the jump voltage V1 to a first node N1 to finely adjust the gate voltage of the ninth transistor T9. In this embodiment, the jump voltage V1 is a pulse voltage. The pulse of a voltage signal of the jump voltage V1 is after the pulse of the second scan signal S2 transmitted by the second scan line. At a timing of t5, the rising edge of the second scan signal S2 arrives. The second transistor T2 is turned off. At a timing of t6, the falling edge of the pulse signal arrives, the pulse voltage jumps from a high level to a low level. The second capacitor C2 couples the pulse voltage to the second electrode of the second capacitor C2 according to the voltage change amount of the first electrode of the second capacitor C2. According to law of conservation of charge, the voltage of the first node N1 reduces. Therefore, a voltage difference exists between the gate g of the ninth transistor T9 and the first node N1. Due to the leakage of the second transistor T2, the gate voltage of the ninth transistor T9 can be finely adjusted through the voltage of the first node N1 so that the gate voltage of the ninth transistor T9 is reduced to increase the drive current, thereby compensating for the reduction of the drive current due to the incompletion compensation for the threshold voltage Vth of the ninth transistor T9, improving the compensation effect, and ensuring the display brightness uniformity.

Figure 12:
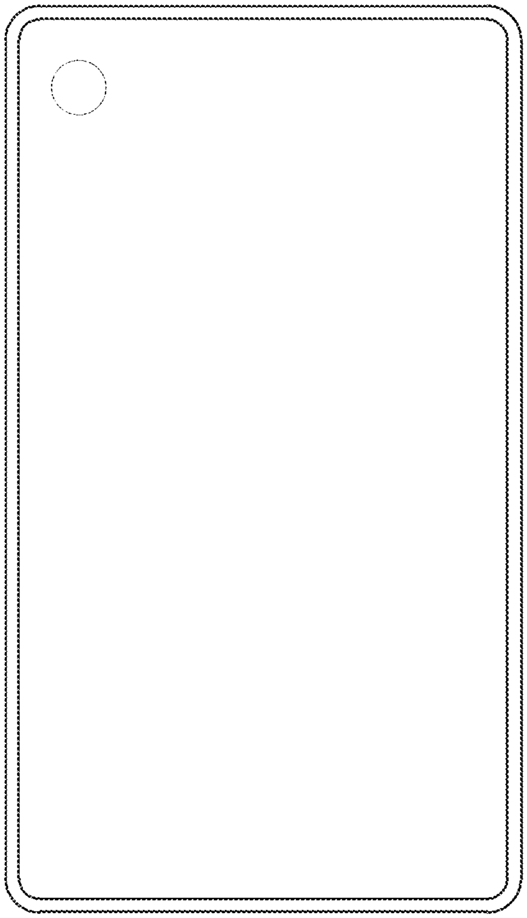
FIG. 12 is a structure diagram of a display panel according to an embodiment of the present disclosure.

In a light-emitting stage TM4, the light-emitting control signal EM output from the light-emitting control signal line controls the first light-emitting control module 180 and the second light-emitting control module 190 to be turned on. The ninth transistor T9 generates the drive current to drive the OLED to emit light. According to the preceding analysis, it can be seen that the threshold compensation effect is improved so that in the low grayscale, the drive current in the same grayscale is consistent, thereby improving the display brightness uniformity. Moreover, since the compensation effect is achieved by finely tuning the gate voltage of the ninth transistor T9 after the threshold voltage of the ninth transistor T9 is compensated, the problem of subthreshold swing fluctuation of the ninth transistor T9 can be solved, improving the threshold compensation effect. Optionally, an embodiment of the present disclosure also provides a display panel including the pixel circuit provided by the embodiments of the present disclosure. FIG. 12 is a structure diagram of a display panel according to an embodiment of the present disclosure. The display panel may be applied to a tablet computer, a mobile phone, a watch, a wearable device, or another display-related device such as an in-vehicle display, a camera display, a television, or a computer screen.

Figure 13:
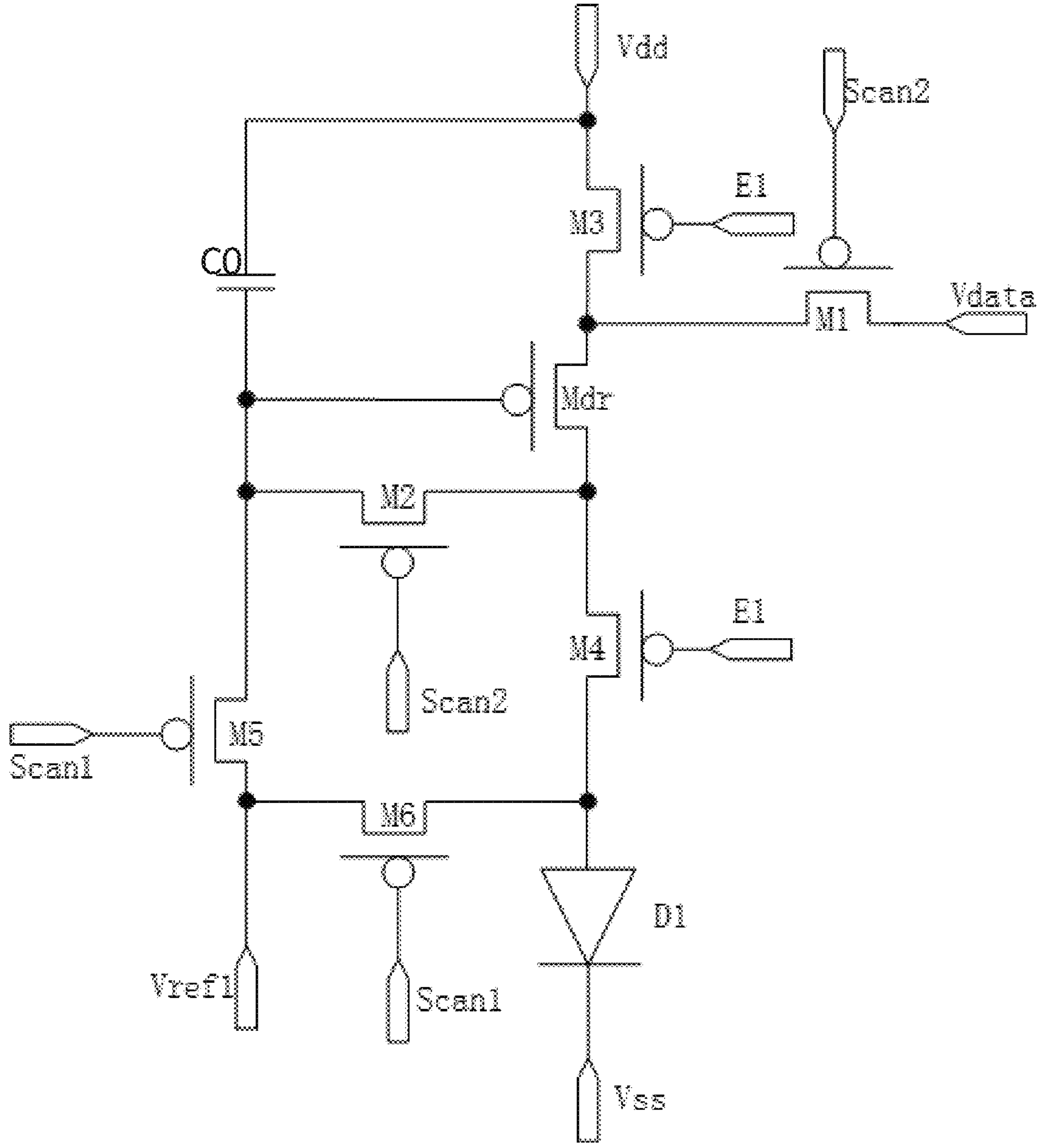
FIG. 13 is a structure diagram of a pixel circuit in the existing art.

FIG. 13 is a structure diagram of a pixel circuit in the existing art. As shown in FIG. 13, the pixel driving circuit includes a drive transistor Mdr, a first switch transistor M1, a second switch transistor M2, a third switch transistor M3, a fourth switch transistor M4, a fifth switch transistor M5, a sixth switch transistor M6, a capacitor C0, and a light-emitting device D1. It is shown, exemplarily, that the drive transistor Mdr, the first switch transistor M1, the second switch transistor M2, the third switch transistor M3, the fourth switch transistor M4, the fifth switch transistor M5, and the sixth switch transistor M6 are all P-type transistors. A first electrode of the fifth switch transistor is connected to a reference voltage signal line Vref1. A first electrode of the first switch transistor M1 is connected to a data signal line Vdata. In the working process of the pixel driving circuit, in a light-emitting stage, a first scan signal provided by a first scan signal input terminal Scan1 is at a high level, a second scan signal provided by a second scan signal input terminal Scan2 is at a high level, and a light-emitting control signal provided by a light-emitting control signal input terminal E1 is at a low level. In this case, the third switch transistor M3 and the fourth switch transistor M4 are turned on. The third switch transistor M3 outputs a first power-supply voltage provided by a first power-supply line Vdd to the source of the drive transistor Mdr. The cathode of the light-emitting device D1 is electrically connected to a second power-supply line Vss. In this case, the drive transistor Mdr provides a drive current for the light-emitting device D1 to drive the light-emitting device D1 to emit light. In the light-emitting stage, the second switch transistor M2 and the fifth switch transistor M5 are turned off. However, leakage currents still exist in the second switch transistor M2 and the fifth switch transistor M5. Two leakage paths make the voltage of the gate of the drive transistor Mdr reduced, thereby causing the drive current output from the drive transistor Mdr to change, resulting in the flicker problem of the light-emitting device D1 when the light-emitting device D1 emits light.

Figure 14:
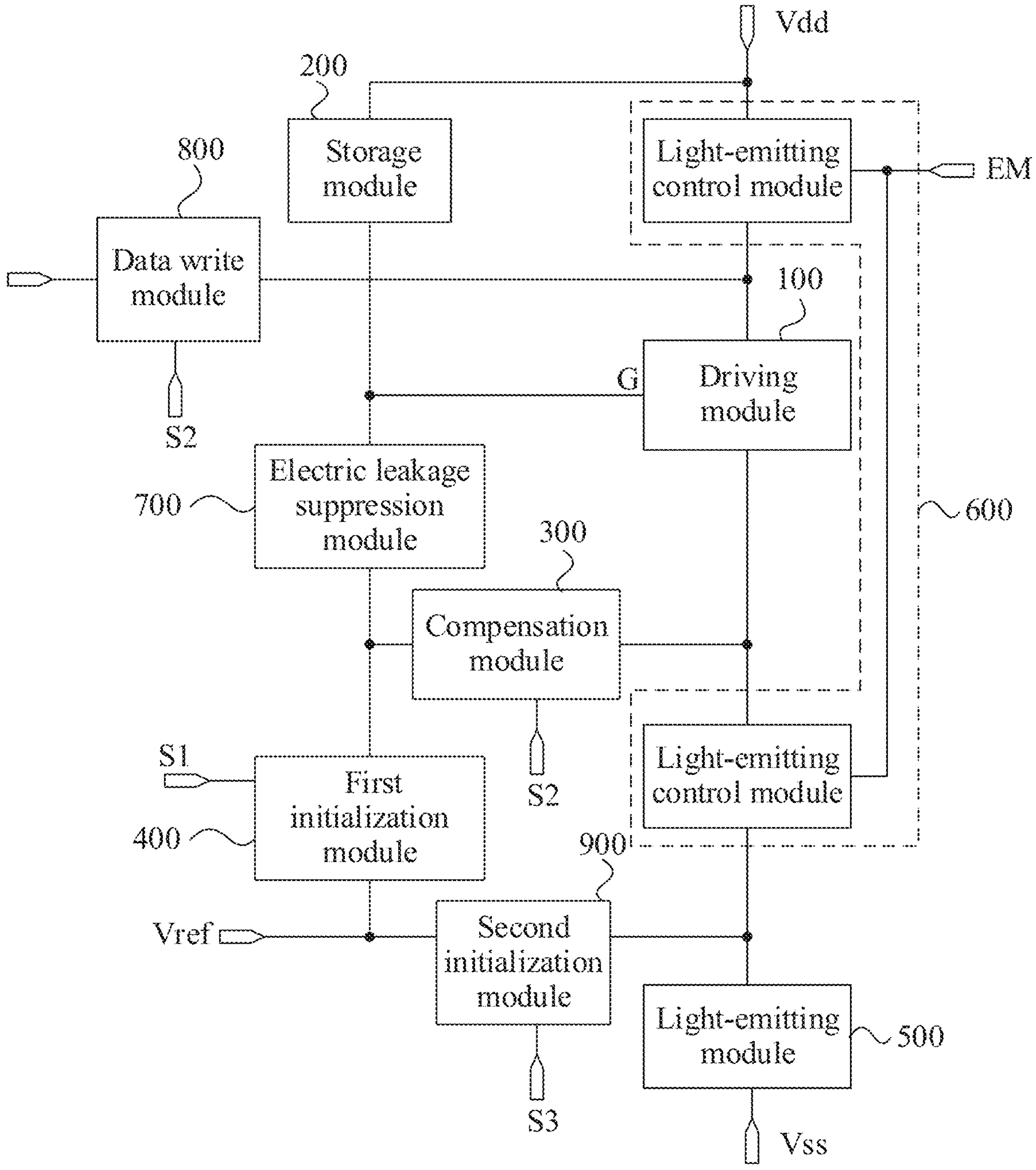
FIG. 14 is a structure diagram of a pixel circuit according to another embodiment of the present disclosure.

An embodiment of the present disclosure provides a pixel circuit. FIG. 14 is a structure diagram of a pixel circuit according to another embodiment of the present disclosure. Referring to FIG. 14, the pixel circuit includes a driving module 100, a storage module 200, a compensation module 300, a first initialization module 400, a light-emitting module 500, a light-emitting control module 600, a leakage suppression module 700, and a data write module 800.

The storage module 200 is connected to a control terminal G of the driving module 100. The storage module 200 is configured to store the voltage of the control terminal G of the driving module 100.

The light-emitting control module 600, the driving module 100, and the light-emitting module 500 are connected between a first power-supply line Vdd and a second power-supply line Vss. The light-emitting control module 600 is configured to control the light-emitting module 500 to emit light according to a drive signal output from the driving module 100 according to a signal on a light-emitting control signal line EM.

A first terminal of the first initialization module 400 is connected to an initialization signal line Vref. A second terminal of the first initialization module 400 is connected to the control terminal G of the driving module 100 through the leakage suppression module 700. The first initialization module 400 is configured to write an initialization voltage provided by the initialization signal line Vref to the control terminal G of the driving module 100 according to a signal on a first scan line S1;

A first terminal of the compensation module 300 is connected to a first terminal of the driving module 100. A second terminal of the compensation module 300 is connected to the control terminal G of the driving module 100 through the leakage suppression module 700. The compensation module 300 is configured to perform threshold compensation for the driving module 100 according to a signal on a second scan line S2.

The leakage suppression module 700 is configured to suppress the leakage of the storage module 200.

The pixel circuit further includes a second initialization module 900. A first terminal of the data write module 800 is connected to a data signal line Vdata. A second terminal of the data write module is connected to a second terminal of the driving module 100. A control terminal of the data write module 800 is connected to the second scan line S2. The data write module 800 is configured to write a data voltage provided by the data signal line Vdata to the driving module 100 according to the signal on the second scan line S2. That is, the data write module 800 can be turned on or off according to the signal on the second scan line S2. When the data write module 800 is turned on, the data voltage provided by the data signal line Vdata is transmitted to the driving module 100 through the turned-on data write module 800, and the voltage is written to the control terminal of the driving module through a transmission path of the driving module, the compensation module, and the leakage suppression module. A first terminal of the second initialization module 900 is connected to the initialization signal line Vref. A second terminal of the second initialization module 900 is connected to a first terminal of the light-emitting module 500. The second initialization module 900 is configured to write the initialization voltage provided by the initialization signal line Vref to the first terminal of the light-emitting module 500 according to a signal on a third scan line S3.

Exemplarily, it is possible that in the light-emitting module 500, the anode of an OLED serves as the first terminal of the light-emitting module 500, and the cathode of the OLED serves as a second terminal of the light-emitting module 500. The light-emitting module 500 emits light according to the drive signal output from the driving module 100. The drive signal may be the drive current output from the driving module 100 according to the voltage of the control terminal G of the driving module 100 and the voltage of the second terminal of the driving module 100.

Exemplarily, the working process of the pixel circuit may include three stages. In a first stage (an initialization stage), the signal on the first scan line S1 controls the first initialization module 400 to be turned on. The initialization voltage provided by the initialization signal line Vref is written to the control terminal of the driving module 100 through the first initialization module 400 and the leakage suppression module 700. In the first stage, the initialization of the control terminal G of the driving module 100 is implemented. In a second stage (a data voltage write and threshold compensation stage), the signal transmitted by the first scan line S1 controls the first initialization module 400 to be off. The signal on the second scan line S2 controls the data write module 800 and the compensation module 300 to be on. The data voltage provided by the data signal line Vdata is written to the control terminal G of the driving module 100 through the data write module 800, the driving module 100, the compensation module 300, and the leakage suppression module 700. The compensation module 300 can compensate for a threshold of the driving module 100 so that the voltage of the control terminal of the driving module 100 may include a voltage related to the data voltage and a voltage related to a threshold voltage, implementing the data voltage writing and the threshold compensation of the driving module 100. Optionally, the signal on the third scan line S3 may be the same as the signal on the second scan line S2. In the second stage, the signal on the third scan line S3 controls the second initialization module 900 to be on. The initialization voltage provided by the initialization signal line Vref is written to the first terminal of the light-emitting module 500 through the second initialization module 900. In the second stage, the initialization of the first terminal of the light-emitting module 500 is implemented, preventing charges left at the first terminal of the light-emitting module 500 from affecting the display effect. In a third stage (a light-emitting stage), the signal on the first scan line S1 controls the first initialization module 400 to be off. The signal on the second scan line S2 controls the data write module 800 and the compensation module 300 to be off. The signal on the third scan line S3 controls the second initialization module 900 to be off. The signal on the light-emitting control signal line EM controls the light-emitting control module 600 to be on. The light-emitting control module 600 transmits a first power-supply voltage on the first power-supply line Vdd to the second terminal of the driving module 100. The driving module 100 outputs the drive signal to drive the light-emitting module 500 to emit light.

In this embodiment, the leakage suppression module is provided between the control terminal of the driving module and a common terminal of the compensation module and the first initialization module to suppress the leakage of the storage module. Compared with the case where the storage module leaks electricity through two paths of the compensation module and the first initialization module in the existing art, in this embodiment, the storage module only leaks electricity through the leakage suppression module. That is, only one leakage path exists. In this manner, the leakage paths and the magnitude of the leakage current are reduced, the stability of the voltage of the control terminal of the driving module is maintained, the voltage holding ratio of the control terminal of the driving module is increased, and the flicker phenomenon caused by the change in the current of the driving module when the light-emitting module emits light is improved.

Figure 15:
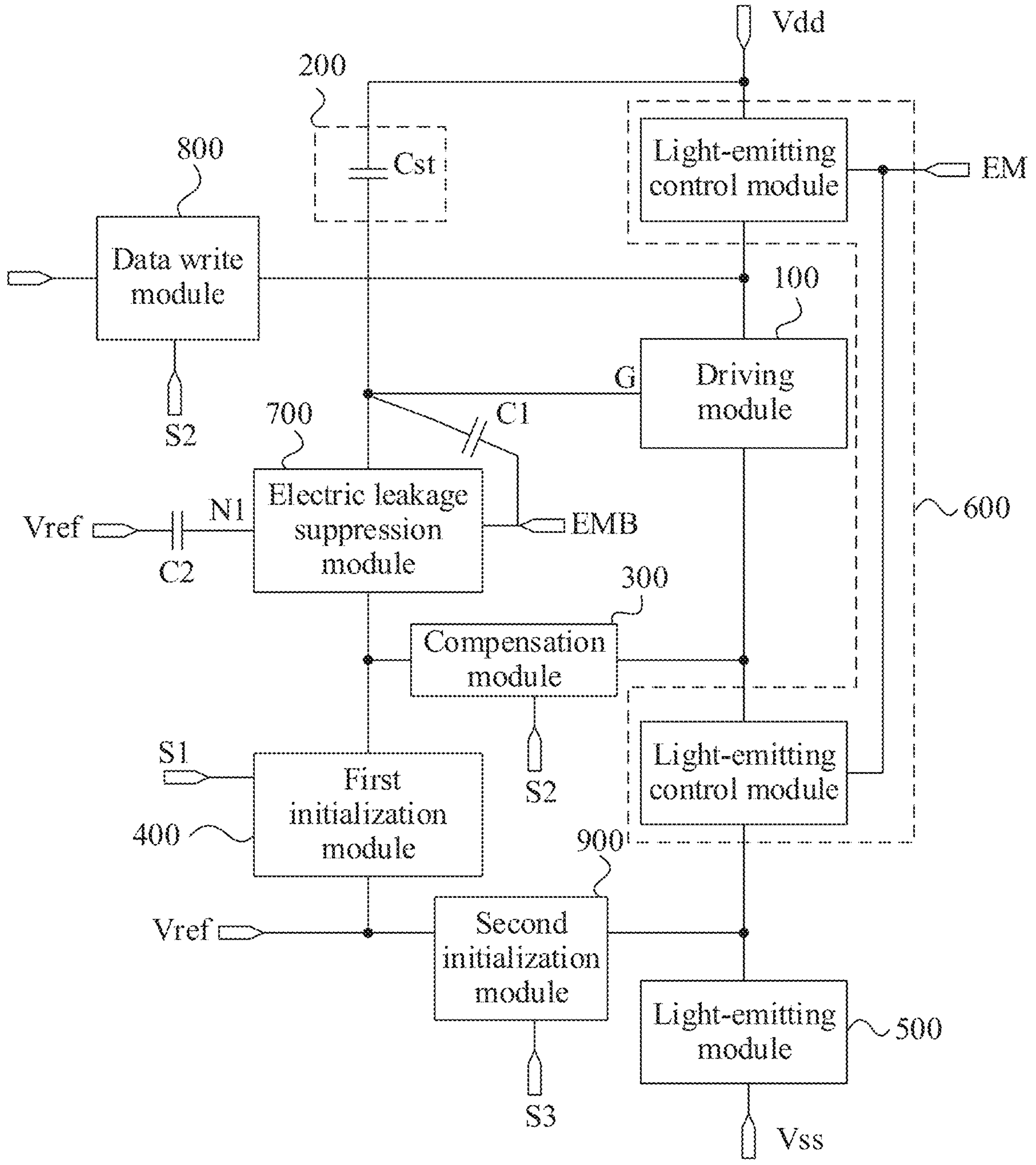
FIG. 15 is a structure diagram of another pixel circuit according to another embodiment of the present disclosure.

FIG. 15 is a structure diagram of another pixel circuit according to another embodiment of the present disclosure. Referring to FIG. 15, optionally, at least one of a node of an internal device of the first initialization module 400, a node of an internal device of the leakage suppression module 700, a node connected to the first initialization module 400, a node connected to the control terminal G of the driving module 100, or a node connected to the compensation module 300 is connected to a voltage stabilizing capacitor.

Exemplarily, in this embodiment, the pixel circuit includes two voltage stabilizing capacitors: a first voltage stabilizing capacitor C1 and a second voltage stabilizing capacitor C2. A control terminal of the leakage suppression module 700 is connected to a leakage control signal line EMB. A first terminal of the first voltage stabilizing capacitor C1 is connected to the control terminal G of the driving module 100. A second terminal of the first voltage stabilizing capacitor C1 is connected to the leakage control signal line EMB. A first terminal of the second voltage stabilizing capacitor C2 is connected to the node N1 of the internal device of the leakage suppression module 700. A second terminal of the second voltage stabilizing capacitor C2 is connected to the initialization signal line Vref. The leakage suppression module 700 may include a transistor. The transistor may be a double-gate transistor. The node N1 of the internal device of the leakage suppression module 700 may be a double-gate node of the double-gate transistor.

The first voltage stabilizing capacitor C1 can stabilize the voltage of the control terminal G of the driving module 100 so that the voltage of the control terminal G is not susceptible to the jumping of other signals. The second voltage stabilizing capacitor C2 can stabilize the voltage of the node N1 of the internal device of the leakage suppression module 700 so that the voltage of the node N1 of the internal device of the leakage suppression module 700 is not susceptible to the jumping of other signals. When the leakage suppression module 700 is turned on, the voltage of the control terminal G of the driving module 100 is equal to the voltage of the node N1 of the internal device of the leakage suppression module 700. After the leakage suppression module 700 is turned off, the voltage of the control terminal G maintained by the first voltage stabilizing capacitor C1 and the second voltage stabilizing capacitor C2 is equal to the voltage of the node N1 of the internal device of the leakage suppression module 700. The smaller the voltage difference between the control terminal G of the driving module 100 and the node N1 of the internal device of the leakage suppression module 700, the smaller the leakage current of the leakage suppression module 700. The first voltage stabilizing capacitor C1 and the second voltage stabilizing capacitor C2 are provided. In this manner, the stability of the voltage of the control terminal of the driving module 100 can be maintained, the voltage holding ratio of the control terminal G of the driving module 100 can be increased, and the flicker phenomenon when the light-emitting module 500 emits light and the display quality can be improved.

Referring to FIG. 15, optionally, the storage module 200 includes a storage capacitor Cst. The capacitance of the voltage stabilizing capacitor is smaller than the capacitance of the storage capacitor Cst.

The voltage stabilizing capacitor is different from the storage capacitor Cst. The storage capacitor Cst needs to store the voltage of the control terminal of the driving module 100. Therefore, the capacitance of the storage capacitor Cst is relatively large. However, the voltage stabilizing capacitance is configured to stabilize the voltage of the node connected to the voltage stabilizing capacitance, thereby reducing the magnitude of the leakage current. Therefore, the capacitance of the voltage stabilizing capacitance may be relatively small and may be smaller than the capacitance of storage capacitor Cst. The capacitance of the voltage stabilizing capacitor is relatively small so that areas of two plates of the capacitors are relatively small, and the layout of the voltage stabilizing capacitors in the circuit is simpler.

Figure 16:
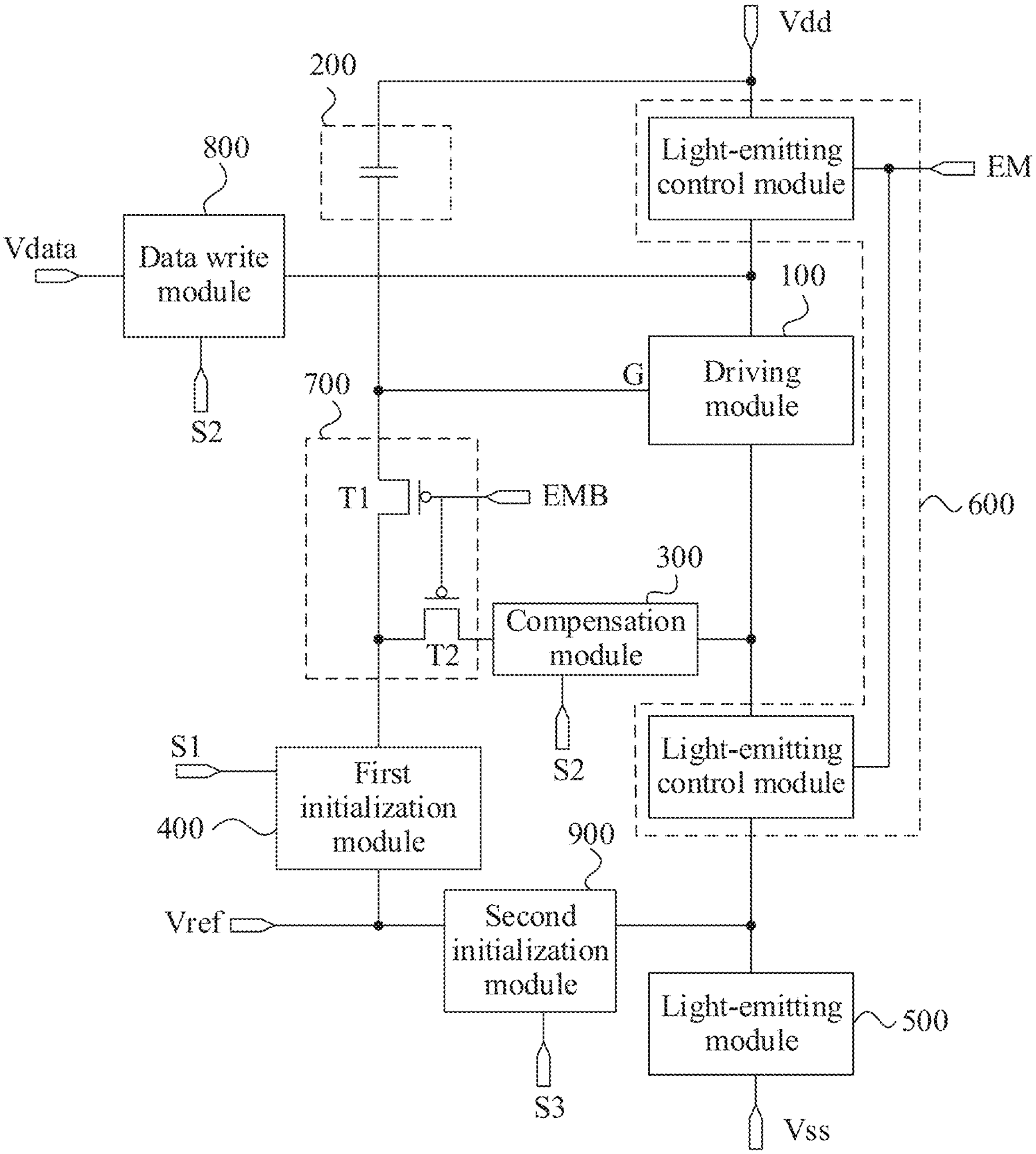
FIG. 16 is a structure diagram of another pixel circuit according to another embodiment of the present disclosure.

FIG. 16 is a structure diagram of another pixel circuit according to another embodiment of the present disclosure. Referring to FIG. 16, optionally, the leakage suppression module 700 includes a first transistor T1 and a second transistor T2.

A first electrode of the first transistor T1 is connected to the control terminal G of the driving module 100. A second electrode of the first transistor T1 is connected to the second terminal of the first initialization module 400.

A first electrode of the second transistor T2 is connected to the second electrode of the first transistor T1. A second electrode of the second transistor T2 is connected to the second terminal of the compensation module 300.

The gate of the first transistor T1 and the gate of the second transistor T2 are connected to the leakage control signal line EMB.

Exemplarily, both the first transistor T1 and the second transistor T2 are P-type transistors. When a signal on the leakage control signal line EMB is at a high level, the first transistor T1 and the second transistor T2 are turned off. When the signal on the leakage control signal line EMB is at a low level, the first transistor T1 and the second transistor T2 are turned on. In the first stage of the pixel circuit working, the leakage control signal line EMB is at a low level, the first transistor T1 and the second transistor T2 are on. The initialization voltage on the initialization signal line Vref is written to the control terminal G of the driving module 100 through the turned-on first initialization module 400 and first transistor T1 to initialize the driving module 100. In the second stage, the data voltage on the data signal line Vdata is written to the control terminal of the driving module 100 through the turned-on data write module 800, driving module 100, compensation module 300, second transistor T2, and first transistor T1, thereby implementing the data voltage writing and the threshold compensation.

In the pixel circuit of this embodiment, only one leakage path of the first transistor T1 exists at the control terminal G of the driving module 100. Compared with the case where two leakage paths of the second switch transistor M2 and the fifth switch transistor M5 exist in the pixel circuit of FIG. 13, the leakage paths is reduced in the pixel circuit of this embodiment, thereby reducing the magnitude of the leakage current, reducing the change amplitude of the voltage of the control terminal G of the driving module 100, making the voltage of the control terminal G of the driving module 100 relatively stable, reducing the brightness attenuation of the light-emitting module 500 in one frame, thereby improving the flicker phenomenon of the light-emitting module 500 and the display quality.

Figure 17:
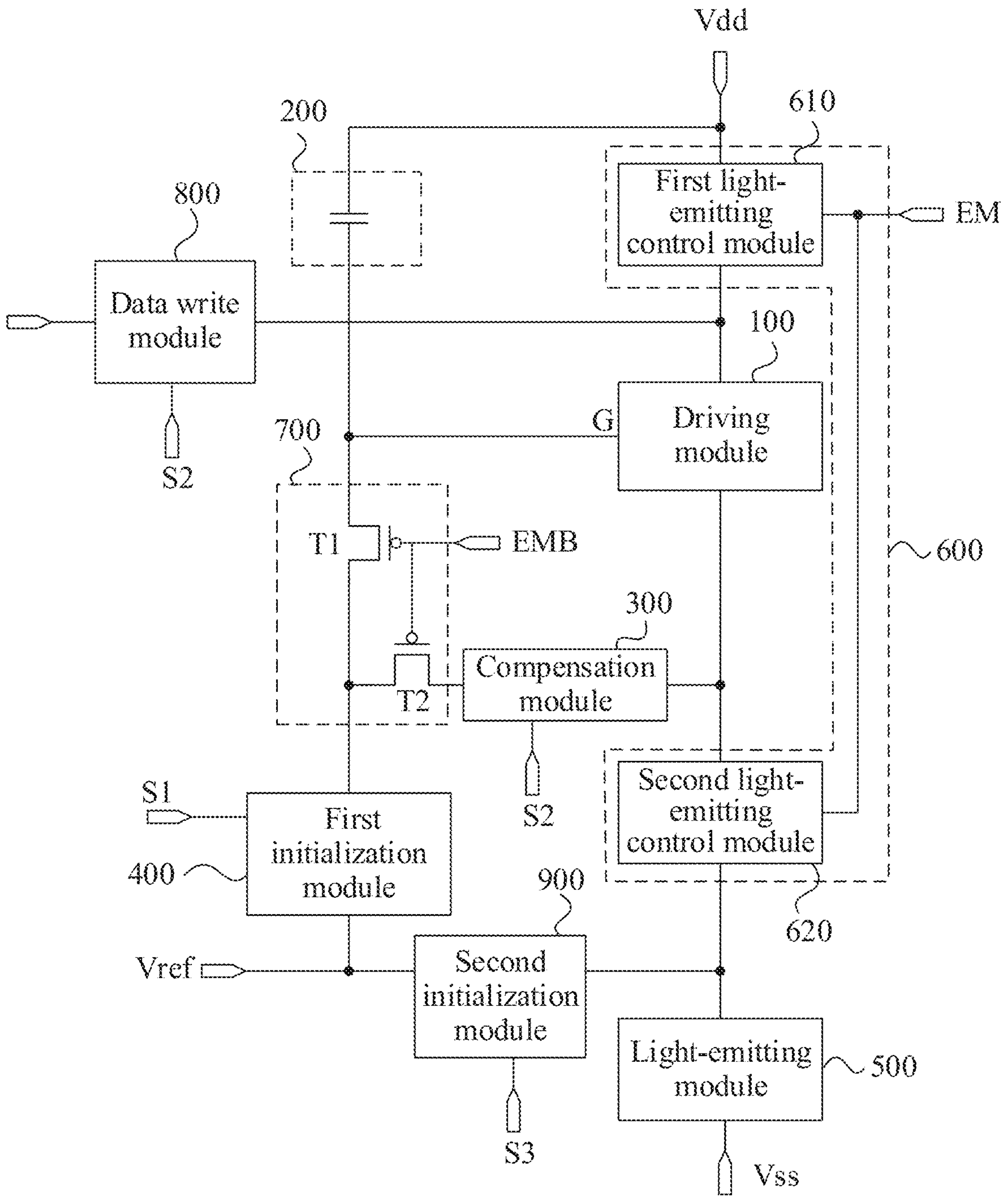
FIG. 17 is a structure diagram of another pixel circuit according to another embodiment of the present disclosure.

FIG. 17 is a structure diagram of another pixel circuit according to another embodiment of the present disclosure. Referring to FIG. 17, optionally, the light-emitting control module 600 includes a first light-emitting control module 610 and a second light-emitting control module 620.

The first light-emitting control module 610 is connected between the first power-supply line Vdd and the second terminal of the driving module 100. The second light-emitting control module 620 is connected between the first terminal of the driving module 100 and the first terminal of the light-emitting module 500. The second terminal of the light-emitting module 500 is connected to the second power-supply line Vss. A control terminal of the first light-emitting control module 610 and a control terminal of the second light-emitting control module 620 are connected to the light-emitting control signal line EM.

In the first stage and the second stage of the pixel circuit, the first light-emitting control module 610 and the second light-emitting control module 620 are off under the control of the light-emitting control signal line EM. In the third stage, the first light-emitting control module 610 and the second light-emitting control module 620 are on under the control of the light-emitting control signal line EM. The first power-supply voltage provided by the first power-supply line Vdd is written to the second terminal of the driving module 100 through the first light-emitting control module 610. The driving module 100 drives the light-emitting module 500 to emit light according to the voltage of the control terminal G of the driving module 100 and the voltage of the second terminal of the driving module 100.

Figure 18:
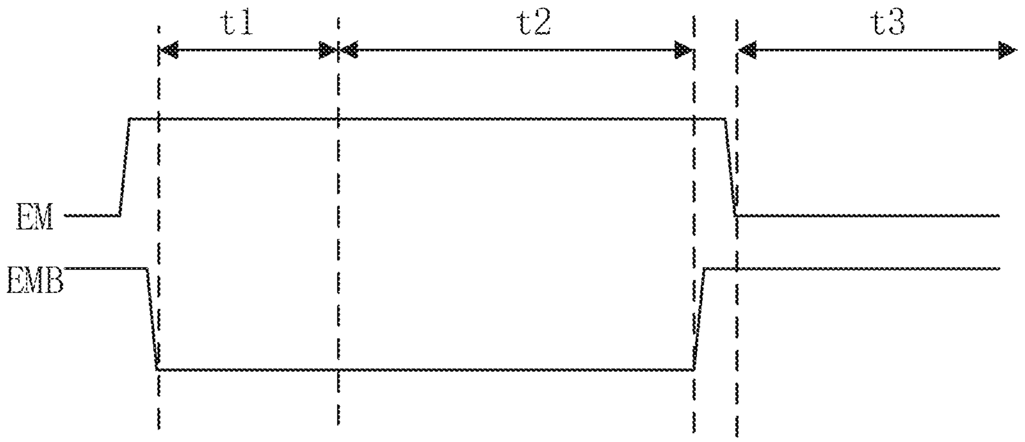
FIG. 18 is a timing diagram of a leakage control signal line and a light-emitting control signal line according to another embodiment of the present disclosure.

FIG. 18 is a timing diagram of a leakage control signal line and a light-emitting control signal line according to another embodiment of the present disclosure. The timing diagram shown in FIG. 18 is applicable to the pixel circuit shown in FIG. 17. Referring to FIGS. 17 and 18, optionally, within one frame, the time interval of the pulse of the signal on the leakage control signal line EMB is within the time interval of the pulse of the signal on the light-emitting control signal line EM.

Exemplarily, the leakage suppression module 700 is on when the signal on the leakage control signal line EMB is at a low level and off when the signal on the leakage control signal line EMB is at a high level. The light-emitting control module 600 is on when the signal on the light-emitting control signal line EM is at a low level and off when the signal on the light-emitting control signal line EM is at a high level.

In the first stage t1 and the second stage t2, the signal on the light-emitting control signal line EM is at a high level. The light-emitting control module 600 is off. The signal on the leakage control signal line EMB is at a low level. The leakage suppression module 700 is on. In this manner, in the first stage t1, the leakage suppression module 700 writes the initialization voltage to the control terminal G of the driving module 100. In the second stage t2, the leakage suppression module 700 writes the data voltage to the control terminal G of the driving module 100.

The on-time interval of the leakage suppression module 700 is within the off-time interval of the light-emitting control module 600, making the light-emitting control module 600 in an off state in the first stage t1 and the second stage t2 in which the leakage suppression module 700 is turned on, preventing the light-emitting control module 600 from being turned on in the first stage t1 and the second stage t2, thereby causing the light-emitting module 500 to be turned on, and the light-emitting module 500 to be turned on when the control terminal G of the driving module 100 has not completed the initialization or the data writing and threshold compensation, and affecting the display quality. Therefore, the time interval of the pulse of the signal on the leakage control signal line EMB is within the time interval of the pulse of the signal on the light-emitting control signal line EM, ensuring that the light-emitting module 500 is turned on again after the driving module completes the initialization, and the data writing and threshold compensation, thereby improving the display quality.

Referring to FIGS. 17 and 18, optionally, the signal on the leakage control signal line EMB and the signal on the light-emitting control signal line EM are inverse signals of each other.

Exemplarily, both the leakage suppression module 700 and the light-emitting control module 600 are P-type transistors. In the first stage t1, the signal on the leakage control signal line EMB is at a low level. The signal on the light-emitting control signal line EM is at a high level. The leakage suppression module 700 is on. The light-emitting control module 600 is off. The initialization voltage on the initialization signal line Vref is written to the control terminal G of the driving module 100 through the leakage suppression module 700. In the second stage t2, the signal on the leakage control signal line EMB is at a low level. The signal on the light-emitting control signal line EM is at a high level. The leakage suppression module 700 is on. The light-emitting control module 600 is off. The data voltage on the data signal line Vdata is written to the control terminal G of the driving module 100 through the leakage suppression module 700. In the third stage t3, the signal on the leakage control signal line EMB is at a high level. The signal on the light-emitting control signal line EM is at a low level. The leakage suppression module 700 is off. The light-emitting control module 600 is on. The first power-supply voltage on the first power-supply line Vdd is transmitted to the second terminal of the driving module 100 through the first light-emitting control module 610. The driving module 100 drives the light-emitting module 500 to emit light according to the voltage of the control terminal G of the driving module 100 and the voltage of the second terminal of the driving module 100. The light-emitting control signal line EM is usually connected to a light-emitting control drive circuit located at left and right bezel areas of the display panel. The light-emitting control drive circuit may be composed of cascaded shift registers. The signal on the leakage control signal line EMB and the signal on the light-emitting control signal line EM are inverse signals of each other. As long as only a phase inverter is provided at the output terminal of the light-emitting control drive circuit, the signal output from the light-emitting control drive circuit is inverted through the phase inverter and output to the leakage control signal line EMB. Therefore, a complex scan circuit composed of the shift registers designed for the leakage control signal line EMB is saved so that circuit devices in the bezel areas of the display panel can be reduced, and the narrow-bezel design of the display panel can be easily implemented.

Figure 19:
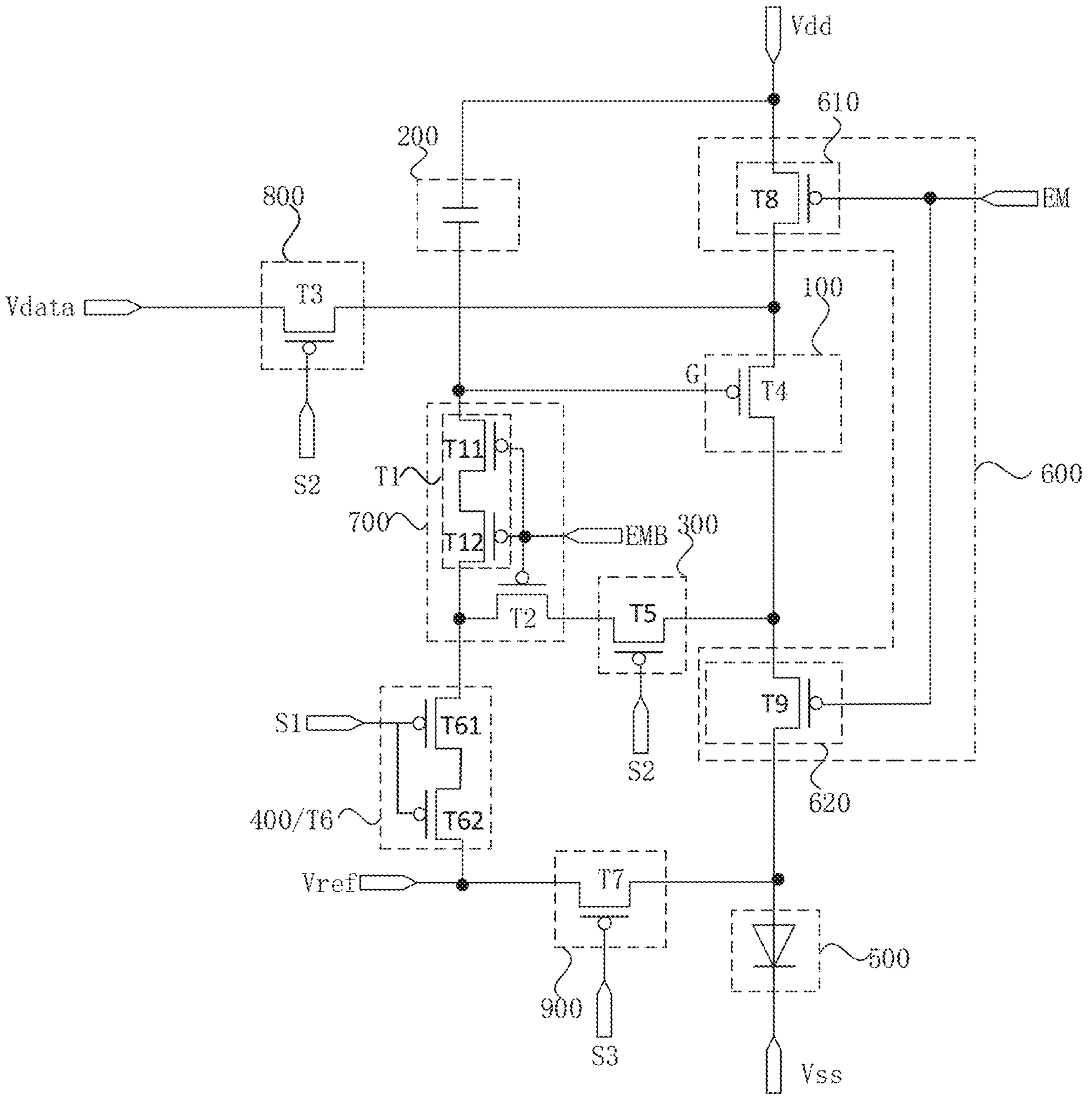
FIG. 19 is a structure diagram of another pixel circuit according to another embodiment of the present disclosure.

FIG. 19 is a structure diagram of another pixel circuit according to another embodiment of the present disclosure. Referring to FIG. 19, optionally, the pixel circuit further includes the data write module 800 and the second initialization module 900. The data write module includes a third transistor T3. The driving module 100 includes a fourth transistor T4. The compensation module 300 includes a fifth transistor T5. The first initialization module 400 includes a sixth transistor T6. The second initialization module 900 includes a seventh transistor T7. The first light-emitting control module 610 includes an eighth transistor T8. The second light-emitting control module 620 includes a ninth transistor T9.

A first electrode of the third transistor T3 is connected to the data signal line Vdata. A second electrode of the third transistor T3 is connected to the second terminal of the driving module 100. The gate of the third transistor T3 is connected to the second scan line S2.

A first electrode of the fourth transistor T4 serves as the second terminal of driving module 100. A second electrode of the fourth transistor T4 serves as the first terminal of the driving module 100. The gate of the fourth transistor T4 serves as the control terminal G of the driving module 100.

A first electrode of the fifth transistor T5 serves as the first terminal of the compensation module 300. A second electrode of the fifth transistor T5 serves as the second terminal of the compensation module 300. The gate of the fifth transistor T5 is connected to the second scan line S2.

A first electrode of the sixth transistor T6 serves as the first terminal of the first initialization module 400. A second electrode of the sixth transistor T6 serves as the second terminal of the first initialization module 400. The gate of the sixth transistor T6 is connected to the first scan line S1.

A first electrode of the seventh transistor T7 is connected to the initialization signal line Vref. A second electrode of the seventh transistor T7 is connected to the first terminal of the light-emitting module 500. The gate of the seventh transistor T7 is connected to the third scan line S3.

A first electrode of the eighth transistor T8 is connected to the first power-supply line Vdata. A second electrode of the eighth transistor T8 is connected to the first electrode of the fourth transistor T4. The gate of the eighth transistor T8 is connected to the light-emitting control signal line EM.

A first electrode of the ninth transistor T9 is connected to the second electrode of the fourth transistor T4. A second electrode of the ninth transistor T9 is connected to the first terminal of the light-emitting module 500. The gate of the ninth transistor T9 is connected to the light-emitting control signal line EM.

The first transistor T1 and the sixth transistor T6 are double-gate transistors.

Exemplarily, the first transistor T1 includes a first double-gate sub-tube T11 and a second double-gate sub-tube T12. The sixth transistor T6 includes a third double-gate sub-tube T61 and a fourth double-gate sub-tube T62. The first transistor T1, the second transistor T2, the third transistor T3, the fourth transistor T4, the fifth transistor T5, the sixth transistor T6, the seventh transistor T7, the eighth transistor T8, and the ninth transistor T9 may be P-type transistors or N-type transistors and not specifically limited in this embodiment. The case where each of the preceding transistors is a P-type transistor is used as an example for description.

Figure 20:
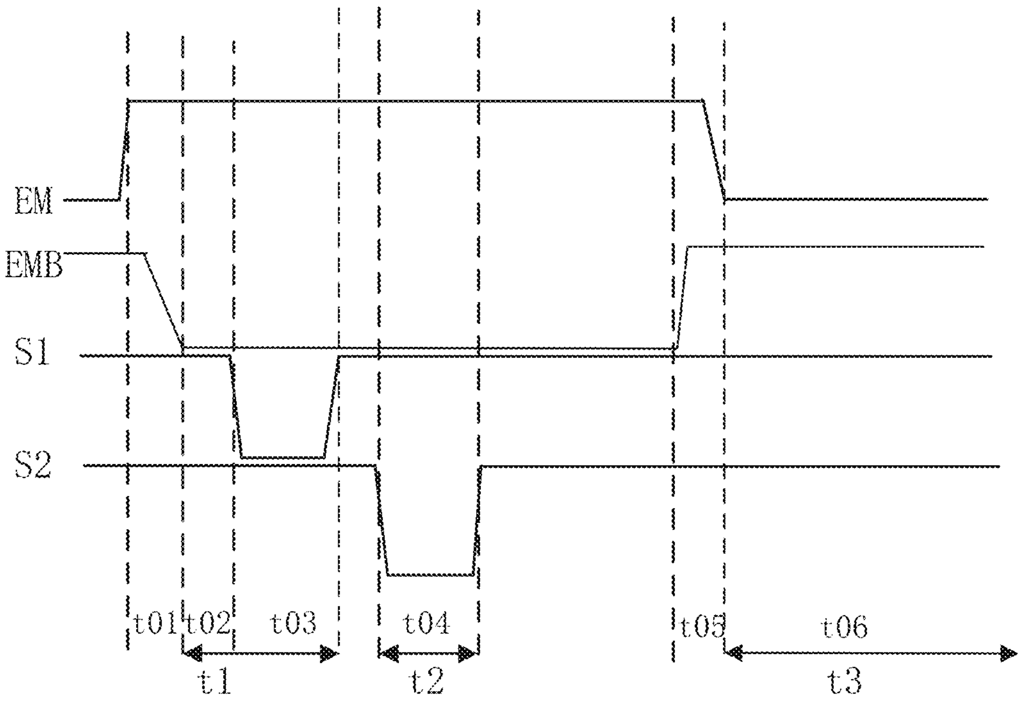
FIG. 20 is a timing diagram of a pixel circuit according to another embodiment of the present disclosure.

FIG. 20 is a timing diagram of a pixel circuit according to another embodiment of the present disclosure. The timing diagram shown in FIG. 20 is applicable to the pixel circuit shown in FIG. 19. The case where the third scan line S3 and the second scan line S2 have the same signals is used as an example for description. Referring to FIGS. 19 and 20, the first stage t1 includes a second sub-stage t02, a third sub-stage t03. The second stage t2 includes a fourth sub-stage t04.

The third stage t3 includes a sixth sub-stage t06.

In the first sub-stage t01, the signal on the light-emitting control signal line EM is raised to a high level. The eighth transistor T8 and the ninth transistor T9 are off. In the second sub-stage t02, the signal on the leakage control signal line EMB drops to a low level. The first transistor T1 and the second transistor T2 are on. In the third sub-stage t03, the signal on the first scan line S1 is at a low level. The sixth transistor T6 is on. In the third sub-stage t03, the initialization voltage provided by the initialization signal line Vref is transmitted to the gate of the fourth transistor T4 through the sixth transistor T6 and the first transistor T1, and then the gate of the fourth transistor T4 is reset. After the reset is completed, the signal on the first scan line S1 is raised to a high level, and the sixth transistor T6 is off. In the first stage t1, the signal on the light-emitting control signal line EM and the signal on the second scan line S2 are at high levels. The third transistor T3, the fifth transistor T5, the seventh transistor T7, the eighth transistor T8, and the ninth transistor T9 are at the off states.

In the fourth sub-stage t04, the signal on the second scan line S2 is at a low level. The third transistor T3 and the fifth transistor T5 are on. The signal on the leakage control signal line EMB is at a low level. The first transistor T1 and the second transistor T2 are on. The data voltage on the data signal line Vdata is written to the gate of the fourth transistor T4 through the third transistor T3, the fourth transistor T4, the fifth transistor T5, the second transistor T2, and the first transistor T1 so that the voltage related to the data voltage is written to the gate of the fourth transistor T4 and the threshold voltage of the fourth transistor T4 is compensated. Moreover, in the fourth sub-stage t04, the signal on the third scan line S3 and the signal on the second scan line S2 are the same and at low levels. The seventh transistor T7 is on. The initialization voltage provided by the initialization signal line Vref is transmitted to the first terminal of the light-emitting module 500 through the seventh transistor T7 to reset the first terminal of the light-emitting module 500, thereby preventing charges left at the first terminal of the light-emitting module 500 from affecting the display effect.

In the fifth sub-stage t05, the signal on the leakage control signal line EMB is raised to a high level. The first transistor T1 and the second transistor T2 are off. In the sixth sub-stage t06, the signal on the first scan line S1 and the signal on the second scan line S2 are at high levels. The third transistor T3, the fifth transistor T5, the sixth transistor T6, and the seventh transistor T7 are off. The signal on the light-emitting control signal line EM is at a low level. The eighth transistor T8 and the ninth transistor T9 are on. The first power-supply voltage on the first power-supply line Vdd is transmitted to the first electrode of the fourth transistor T4 through the eighth transistor T8. The fourth transistor T4 drives the light-emitting module 500 to emit light according to the voltage of the gate of the fourth transistor T4 and the voltage of the first electrode of the fourth transistor T4.

Figure 21:
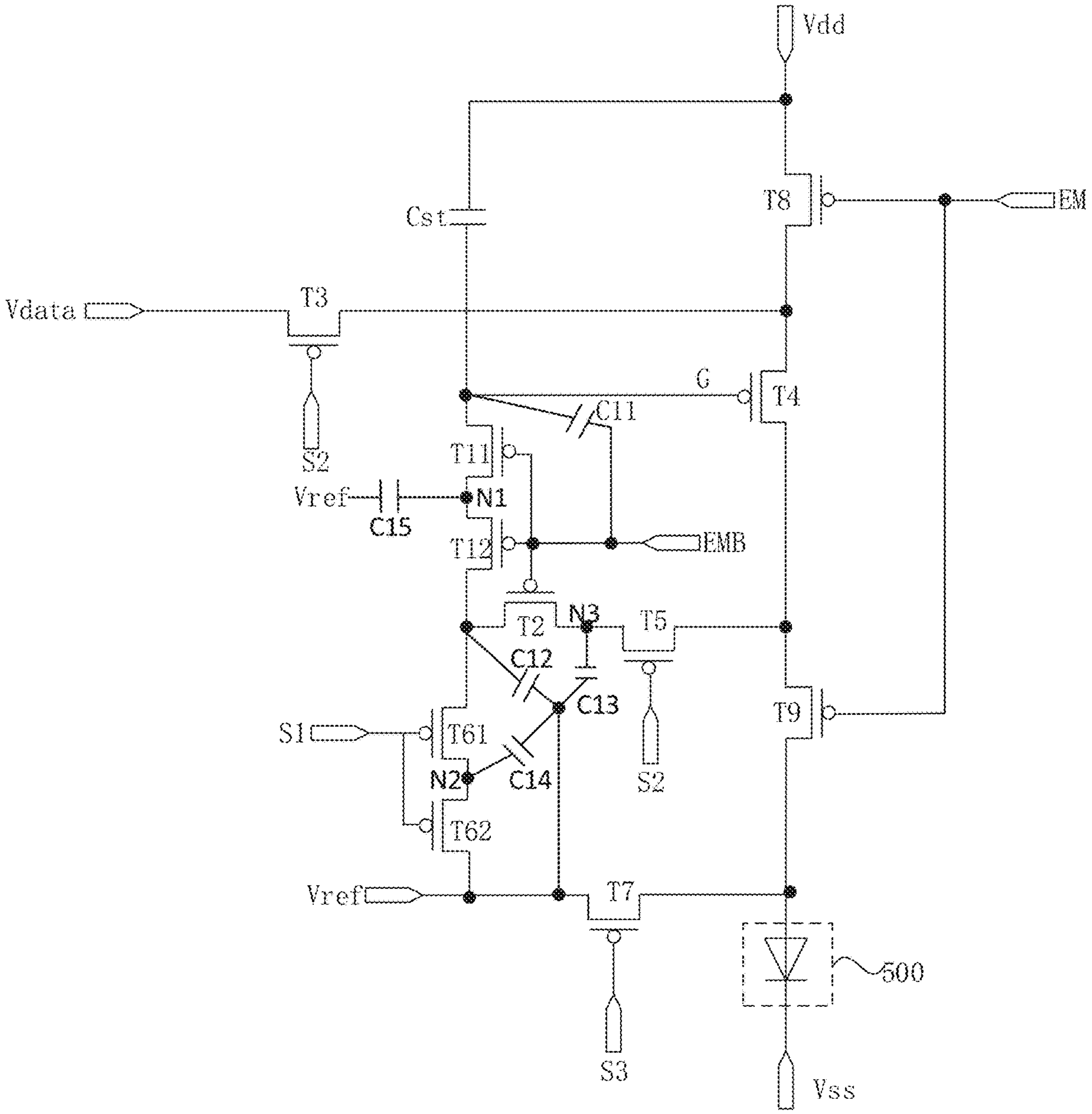
FIG. 21 is a structure diagram of another pixel circuit according to another embodiment of the present disclosure.

FIG. 21 is a structure diagram of another pixel circuit according to another embodiment of the present disclosure. Referring to FIG. 21, optionally, the pixel circuit further includes a first capacitor C11, a second capacitor C12, a third capacitor C13, a fourth capacitor C14, and a fifth capacitor C15.

A first terminal of the first capacitor C11 is connected to the gate of the fourth transistor T4. A second terminal of the first capacitor C11 is connected to the leakage control signal line EMB. A first terminal of the second capacitor C12 is connected to the second electrode of the sixth transistor T6. A second terminal of the second capacitor C12 is connected to the initialization signal line Vref. A first terminal of the third capacitor C13 is connected to the second electrode N3 of the second transistor T2. A second terminal of the third capacitor C13 is connected to the initialization signal line Vref. A first terminal of the fourth capacitor C14 is connected to a double-gate node N2 of the sixth transistor T6. A second terminal of the fourth capacitor C14 is connected to the initialization signal line Vref. A first terminal of the fifth capacitor C15 is connected to the initialization signal line Vref. A second terminal of the fifth capacitor C15 is connected to a double-gate node N1 of the first transistor T1.

In the light-emitting stage, the magnitudes of the third capacitor C13 and the fourth capacitor C14 are adjusted so that the voltage of the second electrode N3 of the second transistor T2 is larger than the voltage of the first electrode of the second transistor T2, and the voltage of the first electrode of the second transistor T2 is larger than the voltage of the double-gate node N2 of the sixth transistor T6, thereby making the second electrode N3 of the second transistor T2 charge the first electrode of the second transistor T2 and the first electrode of the second transistor T2 leak electricity to the double-gate node N2 of the sixth transistor T6, implementing complementation of the charging process and the leakage process of the first electrode of the second transistor T2, making the potential of the first electrode of the second transistor T2 balanced, reducing the leakage of the first electrode of the second transistor T2, increasing the voltage holding ratio of the control terminal G of the driving module 100 in the pixel circuit, and improving the flicker phenomenon of the light-emitting module 500 under a low-frequency driving and the display quality.

The first capacitor C11, the second capacitor C12, and the fifth capacitor C15 can stabilize the voltage of the gate of the fourth transistor T4, the voltage of the double-gate node N1 of the first transistor T1, and the voltage of the second electrode N3 of the second transistor T2. When the first transistor T1 and the second transistor T2 are turned on, the voltage of the gate of the fourth transistor T4, the voltage of the double-gate node N1 of the first transistor T1, and the voltage of the second electrode N3 of the second transistor T2 are equal. Therefore, in the light-emitting stage, the first transistor T1 and the second transistor T2 are turned off, the voltage of the gate of the fourth transistor T4, the voltage of the double-gate node N1 of the first transistor T1, and the voltage of the second electrode N3 of the second transistor T2 are equal, thereby reducing the leakage of the first transistor T1, reducing the magnitude of the leakage current of the first transistor T1, maintaining the stability of the voltage of the gate of the fourth transistor T4, increasing the voltage holding ratio of the control terminal G of the driving module 100 in the pixel circuit, improving the flicker phenomenon of the light-emitting module 500 under a low-frequency driving and the display quality.

Figure 22:
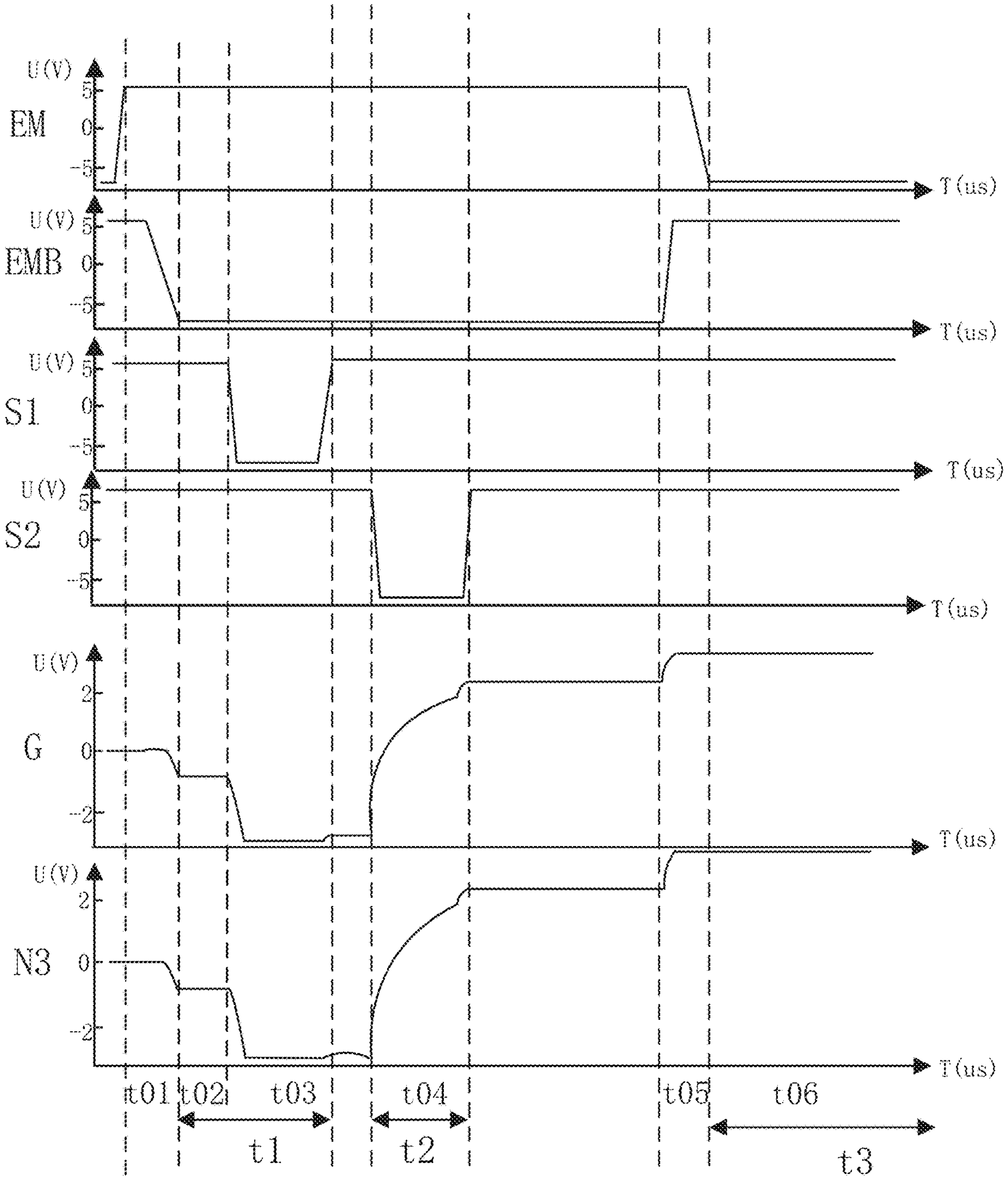
FIG. 22 is a waveform diagram of a simulated signal according to another embodiment of the present disclosure.

FIG. 22 is a waveform diagram of a simulated signal according to another embodiment of the present disclosure. FIG. 22 is a corresponding waveform diagram when the pixel circuit shown in FIG. 21 works. It can be seen from FIG. 22 that in the sixth sub-stage t06, the voltage of the control terminal G (the gate of the fourth transistor T4) of the driving module 100 and the voltage of the second terminal N3 of the second transistor T2 are both maintained in a stable state, thereby illustrating that the first capacitor C11, the second capacitor C12, the third capacitor C13, the fourth capacitor C14, and the fifth capacitor C15 can maintain the stability of the voltage of the gate of the fourth transistor T4, increasing the voltage holding ratio of the control terminal G of the driving module 100 in the pixel circuit, and improving the flicker phenomenon of the light-emitting module under a low-frequency driving and the display quality.

An embodiment of the present disclosure also provides a display panel including the pixel circuit of any one of the preceding embodiments of the present disclosure.

Figure 23:
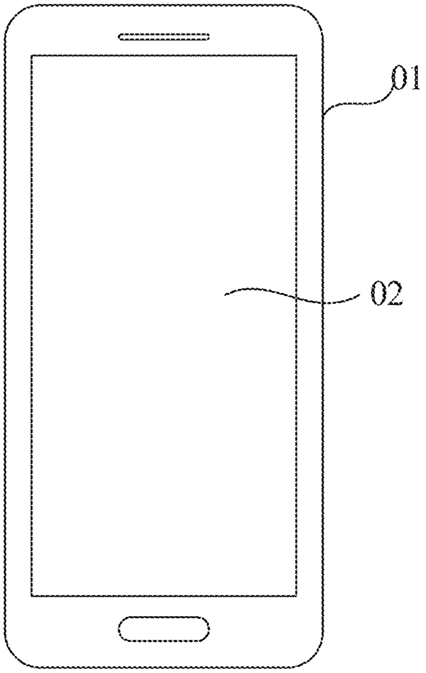
FIG. 23 is a structure diagram of a display device according to another embodiment of the present disclosure.

An embodiment of the present disclosure also provides a display device. FIG. 23 is a structure diagram of a display device according to another embodiment of the present disclosure. Referring to FIG. 23, the display device 01 includes the display panel 02 in the preceding embodiments of the present disclosure. The display device 01 may be a mobile phone, a computer, a television, a smart wearable display device or the like shown in FIG. 23, and not specifically limited in the embodiments of the present disclosure.

The pixel driving circuit has a serious flicker problem at a low frequency, and the reason for this technical problem is that: the pixel driving circuit generally includes a drive transistor, and a relatively serious leakage phenomenon exists at the gate of the drive transistor so that the potential of the gate of the drive transistor is unstable, and the potential of the gate of the drive transistor at a low refresh frequency greatly changes, thereby causing the drive current to greatly change, that is, resulting in the generation of flicker phenomenon in the light-emitting units The solutions provided by the present disclosure are as follows.

Figure 24:
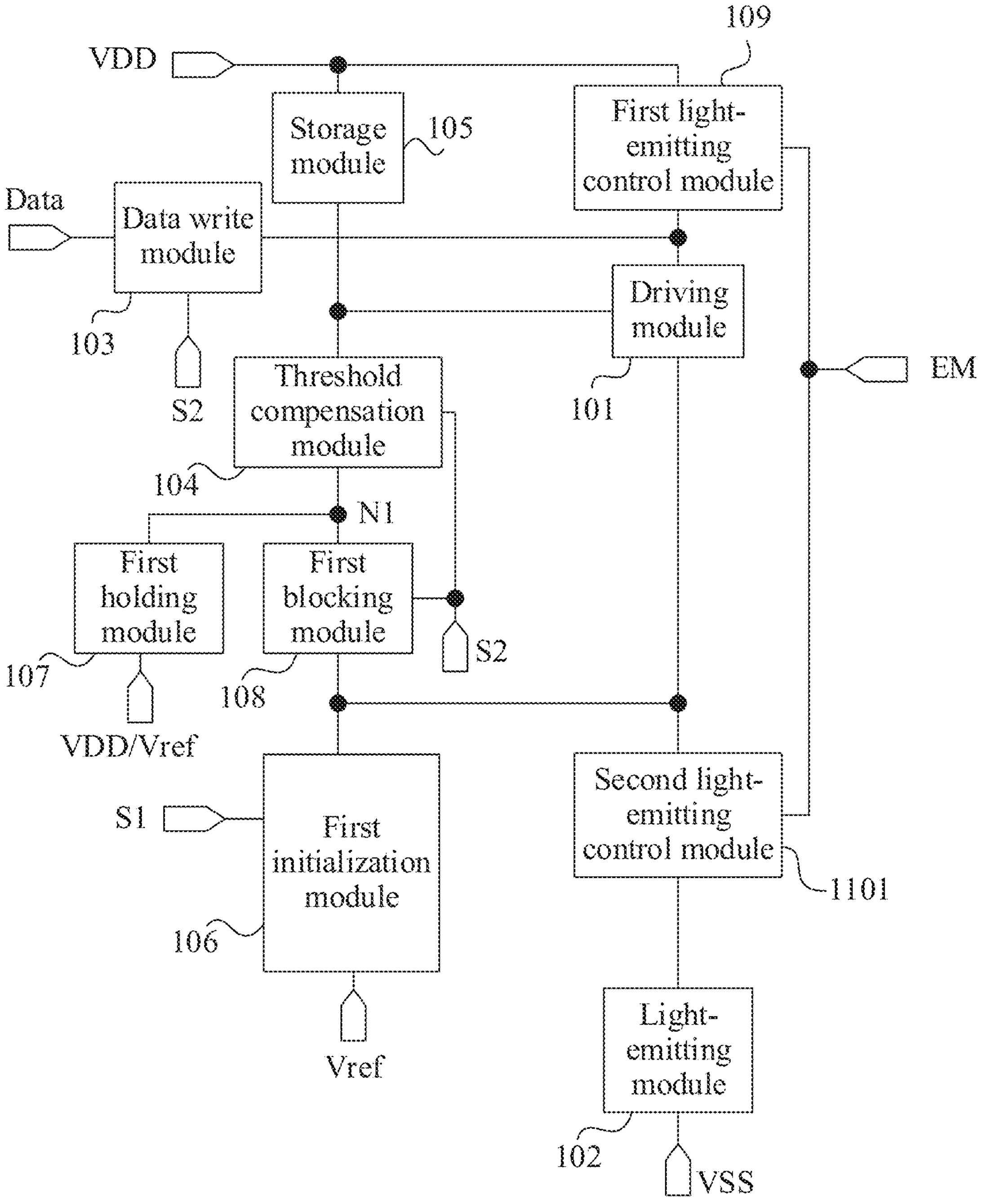
FIG. 24 is a circuit structure diagram of a pixel driving circuit according to another embodiment of the present disclosure.

FIG. 24 is a circuit structure diagram of a pixel driving circuit (i.e. a pixel circuit) according to another embodiment of the present disclosure. Referring to FIG. 24, the pixel driving circuit includes a driving module 101 configured to generate a drive current; a light-emitting module 102 configured to emit light in response to the drive current; a data write module 103 configured to write a voltage corresponding to a data signal to a control terminal of the driving module 101 in a charging stage; a threshold compensation module 104 configured to compensate for a threshold voltage of the driving module 101 in the charging stage and connected between an anti-leakage node N1 and the control terminal of the driving module 101; a storage module 105 configured to maintain the potential of the control terminal of the driving module 101; a first initialization module 106 configured to initialize the control terminal of the driving module 101 in an initialization stage and connected between an initialization signal input terminal Vref and the anti-leakage node N1; a first holding module 107 configured to hold the potential of the anti-leakage node N1; and a first blocking module 108 configured to block a conduction path between the anti-leakage node N1 and the light-emitting module 102 in a light-emitting stage.

Exemplarily, the light-emitting module 102 may be, for example, an OLED that is a current-type device and emits light in response to the drive current. When light-emitting currents are different, the OLED emits light with different brightness, and thus the brightness of the light emitted by the OLED can be controlled by controlling magnitude of the light-emitting current. That is, grayscales of the light emitted by the OLED can be controlled. A typical OLED may include an anode layer, a hole injection layer, a hole transport layer, an electron blocking layer, a light-emitting layer, a hole blocking layer, an electron transport layer, an electron injection layer, and a cathode layer stacked in sequence. Holes generated in the anode layer and electrons generated in the cathode layer are compounded in the light-emitting layer to generate excitons. The excitons are unstable and transit to radiate energy outward in the form of light. When the currents are different, the radiated light have different intensities. The working process of the pixel driving circuit includes at least the charging stage and the light-emitting stage. In the charging stage, the data write module 103 is on, the data signal (the data signal may be, for example, a data voltage) is input by a data signal input terminal Data. In this case, the driving module 101 is also on, and the data signal passes through the driving module 101, the first blocking module 108, and the threshold compensation module 104, so that the voltage corresponding to the data signal is written to the control terminal of the driving module 101. That is, the voltage written here to the control terminal of the driving module 101 can be a voltage subjected to threshold compensation and related to the data signal and the threshold voltage, making the potential of the control terminal of the driving module 101 change. When the potential of the control terminal of the driving module 101 changes to just enough to cause the driving module 101 to be turned off, writing of the data signal stops. In this case, the potential of the control terminal of the driving module 101 includes information on the threshold voltage of the driving module 101, and is stored in the storage module 105. In this embodiment of the present disclosure, the charging stage can also be called as a writing stage. The charging stage is the working stage of transmitting the voltage corresponding to the data signal to the control terminal of the driving module 101. In the charging stage, the potential of the control terminal of the driving module may variously change (i.e., increase or decrease). In the light-emitting stage, the driving module 101 generates the drive current. The storage module 105 maintains the potential of the control terminal of the driving module 101. According to the current formula of the driving module 101, the drive current generated by the driving module 101 is unrelated to the threshold voltage of the driving module 101, making the light-emitting module 101 stably emit light. Moreover, to ensure the driving module 101 to be smoothly turned on in the charging stage and eliminate the potential left at the control terminal of the driving module 101 in emitting light in the previous frame, the pixel driving circuit is further provided with a first initialization module 106. Typically, the initialization stage is set before the charging stage starts, an initialization signal is input by the initialization signal input terminal Vref to initialize the control terminal of the driving module 101. In this embodiment, the threshold compensation module 104 is connected between the anti-leakage node N1 and the control terminal of the driving module 101, and the first initialization module 106 is connected between the anti-leakage node N1 and the initialization signal input terminal Vref so that in the light-emitting stage, the control terminal of the driving module 101 has only one leakage path passing through the threshold compensation module 104, while the conventional pixel driving circuit has two leakage paths (one passing through the threshold compensation module and the other passing through the first initialization module). Therefore, in this embodiment, the leakage current can be greatly reduced. On the other hand, after the threshold compensation module 104 is turned off, the leakage current flows to the anti-leakage node N1, making the potential of the anti-leakage node N1 change. If the situation is not controlled, the change in the potential of the anti-leakage node N1 will be larger as the leakage time prolongs, thereby making the potential difference between the anti-leakage node N1 and the control terminal of the driving module 101 become larger, and increasing the leakage current. The increasing of the leakage current in turn speeds up the change in the potential of the anti-leakage node N1. In this manner, the drive current is extremely unstable, causing the light-emitting module to flicker. In this embodiment, the potential of the anti-leakage node N1 can be held by the first holding module 107 so that the potential difference between the anti-leakage node N1 and the control terminal of the driving module 101 is always held at a stable value, and the leakage current is also held at a stable value, thereby preventing the problem of the increase of leakage current caused by the prolonging of the leakage time. That is, the first holding module 107 is provided so that the leakage current of the control terminal of the driving module 101 can be reduced, thereby improving the flicker phenomenon and improving the display effect. Moreover, to prevent the potential of the anti-leakage node N1 in the light-emitting phase from affecting the light-emitting module 102, the conduction path between the anti-leakage node N1 and the light-emitting module 102 is blocked by the first blocking module 108, thereby ensuring the light-emitting module 102 to stably emit light. The signal connected to a control terminal of the threshold compensation module 104 is not specifically limited in the embodiments of the present disclosure as long as the threshold compensation module 104 can be turned on in the charging stage. Moreover, the position of the first blocking module 108 is not limited as shown in FIG. 24, and more connection modes of the first blocking module 108 will be described subsequently.

In the solutions of this embodiment, the pixel driving circuit includes: the driving module configured to generate the drive current; the light-emitting module configured to emit light in response to the drive current; the data write module configured to write the voltage corresponding to the data signal to the control terminal of the driving module in the charging stage; the threshold compensation module configured to compensate for the threshold voltage of the driving module in the charging stage and connected between the anti-leakage node and the control terminal of the driving module; the storage module configured to maintain the potential of the control terminal of the driving module; the first initialization module configured to initialize the control terminal of the driving module in the initialization stage and connected between the initialization signal input terminal and the anti-leakage node; the first holding module configured to hold the potential of the anti-leakage node; and the first blocking module configured to block the conduction path between the anti-leakage node and the light-emitting module in the light-emitting stage. In the light-emitting stage, the control terminal of the driving module has only one leakage path, so that the leakage current can be greatly reduced. Moreover, the first holding module is provided so that the potential of the anti-leakage node can be stabilized, that is, the potential difference between the control terminal of the driving module and the anti-leakage node is stabilized, preventing the leakage current from increasing, i.e., improving the leakage phenomenon and then improving the flicker phenomenon of the pixel driving circuit.

The present disclosure is described in conjunction with the circuit in this embodiment. As shown in FIG. 24, a first terminal of the first initialization module 106 is electrically connected to the initialization signal input terminal Vref. A control terminal of the first initialization module 106 is electrically connected to a first scan signal S1 of the pixel driving circuit. A first terminal of the data write module 103 is electrically connected to the data signal input terminal Data of the pixel driving circuit. A second terminal of the data write module 103 is electrically connected to a first terminal of the driving module 101. A control terminal of the data write module 103 is electrically connected to a second scan signal input terminal S2 of the pixel driving circuit. A first terminal of the storage module 105 is electrically connected to a first power-supply signal input terminal VDD of the pixel driving circuit. A second terminal of the storage module 105 is electrically connected to the control terminal of the driving module 101. The pixel driving circuit further includes a first light-emitting control module 109 and a second light-emitting control module 1101. A first terminal of the first light-emitting control module 109 is electrically connected to the first power-supply signal input terminal VDD. A second terminal of the first light-emitting control module 109 is electrically connected to the first terminal of the driving module 101. A control terminal of the first light-emitting control module 109 is electrically connected to an enable signal input terminal EM of the pixel driving circuit. A first terminal of the second light-emitting control module 1101 is electrically connected to a second terminal of the driving module 101. A second terminal of the second light-emitting control module 1101 is electrically connected to a first terminal of the light-emitting module 102. A control terminal of the second light-emitting control module 1101 is electrically connected to the enable signal input terminal EM. A second terminal of the light-emitting module 102 is electrically connected to a second power-supply signal input terminal VSS of the pixel driving circuit. A first terminal of the first holding module 107 is electrically connected to the initialization signal input terminal Vref or the first power-supply signal input terminal VDD. A second terminal of the first holding module 107 is electrically connected to the anti-leakage node N1.

Exemplarily, a fixed signal may be input in the first power-supply signal input terminal VDD. For example, a first power-supply signal may be input in the first power-supply signal input terminal VDD. A second power-supply signal may be input in the second power-supply signal input terminal VSS. The first power-supply signal and the second power-supply signal are at different high-low levels. Typically, it is possible to set the first power-supply signal at a high level and the second power-supply signal at a low level. In the initialization stage and the charging stage, the enable signal input terminal EM controls the first light-emitting control module 109 and the second light-emitting control module 1101 to be off, thereby preventing the light-emitting module 102 from mis-emitting light. In the light-emitting stage, the first light-emitting control module 109 and the second light-emitting control module 1101 are on to provide a voltage path for light emission of the light-emitting module 102, so that the drive current generated by the driving module 101 can flow to the light-emitting module 102; and the first terminal of the first holding module 107 can be connected to one constant potential. To reduce the number of signal lines in the pixel driving circuit, in this embodiment, the first terminal of the first holding module 107 may be connected to the first power-supply signal input terminal VDD or the initialization signal input terminal Vref.

Optionally, referring to FIG. 24, a first terminal of the first blocking module 108 is electrically connected to the anti-leakage node N1. A second terminal of the first blocking module 108 is electrically connected to a second terminal of the first initialization module 106 and a second terminal of the driving module 101. A control terminal of the first blocking module 108 is electrically connected to the second scan signal input terminal S2. A first terminal of the threshold compensation module 104 is electrically connected to the control terminal of the driving module 101. A second terminal of the threshold compensation module 104 is electrically connected to the anti-leakage node N1. The control terminal of the threshold compensation module 104 is electrically connected to the second scan signal input terminal S2.

Figure 25:
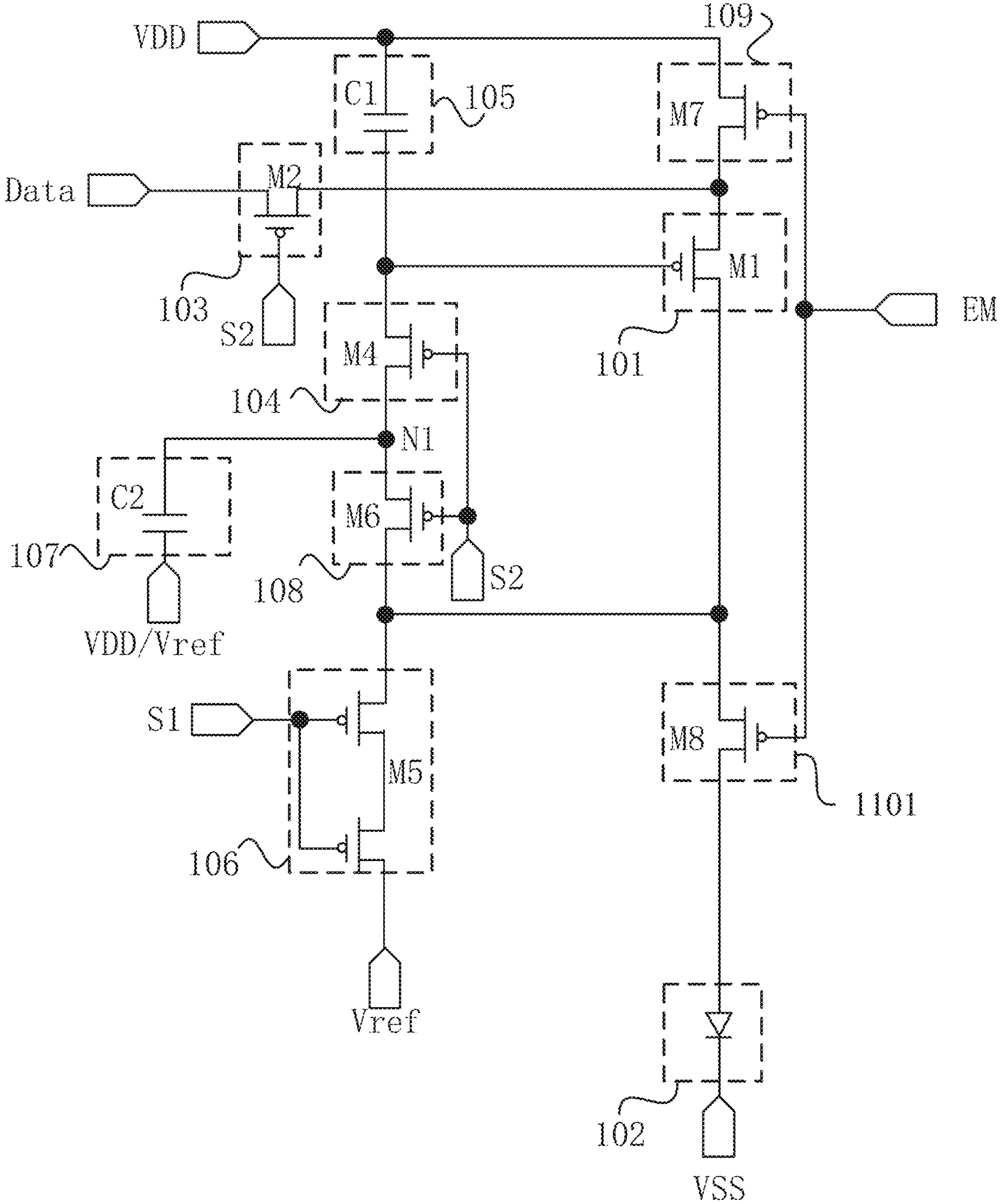
FIG. 25 is a circuit structure diagram of a pixel driving circuit according to another embodiment of the present disclosure.

Exemplarily, in this embodiment, the second terminal of the first initialization module 106 is electrically connected to the anti-leakage node N1 through the first blocking module 108. In the initialization stage, it is needed to turn on the first initialization module 106, the first blocking module 108, and the threshold compensation module 104 at the same time. Exemplarily, FIG. 25 is a circuit structure diagram of a pixel driving circuit according to another embodiment of the present disclosure. Referring to FIG. 25, the driving module 101 includes a first transistor M1. A first terminal of the first transistor M1 serves as the first terminal of the driving module 101. A second terminal of the first transistor M1 serves as the second terminal of the driving module 101. A control terminal of the first transistor M1 serves as the control terminal of the driving module 101. The light-emitting module 102 is an OLED. The data write module 103 includes a second transistor M2. A first terminal of the second transistor M2 serves as the first terminal of the data write module 103. A second terminal of the second transistor M2 serves as the second terminal of the data write module 103. A control terminal of the second transistor M2 serves as the control terminal of the data write module 103. The threshold compensation module 104 includes a third transistor M4. A first terminal of the third transistor M4 serves as the first terminal of the threshold compensation module 104. A second terminal of the third transistor M4 serves as the second terminal of the threshold compensation module 104. A control terminal of the third transistor M4 serves as the control terminal of the threshold compensation module 104. The storage module 105 includes a first capacitor C1. A first terminal of the first capacitor C1 serves as the first terminal of the storage module 105. A second terminal of the first capacitor C1 serves as the second terminal of the storage module 105. The first initialization module 106 includes a fifth transistor M5. A first terminal of the fifth transistor M5 serves as the first terminal of the first initialization module 106. A second terminal of the fifth transistor M5 serves as the second terminal of the first initialization module 106. A control terminal of the fifth transistor M5 serves as the control terminal of the first initialization module 106. The first holding module 107 includes a second capacitor C2. A first terminal of the second capacitor C2 serves as the first terminal of the first holding module 107. A second terminal of the second capacitor C2 serves as the second terminal of the first holding module 107. The first blocking module 108 includes a sixth transistor M6. A first terminal of the sixth transistor M6 serves as the first terminal of the first blocking module 108. A second terminal of the sixth transistor M6 serves as the second terminal of the first blocking module 108. A control terminal of the sixth transistor M6 serves as the control terminal of the first blocking module 108. The first light-emitting control module 109 includes a seventh transistor M7. A first terminal of the seventh transistor M7 serves as the first terminal of the first light-emitting control module 109. A second terminal of the seventh transistor M7 serves as the second terminal of the first light-emitting control module 109. A control terminal of the seventh transistor M7 serves as the control terminal of the first light-emitting control module 109. The second light-emitting control module 1101 includes an eighth transistor M8. A first terminal of the eighth transistor M8 serves as the first terminal of the second light-emitting control module 1101. A second terminal of the eighth transistor M8 serves as the second terminal of the second light-emitting control module 1101. A control terminal of the eighth transistor M8 serves as the control terminal of the second light-emitting control module 1101.

Exemplarily, the first to eighth transistors may all be P-type transistors or N-type transistors. The P-type transistors in the display panel are relatively mature in manufacturing and low in cost.

Figure 26:
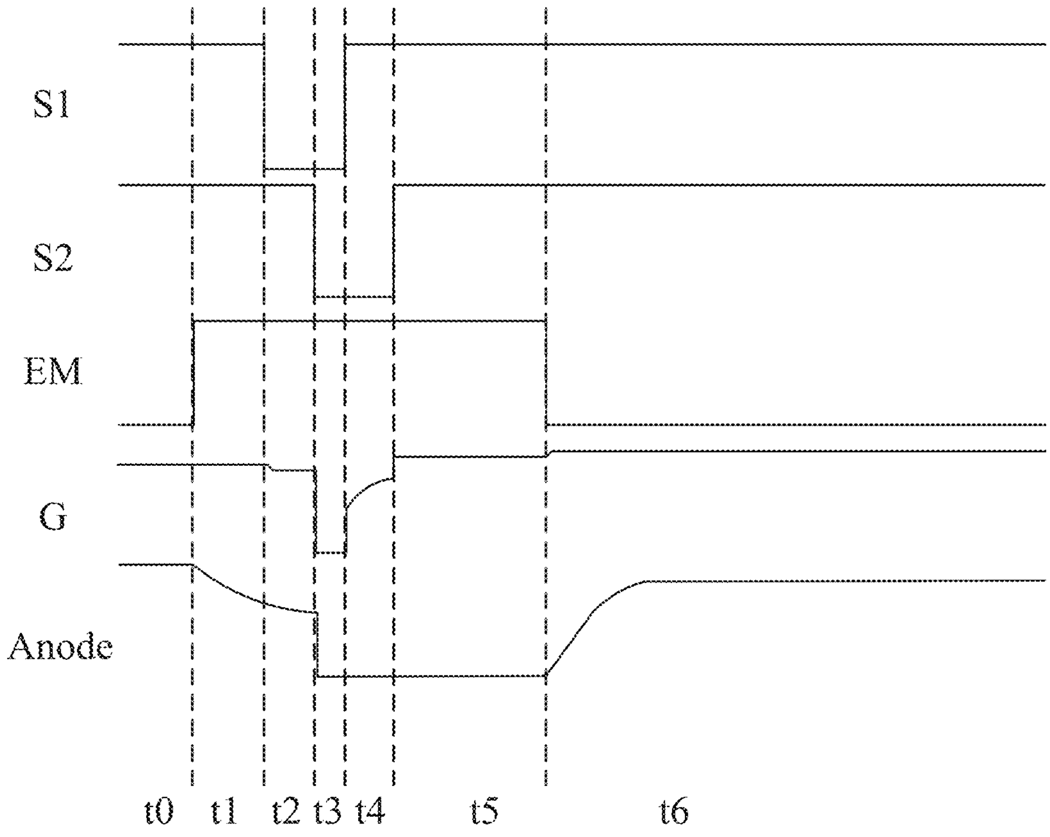
FIG. 26 is a timing diagram of a pixel driving circuit according to another embodiment of the present disclosure.

Therefore, optionally, the first to eighth transistors are all P-type transistors. The P-type transistors are characterized by being turned off when the control terminal is at a high level and being turned on when the control terminal is at a low level. Apparently, in some other embodiments, the first to eighth transistors may also be N-type transistors. In this case, it is needed to set each signal of the scan signals, the enable signals, and the power-supply signals in a polarity opposite to the polarity of the each signal when the first to eighth transistors are all P-type transistors. As shown in FIG. 26, FIG. 26 is a timing diagram of a pixel driving circuit according to another embodiment of the present disclosure. FIG. 26 may correspond to FIG. 25, where a waveform G is a waveform of the potential of the control terminal of the driving module 101, and a waveform Anode shows a waveform diagram of the drive current flowing through the light-emitting module 102. The working principle of the pixel driving circuit provided by the embodiments of the present disclosure is described below in conjunction with FIGS. 26 and 25.

Stage T0 is the light-emitting stage of a previous frame signal.

In stage T1, the rising edge of the enable signal input in the enable signal input terminal EM arrives. The first light-emitting control module 109 and the second light-emitting control module 1101 are off. The light-emitting module 102 stops emitting light, thereby turning on the display of a present frame.

Stage T2 is a first sub-stage of the initialization stage. In stage t2, the low level of the first scan signal input in the first scan signal input terminal S1 arrives. The first initialization module 106 is on. However, since the threshold compensation module 104 and the first blocking module 108 are located on the path of the first initialization module 106 for initializing the control terminal of the driving module 101, and the second scan signal input in the second scan signal input terminal S2 is at a high level (i.e., both the threshold compensation module 104 and the first blocking module 108 are off), the control terminal of the driving module is not initialized in stage t2.

Stage T3 is a stage where the charging stage overlap the initialization stage, that is, a second sub-stage of the initialization stage is also a first sub-stage of the charging stage. In this embodiment, the charging stage partially overlaps the initialization stage. That is, the stage T3 is provided in which the first scan signal input in the first scan signal input terminal S1 is at a low level, the first initialization module 106 is on, and the second scan signal input in the second scan signal input terminal S2 is also at a low level. Therefore, both the first blocking module 108 and the threshold compensation module 104 are on in the stage t3. The initialization signal input in the initialization signal input terminal Vref is written to the control terminal of the driving module 101, facilitating subsequently turning on the driving module 101. Moreover, in this case, a relatively large current passes through the driving module 101, preventing the driving module 101 from being in one state for a long time, thereby improving the problem of ghosting.

Stage T4 is a second sub-stage of the charging stage. In the stage T4, the first scan signal input in the first scan signal input terminal S1 is changed to a high level, the first initialization module 106 is off, and the second scan signal input in the second scan signal input terminal S2 is still at a low level. In this case, the data write module 103, the first blocking module 108, and the threshold compensation module 104 continue to be on. The data signal input in the data signal input terminal Data is written to the control terminal of the driving module 101 after passing through the driving module 101, the first blocking module 108, and the threshold compensation module 104, making the potential of the control terminal of the driving module 101 change. When the potential of the control terminal of the driving module 101 changes to allow the potential difference between the control terminal of the driving module 101 and the first terminal of the driving module 101 to be the threshold voltage of the driving module 101, the driving module 101 is turned off, and writing of the data signal stops. In this case, the potential of the control terminal of the driving module 101 is related to the threshold voltage of the driving module 101 and stored in the storage module 105.

In stage T5, both the first scan signal and the second scan signal are at high levels, and the enable signal input in the enable signal input terminal EM is also at a high level. The process goes to a light-emitting preparation stage.

In stage T6, the enable signal is changed to be at a low level. Both the first light-emitting control module 109 and the second light-emitting control module 1101 are on. The light-emitting module 102 starts to emit light, and in this stage, the drive current generated by the driving module 101 is unrelated to the threshold voltage of the driving module 101. Moreover, due to the holding effect of the first holding module 107, the potential of the anti-leakage node N1 is relatively stable so that the potential of the control terminal of the driving module 101 is also relatively stable. That is, the waveform G is relatively flat, thereby greatly improving the flicker problem.

In this embodiment, the initialization stage and the charging stage are provided to at least partially overlap each other so that the first scan signal and the second scan signal can be set as signals in one set. That is, the second scan signal may be obtained by shifting the first scan signal. In other words, only one gate in panel (GIP) circuit is needed to produce the scan signals required by the pixel driving circuit, and no additional GIP circuit is needed, facilitating implementing the narrow bezel of the display panel.

Optionally, in this embodiment, the first blocking module 108 and the threshold compensation module 104 may be composed of two sub-transistors of one double-gate transistor, respectively. That is, the third transistor M4 and the sixth transistor M6 are two sub-transistors of one double-gate transistor. That is, the first blocking module 108 includes a first sub-transistor of the one double-gate transistor, and the threshold compensation module 104 includes a second sub-transistor of the one double-gate transistor, thereby reducing the technique difficulty, saving the layout space, and reducing the leakage current. Moreover, the fifth transistor M5 constituting the first initialization module 106 may also be a double-gate transistor so that the leakage current can be reduced.

Optionally, the larger the capacitance of the second capacitor C2, the better the potential holding effect on the anti-leakage node N1. Therefore, the capacitance of the second capacitor C2 may be configured to be relatively large. Typically, for example, the capacitance of the second capacitor C2 may be configured to be larger than the capacitance of the storage module 105.

Figure 27:
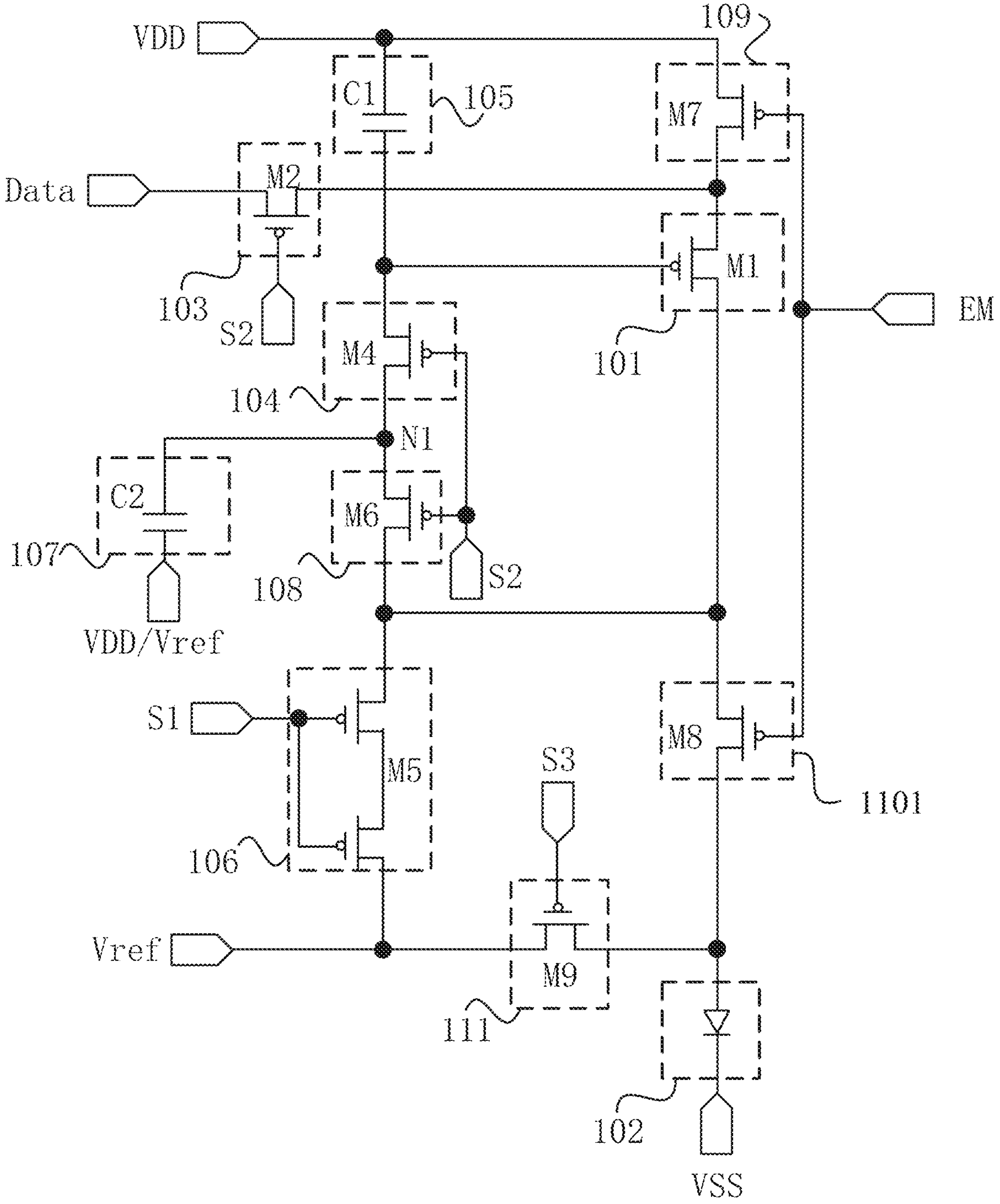
FIG. 27 is a circuit structure diagram of a pixel driving circuit according to another embodiment of the present disclosure.

Optionally, FIG. 27 is a circuit structure diagram of a pixel driving circuit according to another embodiment of the present disclosure. Referring to FIG. 27, the pixel driving circuit may further include a second initialization module 111. A first terminal of the second initialization module 111 is electrically connected to the initialization signal input terminal Vref. A second terminal of the second initialization module 111 is electrically connected to the first terminal of the light-emitting module 102. A control terminal of the second initialization module 111 is electrically connected to a third scan signal input terminal S3 of the pixel driving circuit.

Exemplarily, the second initialization module 111 may include a ninth transistor M9. A first terminal of the ninth transistor M9 serves as the first terminal of the second initialization module 111. A second terminal of the ninth transistor M9 serves as the second terminal of the second initialization module 111. A control terminal of the ninth transistor M9 serves as the control terminal of the second initialization module 111. The ninth transistor M9 may be, for example, a P-type transistor. The second initialization module 111 is configured to initialize the light-emitting module 102 to prevent the potential left on the light-emitting module 102 of the previous frame from affecting emitting light of the present frame. A third scan signal input in the third scan signal input terminal S3 controls the second initialization module 111 to be turned on or turned off. The third scan signal may be multiplexed by the first scan signal, may be multiplexed by the second scan signal, or may be one additional scan signal. Moreover, the one additional scan signal and the first scan signal are signals shifted from each other as long as the light-emitting module 102 is reset before the light-emitting stage.

Figure 28:
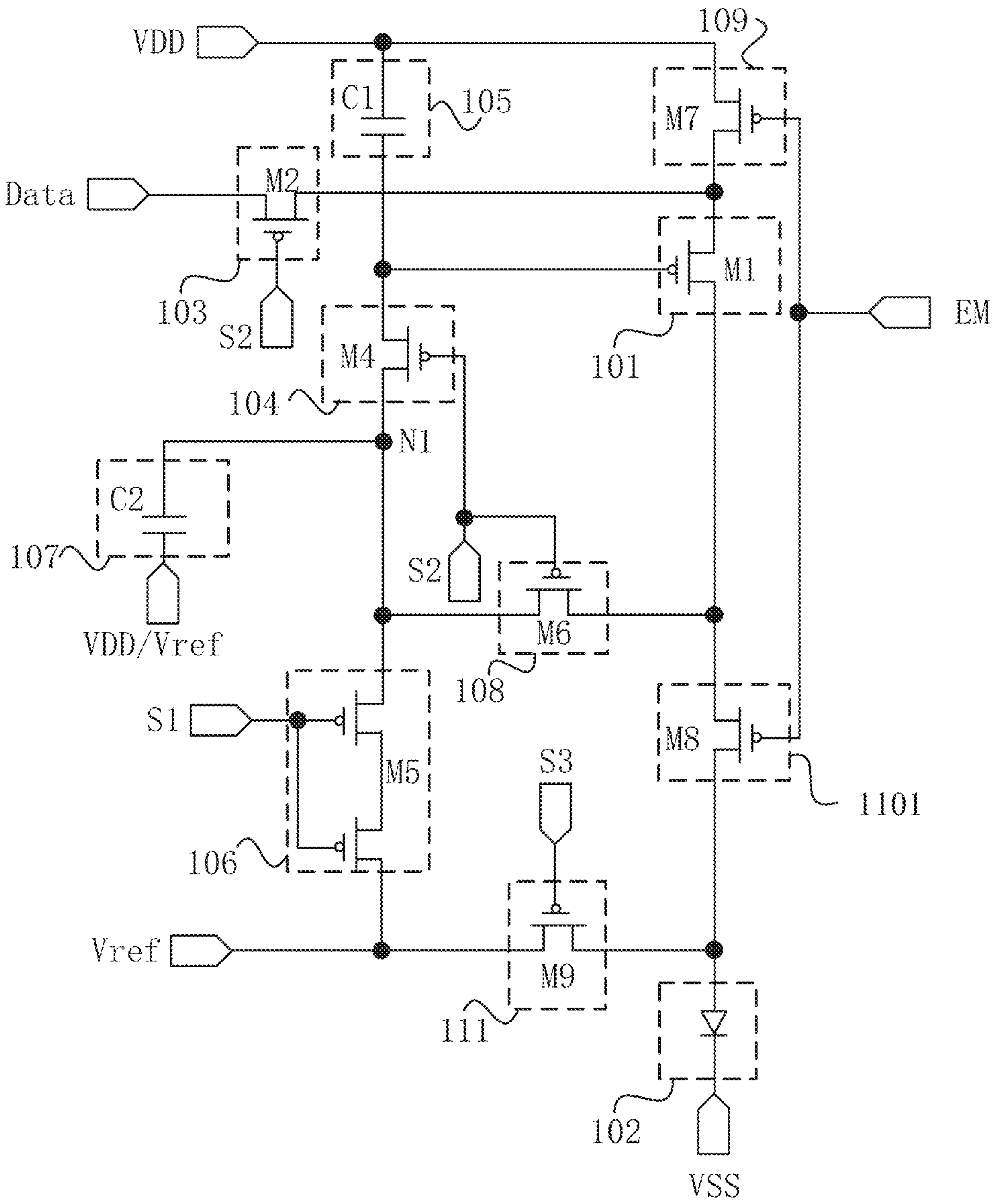
FIG. 28 is a circuit structure diagram of another pixel driving circuit according to another embodiment of the present disclosure.

Optionally, FIG. 28 is a circuit structure diagram of another pixel driving circuit according to another embodiment of the present disclosure. Referring to FIG. 28, the difference from the pixel driving circuit shown in FIG. 27 is that: The first blocking module 108 of the pixel driving circuit in this embodiment is connected between the anti-leakage node N1 and the second terminal of the driving module 101. That is, the second terminal of the threshold compensation module 104 is electrically connected to the anti-leakage node N1. The first terminal of the first blocking module 108 is electrically connected to the anti-leakage node N1. The second terminal of the first blocking module 108 is electrically connected to the second terminal of the driving module 101. The control terminal of the first blocking module 108 is electrically connected to the second scan signal input terminal S2. The second terminal of the first initialization module 106 is electrically connected to the anti-leakage node N1. The timing diagram in the pixel driving circuit of this embodiment is the same as the timing diagram of FIG. 26. The working principle of the pixel driving circuit in this embodiment is also the same as the working principle of the pixel driving circuit shown in FIG. 27. Details are not repeated herein.

Figure 29:
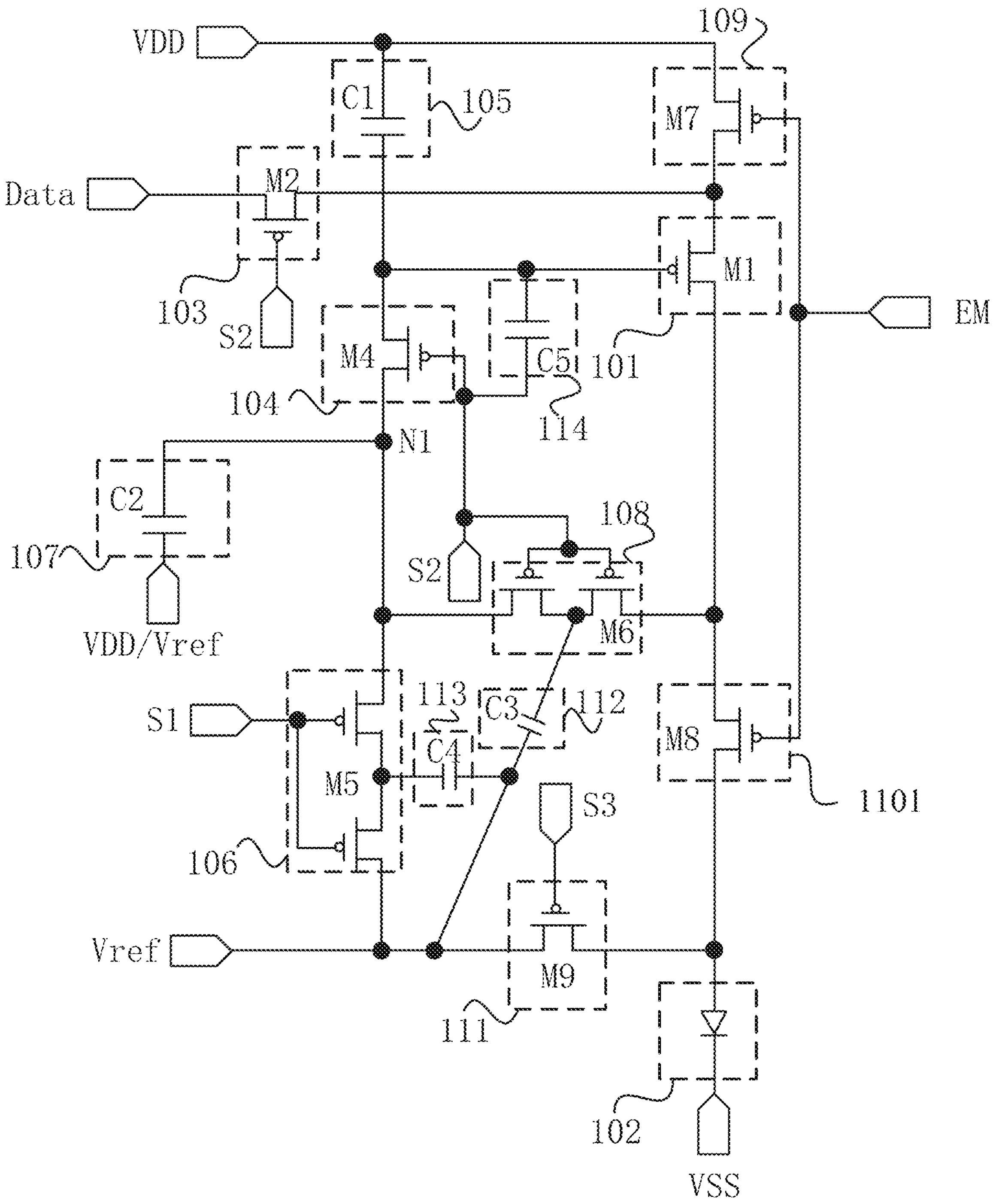
FIG. 29 is a circuit structure diagram of another pixel driving circuit according to another embodiment of the present disclosure.

Optionally, FIG. 29 is a circuit structure diagram of another pixel driving circuit according to another embodiment of the present disclosure. Referring to FIG. 29, the first blocking module 108 is a first double-gate transistor. The pixel driving circuit further includes a third holding module 112 configured to hold the potential of a double-gate node of the first double-gate transistor.

Exemplarily, the double-gate node of the first double-gate transistor is a node where source drains of two sub-transistors of the first double-gate transistor are connected. When the double-gate transistor is turned off, the potential of the double-gate node of the double-gate transistor is unstable. If the double-gate node is not held at one potential, the leakage of the anti-leakage node N1 through the double-gate node will be more serious. Therefore, in this embodiment, the third holding module 112 may be provided at the double-gate node to hold the potential of the double-gate node of the first double-gate transistor, thereby holding the potential of the anti-leakage node N1 stable. Exemplarily, the third holding module 112 may include a third capacitor C3. A first terminal of the third capacitor C3 is electrically connected to the double-gate node of the first double-gate transistor. A second terminal of the third capacitor C3 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel. Moreover, although the case where the first blocking module 108 shown in FIG. 29 is a double-gate transistor is used as an example, in other embodiments, it is also possible to set the first blocking module 108 shown in FIG. 27 as a double-gate transistor.

Optionally, referring to FIG. 29, the first initialization module 106 is a second double-gate transistor. The pixel driving circuit further includes a fourth holding module 113 configured to hold the potential of a double-gate node of the second double-gate transistor.

Exemplarily, the double-gate node of the second double-gate transistor, i.e. a node where source drains of two sub-transistors of the second double-gate transistor are connected. When the double-gate transistor is turned off, the potential of the double-gate node of the second double-gate transistor is unstable. If the double-gate node is not held at one potential, the leakage of the anti-leakage node N1 through the double-gate node will be more serious. Therefore, in this embodiment, the fourth holding module 113 may be provided at the double-gate node of the second double-gate transistor to hold the potential of the double-gate node of the second double-gate transistor, thereby holding the potential of the anti-leakage node N1 stable. Exemplarily, the fourth holding module 113 may include a fourth capacitor C4. A first terminal of the fourth capacitor C4 is electrically connected to the double-gate node of the second double-gate transistor. A second terminal of the fourth capacitor C4 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel.

Optionally, referring to FIG. 29, the pixel driving circuit further includes a coupling module 114 configured to adjust the potential of the control terminal of the driving module 101. A first terminal of the coupling module 114 is electrically connected to the control terminal of the driving module 101. A second terminal of the coupling module 114 is electrically connected to the control terminal of the threshold compensation module 104.

Exemplarily, in this embodiment, the coupling module 114 may include a fifth capacitor C5. A first terminal of the fifth capacitor C5 serves as the first terminal of the coupling module 114. A second terminal of the fifth capacitor C5 serves as the second terminal of the coupling module 114. The fifth capacitor C5 is equivalent to increasing the capacitance of the storage module, facilitating maintaining the stability of the potential of the control terminal of the driving module 101, thereby facilitating reducing the flicker phenomenon. On the other hand, the coupling module 114 is connected to the control terminal of the threshold compensation module 104, so when the potential of the control terminal of the threshold compensation module 104 is changed from a low level to a high level, it is also possible to increase the potential of the control terminal of the driving module 101, thereby compensating for the loss of the potential of the control terminal of the driving module 101, and maintaining the stability of the potential of the control terminal of the driving module 101.

Optionally, to ensure that the third holding module 112, the fourth holding module 113, and the coupling module 114 have a good holding effect, the third capacitor C3, the fourth capacitor C4, and the fifth capacitor C5 may be set to be relatively large. Typically, the third capacitor C3, the fourth capacitor C4, and the fifth capacitor C5 may be set to be larger than the capacitance of the storage module 105, thereby reducing the effect of the leakage current on the potential of the corresponding node, i.e. having a good potential holding effect on this node.

Figure 30:
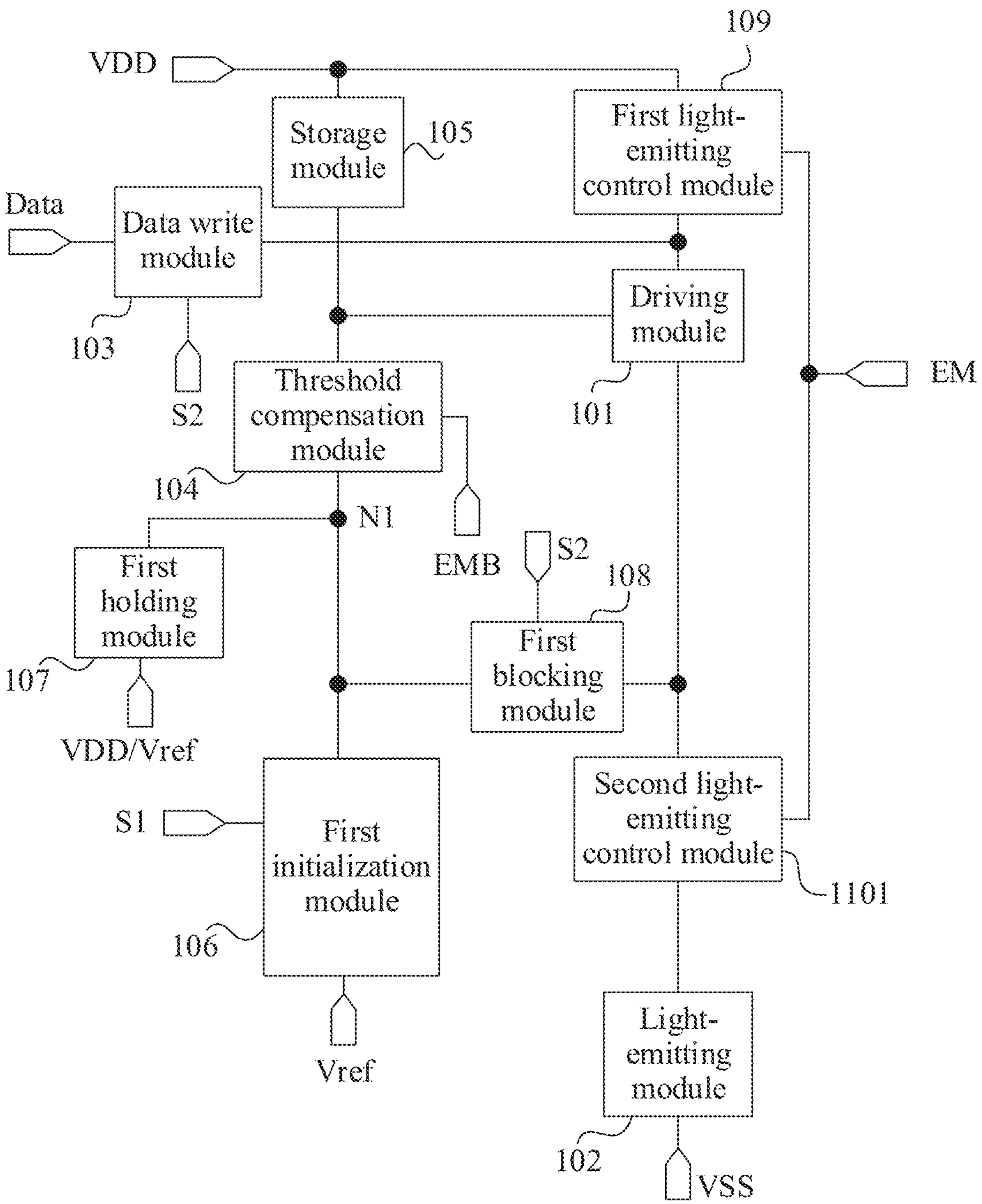
FIG. 30 is a circuit structure diagram of a pixel driving circuit according to another embodiment of the present disclosure.

FIG. 30 is a circuit structure diagram of a pixel driving circuit according to another embodiment of the present disclosure. Referring to FIG. 30, in this embodiment, parts having the same connection relationship of the pixel driving circuit as that in the preceding embodiments are that: The first terminal of the first initialization module 106 is electrically connected to the initialization signal input terminal Vref. The control terminal of the first initialization module 106 is electrically connected to the first scan signal S1 of the pixel driving circuit. The first terminal of the data write module 103 is electrically connected to the data signal input terminal Data of the pixel driving circuit. The second terminal of the data write module 103 is electrically connected to the first terminal of the driving module 101. The control terminal of the data write module 103 is electrically connected to the second scan signal input terminal S2 of the pixel driving circuit. The first terminal of the storage module 105 is electrically connected to the first power-supply signal input terminal VDD of the pixel driving circuit. The second terminal of the storage module 105 is electrically connected to the control terminal of the driving module 101. The pixel driving circuit further includes the first light-emitting control module 109 and the second light-emitting control module 1101. The first terminal of the first light-emitting control module 109 is electrically connected to the first power-supply signal input terminal VDD. The second terminal of the first light-emitting control module 109 is electrically connected to the first terminal of the driving module 101. The control terminal of the first light-emitting control module 109 is electrically connected to the enable signal input terminal EM of the pixel driving circuit. The first terminal of the second light-emitting control module 1101 is electrically connected to the second terminal of the driving module 101. The second terminal of the second light-emitting control module 1101 is electrically connected to the first terminal of the light-emitting module 102. The control terminal of the second light-emitting control module 1101 is electrically connected to the enable signal input terminal EM. The second terminal of the light-emitting module 102 is electrically connected to the second power-supply signal input terminal VSS of the pixel driving circuit. The first terminal of the first holding module 107 is electrically connected to the initialization signal input terminal Vref or the first power-supply signal input terminal VDD. The second terminal of the first holding module 107 is electrically connected to the anti-leakage node N1. The first terminal of the first holding module 107 is connected to one fixed-potential signal. In this embodiment, to facilitate wiring and reduce the number of signal lines, the first terminal of the first holding module 107 is connected to the initialization signal input terminal Vref or the first power-supply signal input terminal VDD.

Moreover, in this embodiment, the first terminal of the threshold compensation module 104 is electrically connected to the control terminal of the driving module 101. The second terminal of the threshold compensation module 104 is electrically connected to the anti-leakage node N1. The control terminal of the threshold compensation module 104 is electrically connected to a long scan signal input terminal EMB of the pixel driving circuit. The first terminal of the first blocking module 108 is electrically connected to the anti-leakage node N1. The second terminal of the first blocking module 108 is electrically connected to the second terminal of the driving module 101. The control terminal of the first blocking module 108 is electrically connected to the second scan signal input terminal S2. The long scan signal input terminal EMB is set to input a conduction signal in each of the initialization stage and the charging stage.

Exemplarily, in this embodiment, the first scan signal input in the first scan signal input terminal S1 and the second scan signal input in the second scan signal input terminal S2 are scan signals in the same set. That is, the first scan signal and the second scan signal are generated by the same set of GIP circuits. The first scan signal and the second scan signal have the same pulse widths and shifted from each other. Moreover, the pulse width of the long scan signal input in the long scan signal input terminal EMB is relatively long, and the duration of the pulse width covers at least the initialization stage and the charging stage. In the initialization stage, both the threshold compensation module 104 and the first initialization module 106 are on so that the initialization signal is input in the control terminal of the driving module 101 to initialize the control terminal of the driving module 101 and facilitate turning on the driving module 101 in the charging stage. In the charging stage, the data write module 103, the first blocking module 108, and the threshold compensation module 104 are all on so that the data signal, after passing through the data write module 103, the driving module 101, the first blocking module 108, and the threshold compensation module 104, is written to the control terminal of the driving module 101. When the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105. In the light-emitting stage, the driving module generates the drive current unrelated to the threshold voltage of the driving module 101, thereby controlling the light-emitting module to emit light. In the pixel driving circuit of this embodiment, in addition to having only one leakage current path and being able to hold the potential of the anti-leakage node N1, new scan signals are additionally provided at the control terminal of the threshold compensation module 104. Therefore, it is possible to ensure both the initialization stage and the charging stage to have a relatively long time, and thus the driving module 101 can be sufficiently initialized and charged. The conduction signal indicates that it is possible to control the corresponding module to be turned on.

Figure 31:
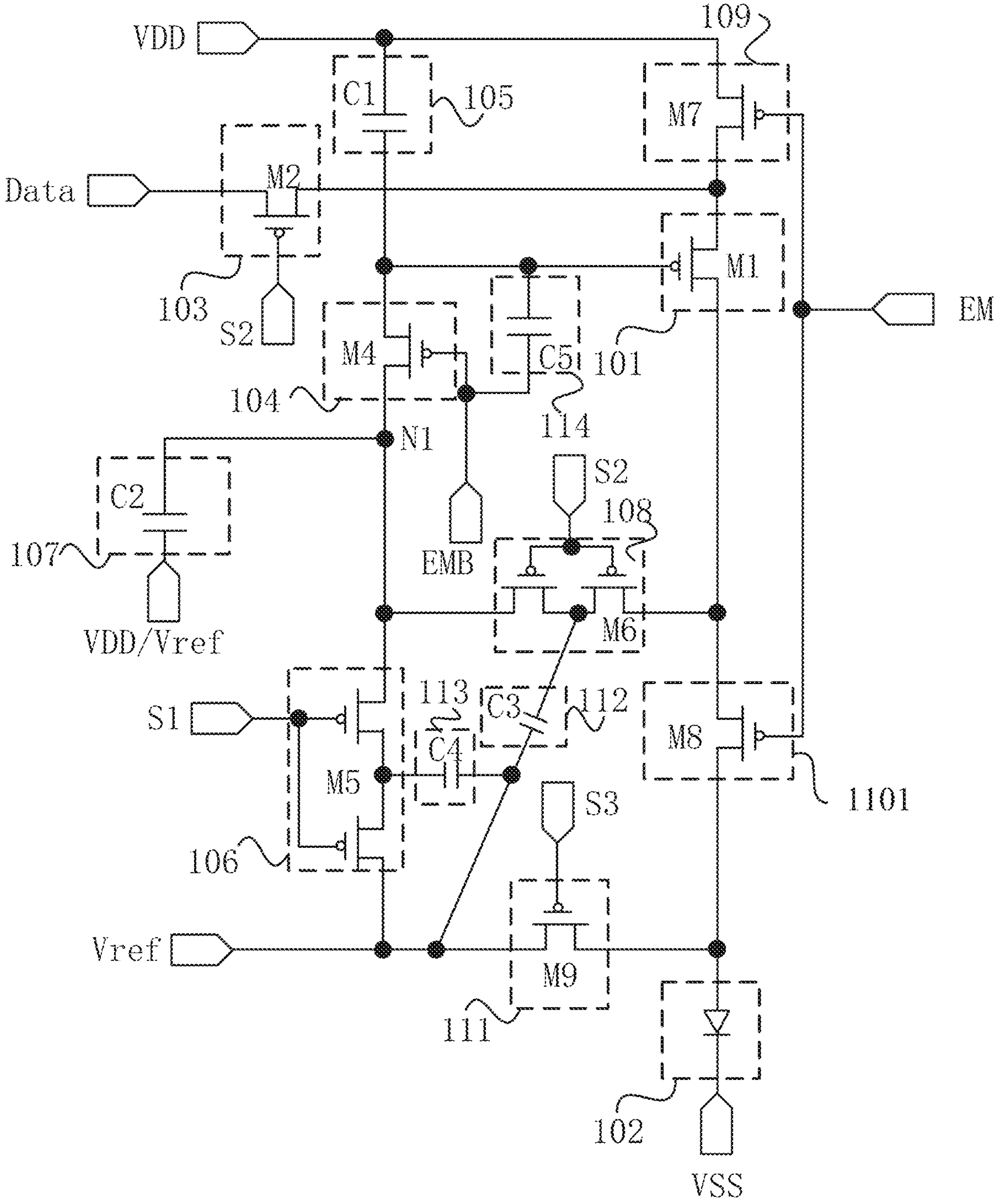
FIG. 31 is a circuit structure diagram of another pixel driving circuit according to another embodiment of the present disclosure.
Figure 32:
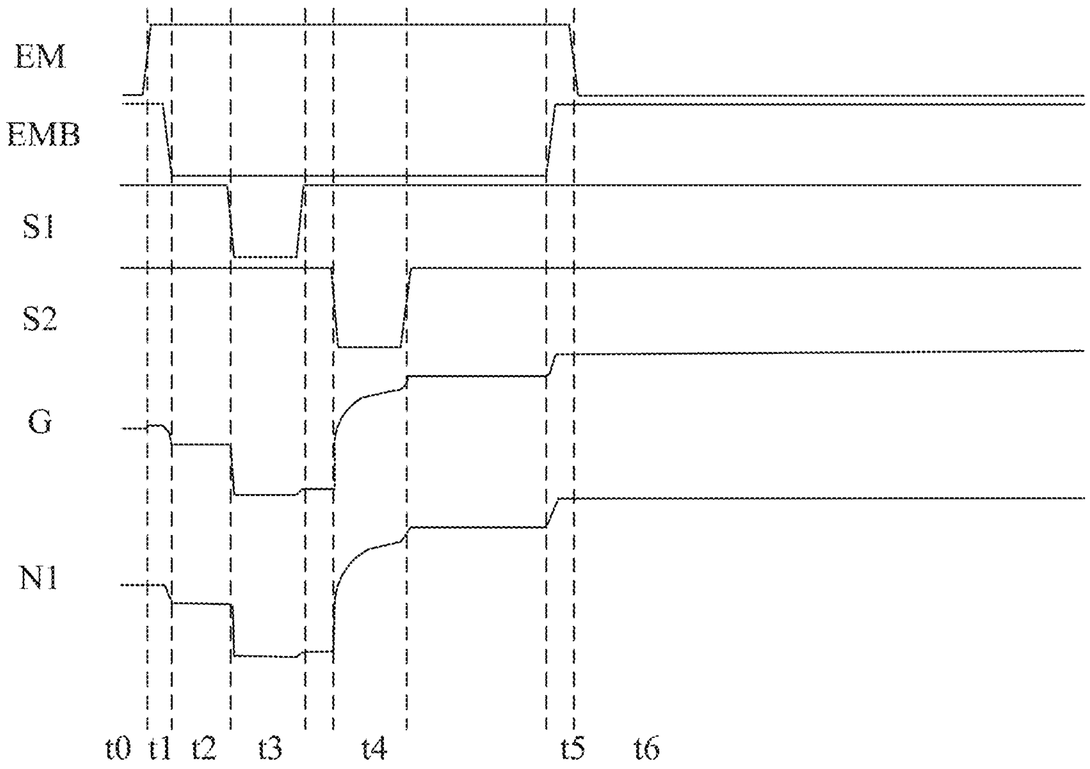
FIG. 32 is a timing diagram of a pixel driving circuit according to another embodiment of the present disclosure.

Exemplarily, FIG. 31 is a circuit structure diagram of another pixel driving circuit according to another embodiment of the present disclosure. FIG. 32 is a timing diagram of a pixel driving circuit according to another embodiment of the present disclosure. FIG. 32 corresponds to FIG. 31. In conjunction with FIGS. 31 and 32, the driving module 101 includes a first transistor M1. A first terminal of the first transistor M1 serves as the first terminal of the driving module 101. A second terminal of the first transistor M1 serves as the second terminal of the driving module 101. A control terminal of the first transistor M1 serves as the control terminal of the driving module 101. The light-emitting module 102 is the OLED. The data write module 103 includes a second transistor M2. A first terminal of the second transistor M2 serves as the first terminal of the data write module 103. A second terminal of the second transistor M2 serves as the second terminal of the data write module 103. A control terminal of the second transistor M2 serves as the control terminal of the data write module 103. The threshold compensation module 104 includes a third transistor M4. A first terminal of the third transistor M4 serves as the first terminal of the threshold compensation module 104. A second terminal of the third transistor M4 serves as the second terminal of the threshold compensation module 104. A control terminal of the third transistor M4 serves as the control terminal of the threshold compensation module 104. The storage module 105 includes a first capacitor C1. A first terminal of the first capacitor C1 serves as the first terminal of the storage module 105. A second terminal of the first capacitor C1 serves as the second terminal of the storage module 105. The first initialization module 106 includes a fifth transistor M5. A first terminal of the fifth transistor M5 serves as the first terminal of the first initialization module 106. A second terminal of the fifth transistor M5 serves as the second terminal of the first initialization module 106. A control terminal of the fifth transistor M5 serves as the control terminal of the first initialization module 106. The first holding module 107 includes a second capacitor C2. A first terminal of the second capacitor C2 serves as the first terminal of the first holding module 107. A second terminal of the second capacitor C2 serves as the second terminal of the first holding module 107. The first blocking module 108 includes a sixth transistor M6. A first terminal of the sixth transistor M6 serves as the first terminal of the first blocking module 108. A second terminal of the sixth transistor M6 serves as the second terminal of the first blocking module 108. A control terminal of the sixth transistor M6 serves as the control terminal of the first blocking module 108. The first light-emitting control module 109 includes a seventh transistor M7. A first terminal of the seventh transistor M7 serves as the first terminal of the first light-emitting control module 109. A second terminal of the seventh transistor M7 serves as the second terminal of the first light-emitting control module 109. A control terminal of the seventh transistor M7 serves as the control terminal of the first light-emitting control module 109. The second light-emitting control module 1101 includes an eighth transistor M8. A first terminal of the eighth transistor M8 serves as the first terminal of the second light-emitting control module 1101. A second terminal of the eighth transistor M8 serves as the second terminal of the second light-emitting control module 1101. A control terminal of the eighth transistor M8 serves as the control terminal of the second light-emitting control module 1101.

Exemplarily, the first transistor to the eighth transistor may all be P-type transistors or N-type transistors. The P-type transistors in the display panel are relatively mature in manufacturing and low in cost. Therefore, optionally, the first transistor to the eighth transistor are all P-type transistors. The P-type transistors are characterized by turning off when the control terminal is at a high level and turning on when the control terminal is at a low level. Apparently, in some other embodiments, the first transistor to the eighth transistor may also be N-type transistors. In this case, it is needed to set each signal of the scan signals, the enable signals, and the power-supply signals in a polarity opposite to the polarity of the each signal when the first transistor to the eighth transistor are all P-type transistors. The working principle of the pixel driving circuit provided by the embodiments of the present disclosure will be described below in conjunction with FIGS. 31 and 32.

Stage T0 is the light-emitting stage of a previous frame signal.

In stage T1, the rising edge of the enable signal input in the enable signal input terminal EM arrives. The first light-emitting control module 109 and the second light-emitting control module 1101 are off. The light-emitting module 102 stops emitting light, thereby turning on the display of the present frame.

In stage T2, the falling edge of a long scan signal arrives. The threshold compensation module 104 is on to facilitate subsequent initialization and charging. The threshold compensation module 104 is turned on before the initialization stage, it is possible to ensure the longest initialization time and the initialization effect.

Stage T3 is the initialization stage. That is, in the stage t3, both the long scan signal and the first scan signal are at low levels. Both the threshold compensation module 104 and the first initialization module 106 are on. The initialization signal is written to the control terminal of the driving module 101 to initialize the driving module 101 to ensure the driving module 101 to be turned on in the charging stage.

Stage T4 is the charging stage. In the stage T4, the first scan signal input in the first scan signal input terminal S1 is changed to a high level. The first initialization module 106 is off. However, the second scan signal input in the second scan signal input terminal S2 is at a low level. In this case, the data write module 103, and the first blocking module 108 are on. Since the long scan signal is still at a low level, the threshold compensation module 104 continues to be on. The data signal input in the data signal input terminal Data, after passing through the driving module 101, the first blocking module 108, and the threshold compensation module 104, is written to the control terminal of the driving module 101, making the potential of the control terminal of the driving module 101 change. When the potential of the control terminal of the driving module 101 changes so that the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105.

In stage T5, both the first scan signal and the second scan signal are at high levels. The enable signal input in the enable signal input terminal EM is also at a high level. The process goes to a light-emitting preparation stage.

In stage T6, the enable signal is changed to be at a low level. Both the first light-emitting control module 109 and the second light-emitting control module 1101 are on. The light-emitting module 102 starts to emit light, and the drive current does not change with the drift of the threshold voltage of the driving module, making the light-emitting module have a better light-emitting stability. Moreover, due to the holding effect of the first holding module 107, the potential of the anti-leakage node N1 is relatively stable so that the potential of the control terminal of the driving module 101 is also relatively stable. That is, the waveform G of the control terminal of the driving module 101 is relatively flat, thereby greatly improving the flicker problem.

Optionally, referring to FIG. 8, the pixel driving circuit may further include a second initialization module 111. A first terminal of the second initialization module 111 is electrically connected to the initialization signal input terminal Vref. A second terminal of the second initialization module 111 is electrically connected to the first terminal of the light-emitting module 102. A control terminal of the second initialization module 111 is electrically connected to a third scan signal input terminal S3 of the pixel driving circuit.

Exemplarily, the second initialization module 111 may include a ninth transistor M9. A first terminal of the ninth transistor M9 serves as the first terminal of the second initialization module 111. A second terminal of the ninth transistor M9 serves as the second terminal of the second initialization module 111. A control terminal of the ninth transistor M9 serves as the control terminal of the second initialization module 111. The ninth transistor M9 may be, for example, a P-type transistor. The second initialization module 111 is configured to initialize the light-emitting module 102 to prevent the potential left on the light-emitting module 102 of the previous frame from affecting emitting light of the present frame. A third scan signal input in the third scan signal input terminal S3 controls the second initialization module 111 to be turned on or turned off. The third scan signal may be multiplexed by the first scan signal, may be multiplexed by the second scan signal, or may be one additional scan signal. Moreover, the one additional scan signal and the first scan signal are signals shifted from each other as long as the light-emitting module 102 is reset before the light-emitting stage.

Optionally, referring to FIG. 31, the first blocking module 108 is a first double-gate transistor.

The pixel driving circuit further includes a third holding module 112 configured to hold the potential of a double-gate node of the first double-gate transistor.

Exemplarily, the double-gate node of the first double-gate transistor is a node where source drains of two sub-transistors of the first double-gate transistor are connected. When the double-gate transistor is turned off, the potential of the double-gate node of the double-gate transistor is unstable. If the double-gate node is not held at one potential, the leakage of the anti-leakage node N1 through the double-gate node will be more serious. Therefore, in this embodiment, the third holding module 112 may be provided at the double-gate node to hold the potential of the double-gate node of the first double-gate transistor, thereby holding the potential of the anti-leakage node N1 stable. Exemplarily, the third holding module 112 may include a third capacitor C3. A first terminal of the third capacitor C3 is electrically connected to the double-gate node of the first double-gate transistor. A second terminal of the third capacitor C3 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel.

Optionally, referring to FIG. 31, the first initialization module 106 is a second double-gate transistor. The pixel driving circuit further includes a fourth holding module 113 configured to hold the potential of a double-gate node of the second double-gate transistor.

Exemplarily, the double-gate node of the second double-gate transistor, i.e. a node where source drains of two sub-transistors of the second double-gate transistor are connected. When the double-gate transistor is turned off, the potential of the double-gate node of the second double-gate transistor is unstable. If the double-gate node is not held at one potential, the leakage of the anti-leakage node N1 through the double-gate node will be more serious. Therefore, in this embodiment, the fourth holding module 113 may be provided at the double-gate node of the second double-gate transistor to hold the potential of the double-gate node of the second double-gate transistor, thereby holding the potential of the anti-leakage node N1 stable. Exemplarily, the fourth holding module 113 may include a fourth capacitor C4. A first terminal of the fourth capacitor C4 is electrically connected to the double-gate node of the second double-gate transistor. A second terminal of the fourth capacitor C4 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel.

Optionally, referring to FIG. 31, the pixel driving circuit further includes a coupling module 114 configured to hold the potential of the control terminal of the driving module 101. A first terminal of the coupling module 114 is electrically connected to the control terminal of the driving module 101. A second terminal of the coupling module 114 is electrically connected to the control terminal of the threshold compensation module 104.

Exemplarily, in this embodiment, the coupling module 114 may include a fifth capacitor C5. A first terminal of the fifth capacitor C5 serves as the first terminal of the coupling module 114. A second terminal of the fifth capacitor C5 serves as the second terminal of the coupling module 114. The fifth capacitor C5 is equivalent to increasing the capacitance of the storage module, facilitating maintaining the stability of the potential of the control terminal of the driving module 101, thereby facilitating reducing the flicker phenomenon. On the other hand, the coupling module 114 is connected to the control terminal of the threshold compensation module 104, so when the potential of the control terminal of the threshold compensation module 104 is changed from a low level to a high level, it is also possible to increase the potential of the control terminal of the driving module 101, thereby compensating for the loss of the potential of the control terminal of the driving module 101, and maintaining the stability of the potential of the control terminal of the driving module 101. For ease of wiring, the second terminal of the fifth capacitor C5 is electrically connected to the control terminal of the threshold compensation module 104.

In this embodiment, the third capacitor C3, the fourth capacitor C4, and the fifth capacitor C5 can both stabilize potentials of the corresponding nodes and reduce the amplitude of the capacitor coupling.

Figure 33:
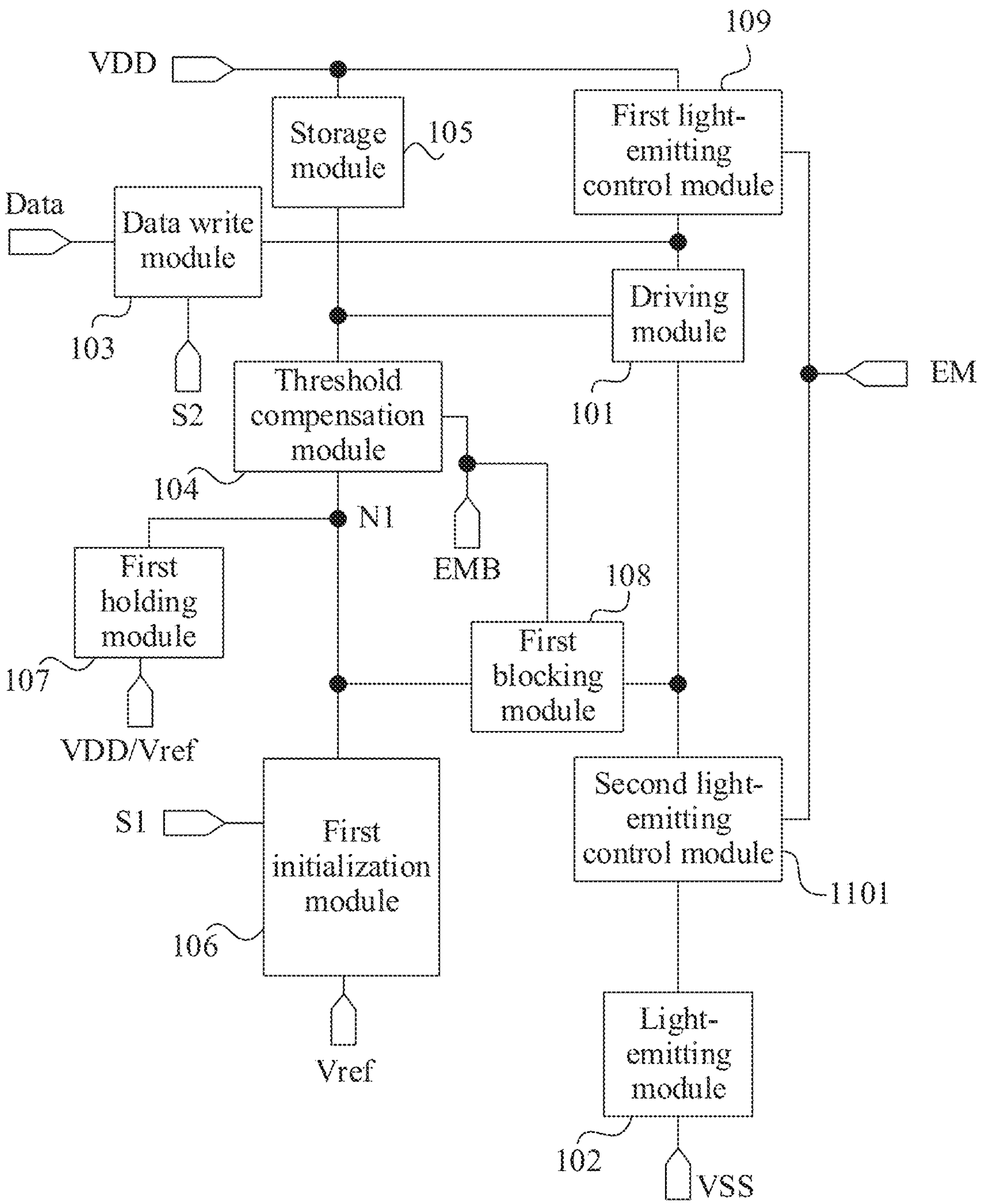
FIG. 33 is a circuit structure diagram of a pixel driving circuit according to another embodiment of the present disclosure.

FIG. 33 is a circuit structure diagram of a pixel driving circuit according to another embodiment of the present disclosure. Referring to FIG. 33, the difference from the pixel driving circuit shown in the preceding embodiments is that: The control terminal of the first blocking module 108 in the pixel driving circuit of this embodiment is also electrically connected to a long scan signal input terminal EMB. The connection relationship of the pixel driving circuit in this embodiment is that: The first terminal of the first initialization module 106 is electrically connected to the initialization signal input terminal Vref. The control terminal of the first initialization module 106 is electrically connected to the first scan signal S1 of the pixel driving circuit. The first terminal of the data write module 103 is electrically connected to the data signal input terminal Data of the pixel driving circuit. The second terminal of the data write module 103 is electrically connected to the first terminal of the driving module 101. The control terminal of the data write module 103 is electrically connected to the second scan signal input terminal S2 of the pixel driving circuit. The first terminal of the storage module 105 is electrically connected to the first power-supply signal input terminal VDD of the pixel driving circuit. The second terminal of the storage module 105 is electrically connected to the control terminal of the driving module 101. The pixel driving circuit further includes the first light-emitting control module 109 and the second light-emitting control module 1101. The first terminal of the first light-emitting control module 109 is electrically connected to the first power-supply signal input terminal VDD. The second terminal of the first light-emitting control module 109 is electrically connected to the first terminal of the driving module 101. The control terminal of the first light-emitting control module 109 is electrically connected to the enable signal input terminal EM of the pixel driving circuit. The first terminal of the second light-emitting control module 1101 is electrically connected to the second terminal of the driving module 101. The second terminal of the second light-emitting control module 1101 is electrically connected to the first terminal of the light-emitting module 102. The control terminal of the second light-emitting control module 1101 is electrically connected to the enable signal input terminal EM. The second terminal of the light-emitting module 102 is electrically connected to the second power-supply signal input terminal VSS of the pixel driving circuit. The first terminal of the first holding module 107 is electrically connected to the initialization signal input terminal Vref or the first power-supply signal input terminal VDD. The second terminal of the first holding module 107 is electrically connected to the anti-leakage node N1. The first terminal of the threshold compensation module 104 is electrically connected to the control terminal of the driving module 101. The second terminal of the threshold compensation module 104 is electrically connected to the anti-leakage node N1. The control terminal of the threshold compensation module 104 is electrically connected to the long scan signal input terminal EMB of the pixel driving circuit. The first terminal of the first blocking module 108 is electrically connected to the anti-leakage node N1. The second terminal of the first blocking module 108 is electrically connected to the second terminal of the driving module 101. The control terminal of the first blocking module 108 is electrically connected to the long scan signal input terminal EMB. The long scan signal input terminal EMB is set to input a conduction signal in each of the initialization stage and the charging stage. The first terminal of the first holding module 107 is connected to one fixed-potential signal. In this embodiment, to facilitate wiring and reduce the number of signal lines, the first terminal of the first holding module 107 is connected to the initialization signal input terminal Vref or the first power-supply signal input terminal VDD.

Exemplarily, in this embodiment, the first scan signal input in the first scan signal input terminal S1 and the second scan signal input in the second scan signal input terminal S2 are scan signals in the same set. That is, the first scan signal and the second scan signal are generated by the same set of GIP circuits. The first scan signal and the second scan signal have the same pulse widths and shifted from each other. Moreover, the pulse width of the long scan signal input in the long scan signal input terminal EMB is relatively long, and the duration of the pulse width covers at least the initialization stage and the charging stage. In the initialization stage, both the threshold compensation module 104 and the first initialization module 106 are turned on so that the initialization signal is input in the control terminal of the driving module 101 to initialize the control terminal of the driving module 101 and facilitate turning on the driving module 101 in the charging stage. In the charging stage, the data write module 103, the first blocking module 108, and the threshold compensation module 104 are all turned on so that the data signal, after passing through the data write module 103, the driving module 101, the first blocking module 108, and the threshold compensation module 104, is written to the control terminal of the driving module 101. When the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105. In the light-emitting stage, the driving module generates the drive current unrelated to the threshold voltage of the driving module 101, thereby controlling the light-emitting module to emit light. In the pixel driving circuit of this embodiment, in addition to having only one leakage current path and being able to hold the potential of the anti-leakage node N1, new scan signals are additionally provided at the control terminal of the threshold compensation module 104 and the control terminal of the first blocking module 108. Therefore, it is possible to ensure both the initialization stage and the charging stage to have a relatively long time, and thus the driving module 101 can be sufficiently initialized and charged.

Figure 34:
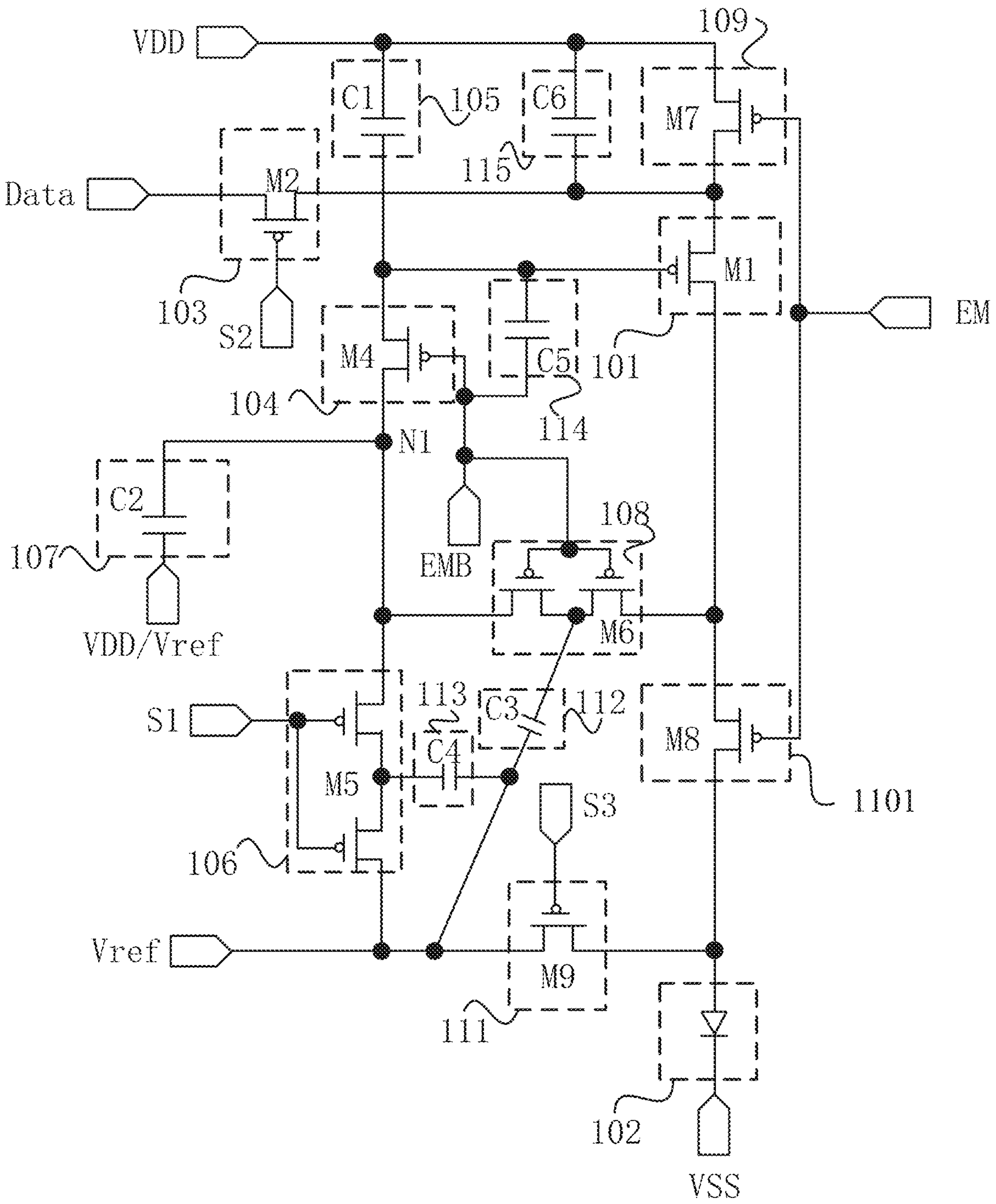
FIG. 34 is a circuit structure diagram of another pixel driving circuit according to another embodiment of the present disclosure.
Figure 35:
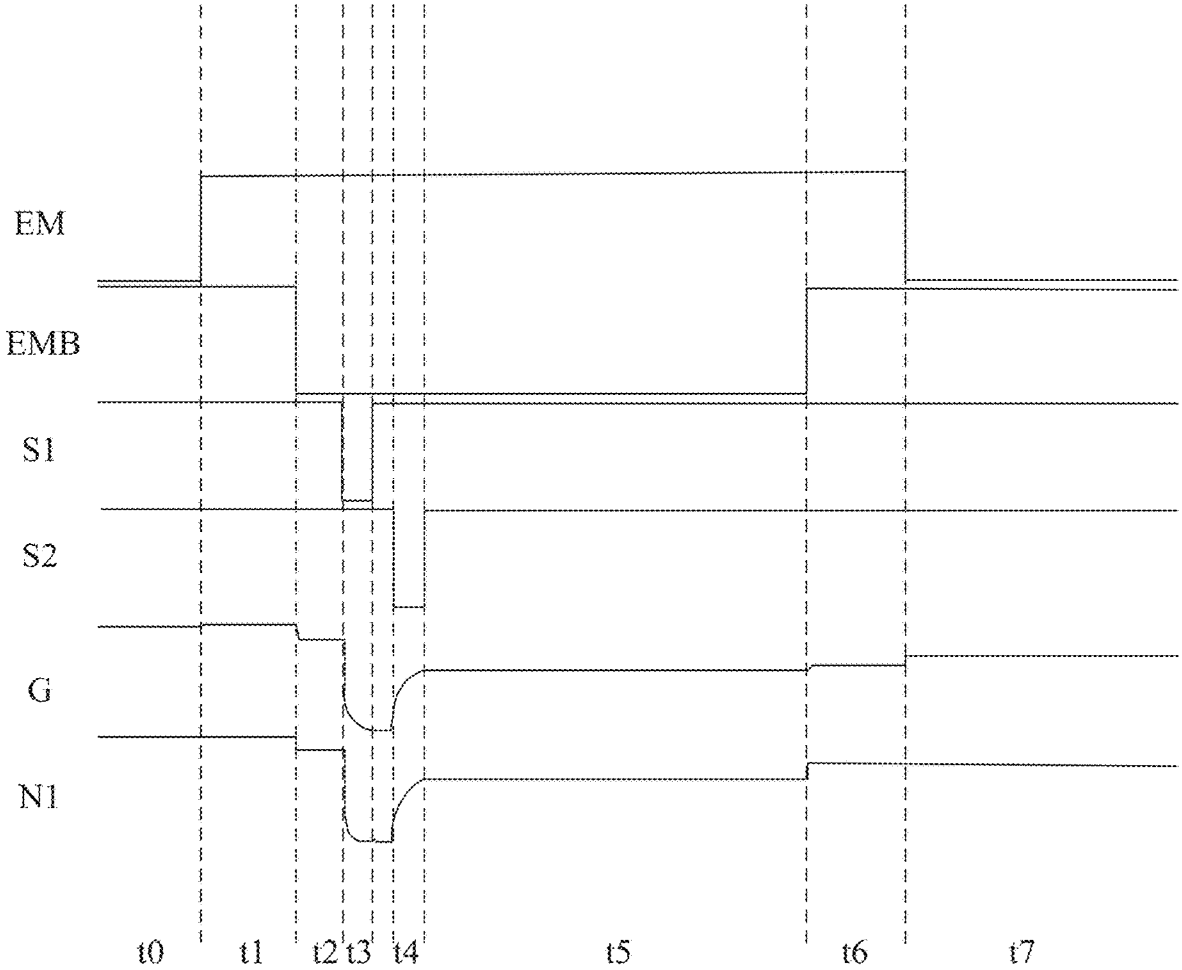
FIG. 35 is a timing diagram of a pixel driving circuit according to another embodiment of the present disclosure.

Exemplarily, FIG. 34 is a circuit structure diagram of another pixel driving circuit according to another embodiment of the present disclosure. FIG. 35 is a timing diagram of a pixel driving circuit according to another embodiment of the present disclosure. FIG. 35 corresponds to FIG. 34. In conjunction with FIGS. 35 and 34, the driving module 101 includes a first transistor M1. A first terminal of the first transistor M1 serves as the first terminal of the driving module 101. A second terminal of the first transistor M1 serves as the second terminal of the driving module 101. A control terminal of the first transistor M1 serves as the control terminal of the driving module 101. The light-emitting module 102 is the OLED. The data write module 103 includes a second transistor M2. A first terminal of the second transistor M2 serves as the first terminal of the data write module 103. A second terminal of the second transistor M2 serves as the second terminal of the data write module 103. A control terminal of the second transistor M2 serves as the control terminal of the data write module 103. The threshold compensation module 104 includes a third transistor M4. A first terminal of the third transistor M4 serves as the first terminal of the threshold compensation module 104. A second terminal of the third transistor M4 serves as the second terminal of the threshold compensation module 104. A control terminal of the third transistor M4 serves as the control terminal of the threshold compensation module 104. The storage module 105 includes a first capacitor C1. A first terminal of the first capacitor C1 serves as the first terminal of the storage module 105. A second terminal of the first capacitor C1 serves as the second terminal of the storage module 105. The first initialization module 106 includes a fifth transistor M5. A first terminal of the fifth transistor M5 serves as the first terminal of the first initialization module 106. A second terminal of the fifth transistor M5 serves as the second terminal of the first initialization module 106. A control terminal of the fifth transistor M5 serves as the control terminal of the first initialization module 106. The first holding module 107 includes a second capacitor C2. A first terminal of the second capacitor C2 serves as the first terminal of the first holding module 107. A second terminal of the second capacitor C2 serves as the second terminal of the first holding module 107. The first blocking module 108 includes a sixth transistor M6. A first terminal of the sixth transistor M6 serves as the first terminal of the first blocking module 108. A second terminal of the sixth transistor M6 serves as the second terminal of the first blocking module 108. A control terminal of the sixth transistor M6 serves as the control terminal of the first blocking module 108. The first light-emitting control module 109 includes a seventh transistor M7. A first terminal of the seventh transistor M7 serves as the first terminal of the first light-emitting control module 109. A second terminal of the seventh transistor M7 serves as the second terminal of the first light-emitting control module 109. A control terminal of the seventh transistor M7 serves as the control terminal of the first light-emitting control module 109. The second light-emitting control module 1101 includes an eighth transistor M8. A first terminal of the eighth transistor M8 serves as the first terminal of the second light-emitting control module 1101. A second terminal of the eighth transistor M8 serves as the second terminal of the second light-emitting control module 1101. A control terminal of the eighth transistor M8 serves as the control terminal of the second light-emitting control module 1101.

Exemplarily, the first transistor to the eighth transistor may all be P-type transistors or N-type transistors. The P-type transistors in the display panel are relatively mature in manufacturing and low in cost. Therefore, optionally, the first transistor to the eighth transistor are all P-type transistors. The P-type transistors are characterized by turning off when the control terminal is at a high level and turning on when the control terminal is at a low level. Apparently, in some other embodiments, the first transistor to the eighth transistor may also be N-type transistors. In this case, it is needed to set each signal of the scan signals, the enable signals, and the power-supply signals in a polarity opposite to the polarity of the each signal when the first transistor to the eighth transistor are all P-type transistors. The working principle of the pixel driving circuit provided by the embodiments of the present disclosure is described below in conjunction with FIGS. 35 and 34.

Stage T0 is the light-emitting stage of a previous frame signal.

In stage T1, the rising edge of the enable signal input in the enable signal input terminal EM arrives. The first light-emitting control module 109 and the second light-emitting control module 1101 are off. The light-emitting module 102 stops emitting light, thereby turning on the display of a present frame.

In stage T2, the falling edge of a long scan signal arrives. The threshold compensation module 104 is on to facilitate subsequent initialization and charging. The threshold compensation module 104 is turned on before the initialization stage, it is possible to ensure the longest initialization time and the initialization effect.

Stage T3 is the initialization stage. That is, in the stage t3, both the long scan signal and the first scan signal are at low levels. Both the threshold compensation module 104 and the first initialization module 106 are on. The initialization signal is written to the control terminal of the driving module 101 to initialize the driving module 101 to ensure the driving module 101 to be on in the charging stage.

Stage T4 is the charging stage. In the stage T4, the first scan signal input in the first scan signal input terminal S1 is changed to a high level. The first initialization module 106 is off. However, the second scan signal input in the second scan signal input terminal S2 is at a low level. In this case, the data write module 103, and the first blocking module 108 are on. Since the long scan signal is at a low level, the threshold compensation module 104 continues to be on. The data signal input in the data signal input terminal Data, after passing through the driving module 101, the first blocking module 108, and the threshold compensation module 104, is written to the control terminal of the driving module 101, making the potential of the control terminal of the driving module 101 change. When the potential of the control terminal of the driving module 101 changes so that the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105.

In stage T5, the second scan signal is at a high level. The data signal stops writing, i.e. the charging time ends.

In stage T6, both the first scan signal and the second scan signal are at high levels. The enable signal input in the enable signal input terminal EM is also at a high level. The process goes to a light-emitting preparation stage.

In stage T6, the enable signal is changed to be at a low level. Both the first light-emitting control module 109 and the second light-emitting control module 1101 are on. The light-emitting module 102 starts to emit light, and the drive current does not change with the drift of the threshold voltage of the driving module, making the light-emitting module have a better light-emitting stability. Moreover, due to the holding effect of the first holding module 107, the potential of the anti-leakage node N1 is relatively stable so that the potential of the control terminal of the driving module 101 is also relatively stable. That is, the waveform G is relatively flat, thereby greatly improving the flicker problem.

Optionally, referring to FIG. 34, the pixel driving circuit further includes a second holding module 115 configured to hold the potential of the first terminal of the driving module 101. The long scan signal input terminal EMB is set to input a conduction signal of a preset time between the charging stage and the light-emitting stage.

Exemplarily, referring to FIGS. 35 and 34, in the pixel driving circuit, the first scan signal and the second scan signal generally have short durations. At a low refresh frequency, the driving module 101 may not be turned off in the charging stage due to insufficient charging, and thus the threshold compensation effect cannot be achieved. In this embodiment, the second holding module 115 is provided. Moreover, one preset time (the stage t5) is set between the charging stage (the stage t4) and the light-emitting stage (the stage t7). The long scan signal in this preset time is still at a low level. In the charging stage, the data signal is written to the second holding module 115. In the stage t5, since the driving module 101 continues to be on, the data signal stored in the second holding module 115 continues charging the control terminal of the driving module 101 through the driving module 101, the first blocking module 108, and the threshold compensation module 104, thereby ensuring the threshold voltage of the driving module 101 to be sufficiently compensated and ensuring the light-emitting stability of the light-emitting module 102. Exemplarily, a first terminal of the second holding module 115 is electrically connected to the first terminal of the driving module 101. A second terminal of the second holding module 115 is electrically connected to the first power-supply signal input terminal VDD. The second holding module 115 may include a sixth capacitor C6. A first terminal of the sixth capacitor C6 serves as the first terminal of the second holding module 115. A second terminal of the sixth capacitor C6 serves as the second terminal of the second holding module 115. In this embodiment, the sixth capacitor C6 is connected to the first power-supply signal input terminal VDD to reduce the number of signal lines and facilitate wiring. Apparently, in some other embodiments, the second terminal of the sixth capacitor C2 can be connected to one fixed signal.

Optionally, referring to FIG. 34, the pixel driving circuit may further include a second initialization module 111. A first terminal of the second initialization module 111 is electrically connected to the initialization signal input terminal Vref. A second terminal of the second initialization module 111 is electrically connected to the first terminal of the light-emitting module 102. A control terminal of the second initialization module 111 is electrically connected to a third scan signal input terminal S3 of the pixel driving circuit.

Exemplarily, the second initialization module 111 may include a ninth transistor M9. A first terminal of the ninth transistor M9 serves as the first terminal of the second initialization module 111. A second terminal of the ninth transistor M9 serves as the second terminal of the second initialization module 111. A control terminal of the ninth transistor M9 serves as the control terminal of the second initialization module 111. The ninth transistor M9 may be, for example, a P-type transistor. The second initialization module 111 is configured to initialize the light-emitting module 102 to prevent the potential left on the light-emitting module 102 of the previous frame from affecting emitting light of the present frame. A third scan signal input in the third scan signal input terminal S3 controls the second initialization module 111 to be turned on or turned off. The third scan signal may be multiplexed by the first scan signal, may be multiplexed by the second scan signal, or may be one additional scan signal. Moreover, the one additional scan signal and the first scan signal are signals shifted from each other as long as the light-emitting module 102 is reset before the light-emitting stage.

Exemplarily, at least one of the threshold compensation module 104, the first initialization module 106, or the first blocking module 108 includes double-gate transistor.

Optionally, referring to FIG. 34, the first blocking module 108 is a first double-gate transistor. The pixel driving circuit further includes a third holding module 112 configured to hold the potential of a double-gate node of the first double-gate transistor.

Exemplarily, the double-gate node of the first double-gate transistor is a node where source drains of two sub-transistors of the first double-gate transistor are connected. When the double-gate transistor is turned off, the potential of the double-gate node of the double-gate transistor is unstable. If the double-gate node is not held at one potential, the leakage of the anti-leakage node N1 through the double-gate node will be more serious. Therefore, in this embodiment, the third holding module 112 may be provided at the double-gate node to hold the potential of the double-gate node of the first double-gate transistor, thereby holding the potential of the anti-leakage node N1 stable. Exemplarily, the third holding module 112 may include a third capacitor C3. A first terminal of the third capacitor C3 is electrically connected to the double-gate node of the first double-gate transistor. A second terminal of the third capacitor C3 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel.

Optionally, referring to FIG. 34, the first initialization module 106 is a second double-gate transistor. The pixel driving circuit further includes a fourth holding module 113 configured to hold the potential of a double-gate node of the second double-gate transistor.

Exemplarily, the double-gate node of the second double-gate transistor, i.e. a node where source drains of two sub-transistors of the second double-gate transistor are connected. When the double-gate transistor is turned off, the potential of the double-gate node of the second double-gate transistor is unstable. If the double-gate node is not held at one potential, the leakage of the anti-leakage node N1 through the double-gate node will be more serious. Therefore, in this embodiment, the fourth holding module 113 may be provided at the double-gate node of the second double-gate transistor to hold the potential of the double-gate node of the second double-gate transistor, thereby holding the potential of the anti-leakage node N1 stable. Exemplarily, the fourth holding module 113 may include a fourth capacitor C4. A first terminal of the fourth capacitor C4 is electrically connected to the double-gate node of the second double-gate transistor. A second terminal of the fourth capacitor C4 may access to one fixed signal, for example, may be electrically connected to the initialization signal input terminal Vref, or may be electrically connected to the first power-supply signal input terminal VDD, thereby reducing the number of signal lines in the pixel driving circuit, and facilitating implementing the narrow bezel of the display panel.

Optionally, referring to FIG. 34, the pixel driving circuit further includes a coupling module 114 configured to hold the potential of the control terminal of the driving module 101. A first terminal of the coupling module 114 is electrically connected to the control terminal of the driving module 101. A second terminal of the coupling module 114 is electrically connected to the control terminal of the threshold compensation module 104.

Exemplarily, in this embodiment, the coupling module 114 may include a fifth capacitor C5. A first terminal of the fifth capacitor C5 serves as the first terminal of the coupling module 114. A second terminal of the fifth capacitor C5 serves as the second terminal of the coupling module 114. The fifth capacitor C5 is equivalent to increasing the capacitance of the storage module, facilitating maintaining the stability of the potential of the control terminal of the driving module 101, thereby facilitating reducing the flicker phenomenon. On the other hand, the coupling module 114 is connected to the control terminal of the threshold compensation module 104, so when the potential of the control terminal of the threshold compensation module 104 is changed from a low level to a high level, it is also possible to increase the potential of the control terminal of the driving module 101, thereby compensating for the loss of the potential of the control terminal of the driving module 101, and maintaining the stability of the potential of the control terminal of the driving module 101. For ease of wiring, the second terminal of the fifth capacitor C5 is electrically connected to the control terminal of the threshold compensation module 104.

In some other embodiments, the threshold compensation module 104 may also be a double-gate transistor. In some embodiments, the anti-leakage node N1 may be a double-gate node of the threshold compensation module 104. The first initialization module 104 and the first blocking module 108 are no longer directly electrically connected to the anti-leakage node N1. The first initialization module 104 and the first blocking module 108 are electrically connected to the second terminal of the threshold compensation module 104. The threshold compensation module 104 is configured to be the double-gate transistor so that the leakage current can be reduced. In this embodiment, for the connection modes of other modules in the pixel driving circuit, reference can be made to the connection modes of any one of the preceding embodiments, and details are not repeated herein.

Figure 36:
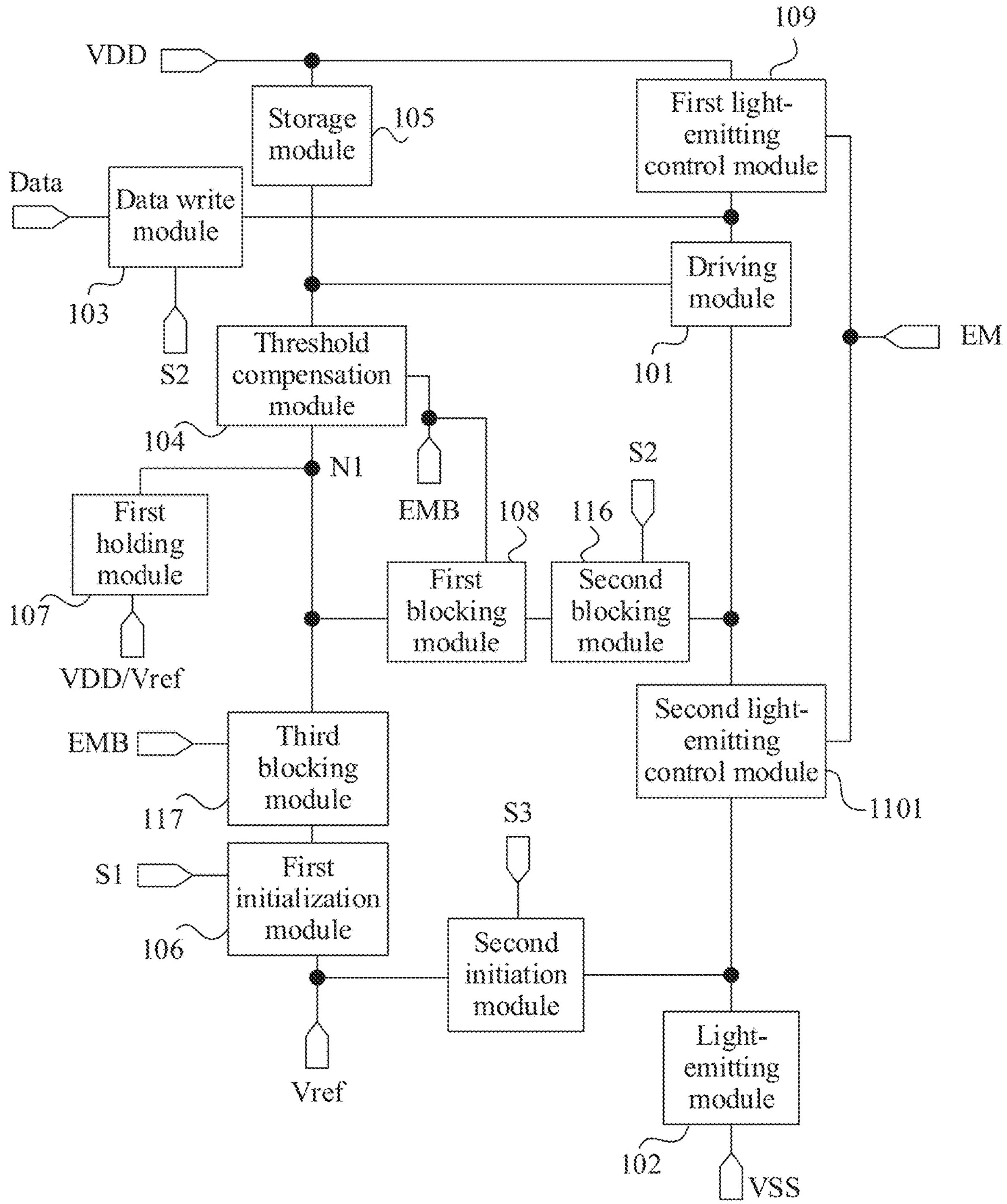
FIG. 36 is a circuit structure diagram of a pixel driving circuit according to another embodiment of the present disclosure.

FIG. 36 is a circuit structure diagram of a pixel driving circuit according to another embodiment of the present disclosure. Referring to FIG. 36, the pixel driving circuit further includes: a second blocking module 116, a third blocking module 117, and a second initialization module 111. The first terminal of threshold compensation module 104 is electrically connected to the control terminal of the driving module 101. The second terminal of the threshold compensation module 104 is electrically connected to the anti-leakage node N1. The control terminal of the threshold compensation module 104 is electrically connected to a long scan signal input terminal EMB of the pixel driving circuit. The first terminal of the first blocking module 108 is electrically connected to the anti-leakage stage. The second terminal of the first blocking module 108 is electrically connected to a first terminal of the second blocking module 116. The control terminal of the first blocking module 108 is electrically connected to the long scan signal input terminal EMB. A second terminal of the second blocking module 116 is electrically connected to the second terminal of the driving module 101. A control terminal of the second blocking module 116 is electrically connected to the second scan signal input terminal S2 of the pixel driving circuit. A first terminal of the third blocking module 117 is electrically connected to the anti-leakage stage N1. A second terminal of the third blocking module 117 is electrically connected to the second terminal of the first initialization module 106. A control terminal of the third blocking module 117 is electrically connected to the long scan signal input terminal EMB. A first terminal of the second initialization module 111 is electrically connected to the initialization signal input terminal Vref. A second terminal of the second initialization module 111 is electrically connected to the first terminal of the light-emitting module 102. A control terminal of the second initialization module 111 is electrically connected to a third scan signal input terminal S3. The long scan signal input terminal EMB is set to input a conduction signal in each of the initialization stage and the charging stage.

Exemplarily, in this embodiment, a first terminal of the first initialization module 106 is electrically connected to the initialization signal input terminal Vref. A control terminal of the first initialization module 106 is electrically connected to a first scan signal S1 of the pixel driving circuit. A first terminal of the data write module 103 is electrically connected to the data signal input terminal Data of the pixel driving circuit. A second terminal of the data write module 103 is electrically connected to a first terminal of the driving module 101. A control terminal of the data write module 103 is electrically connected to a second scan signal input terminal S2 of the pixel driving circuit. A first terminal of the storage module 105 is electrically connected to a first power-supply signal input terminal VDD of the pixel driving circuit. A second terminal of the storage module 105 is electrically connected to the control terminal of the driving module 101. The pixel driving circuit further includes a first light-emitting control module 109 and a second light-emitting control module 1101. A first terminal of the first light-emitting control module 109 is electrically connected to the first power-supply signal input terminal VDD. A second terminal of the first light-emitting control module 109 is electrically connected to the first terminal of the driving module 101. A control terminal of the first light-emitting control module 109 is electrically connected to an enable signal input terminal EM of the pixel driving circuit. A first terminal of the second light-emitting control module 1101 is electrically connected to a second terminal of the driving module 101. A second terminal of the second light-emitting control module 1101 is electrically connected to a first terminal of the light-emitting module 102. A control terminal of the second light-emitting control module 1101 is electrically connected to the enable signal input terminal EM. A second terminal of the light-emitting module 102 is electrically connected to a second power-supply signal input terminal VSS of the pixel driving circuit. A first terminal of the first holding module 107 is electrically connected to the initialization signal input terminal Vref or the first power-supply signal input terminal VDD. A second terminal of the first holding module 107 is electrically connected to the anti-leakage node N1. The first scan signal input in the first scan signal input terminal S1, a second scan signal input in the second scan signal input terminal S2, and a third scan signal input in the third scan signal input terminal S3 are scan signals in the same set. That is, the first scan signal, the second scan signal, and the third scan signal are generated by the same group of GIP circuits. The first scan signal, the second scan signal, and the third scan signal have the same pulse widths and shifted from each other. Optionally, the third scan signal may be the same as the first scan signal. Moreover, the pulse width of the long scan signal input in the long scan signal input terminal EMB is relatively long, and the duration of the pulse width covers at least the initialization stage and the charging stage. In the initialization stage, both the threshold compensation module 104 and the first initialization module 106 are turned on so that the initialization signal is input in the control terminal of the driving module 101 to initialize the control terminal of the driving module 101 and facilitate turning on the driving module 101 in the charging stage. In the charging stage, the data write module 103, the first blocking module 108, and the threshold compensation module 104 are all turned on so that the data signal, after passing through the data write module 103, the driving module 101, the first blocking module 108, and the threshold compensation module 104, is written to the control terminal of the driving module 101. When the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105. In the light-emitting stage, the driving module generates the drive current unrelated to the threshold voltage of the driving module 101, thereby controlling the light-emitting module to emit light. In the pixel driving circuit of this embodiment, in addition to having only one leakage current path and being able to hold the potential of the anti-leakage node N1, new scan signals are additionally provided at the control terminal of the threshold compensation module 104. Therefore, it is possible to ensure both the initialization stage and the charging stage to have a relatively long time, and thus the driving module 101 can be sufficiently initialized and charged.

Moreover, when the pixel driving circuit is applied to a low refresh frequency, the light-emitting module 102 has is relatively long light-emitting time and a relatively short service life. It is possible to control the light-emitting module 102 not to emit light in the manner of black frame insertion, i.e. in a black frame insertion stage, shortening the light-emitting time of the light-emitting module 102, thereby prolonging the service life of the light-emitting module. It is also possible to convert partial human-eye sensitive low-frequency brightness components into human-eye insensitive high-frequency brightness components in the manner of black frame insertion. In this embodiment, it is possible to control to input a turn-off signal in the long scan signal input terminal in the black frame insertion stage and control to input the third scan signal in the third scan signal input terminal S3 in the black frame insertion stage to reset the light-emitting module, thereby converting low-frequency brightness components into high-frequency brightness components, having a high-current holding ratio, and achieving low flickering. Meanwhile, when the light-emitting module is reset by the black frame insertion stage, the first scan signal, the second scan signal, and the third scan signal are generated by one set of GIP circuits, that is, the pulse of the first scan signal and the pulse of the second scan signal successively arrive, making the second blocking module 116, the first initialization module 106, and the data write module 103 turned on. The second blocking module 116, and the third blocking module 117 can block the data signal at the second blocking module and the initialization signal at the third blocking module in the black frame insertion stage, thereby preventing the potential of the anti-leakage node N1 and the potential of the control terminal of the driving module 101 from being affected, preventing the leakage current from increasing, i.e. improving the phenomenon of a relatively large leakage current. In other words, during the black frame insertion, the reset of the light-emitting module 102 does not affect the control terminal of the driving module and the anti-leakage node. Therefore, not only the human eye sensitive low-frequency brightness components are eliminated, but also the potential of the anti-leakage node N1 cannot be changed so that the threshold compensation module 104 maintains the low leakage, thereby eliminating the flicker problem at the low frequency.

The positions of the first blocking module 108 and the second blocking module 116 are interchangeable. The positions of the third blocking module 117 and the first initialization module 106 are interchangable. The first terminal of the first holding module 107 is connected to one fixed-potential signal. In this embodiment, to facilitate wiring and reduce the number of signal lines, the first terminal of the first holding module 107 is connected to the initialization signal input terminal Vref or the first power-supply signal input terminal VDD.

Figure 37:
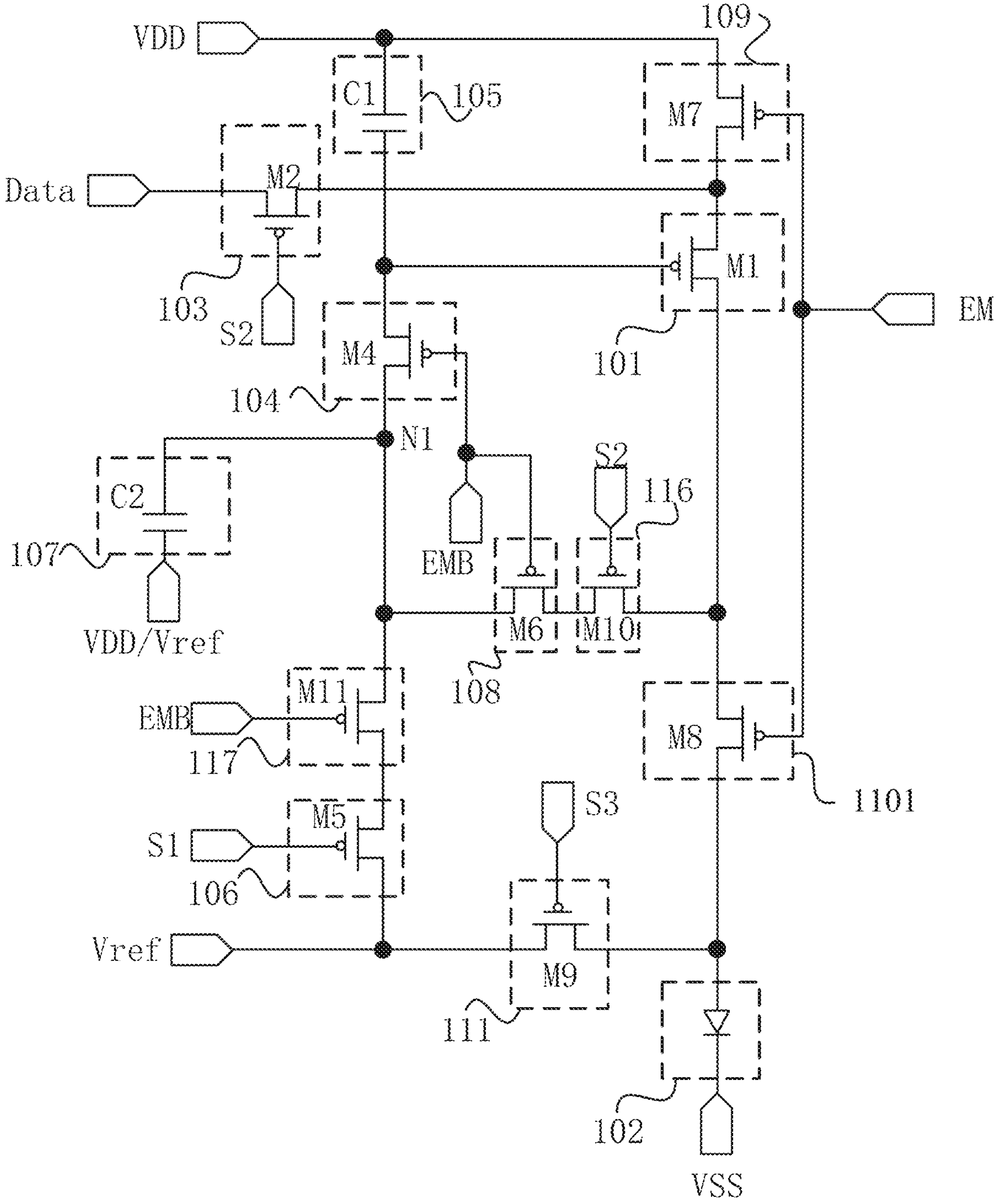
FIG. 37 is a circuit structure diagram of another pixel driving circuit according to another embodiment of the present disclosure.
Figure 38:
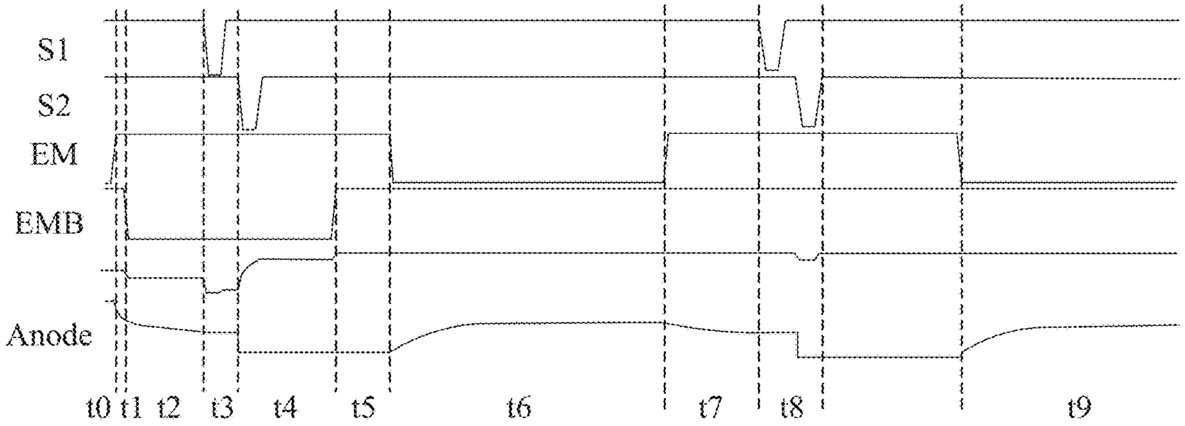
FIG. 38 is a timing diagram of a pixel driving circuit according to another embodiment of the present disclosure.

FIG. 37 is a circuit structure diagram of another pixel driving circuit according to another embodiment of the present disclosure. FIG. 38 is a timing diagram of a pixel driving circuit according to another embodiment of the present disclosure. In conjunction with FIGS. 37 and 38, the driving module 101 includes a first transistor M1. A first terminal of the first transistor M1 serves as the first terminal of the driving module 101. A second terminal of the first transistor M1 serves as the second terminal of the driving module 101. A control terminal of the first transistor M1 serves as the control terminal of the driving module 101. The light-emitting module 102 is the OLED. The data write module 103 includes a second transistor M2. A first terminal of the second transistor M2 serves as the first terminal of the data write module 103. A second terminal of the second transistor M2 serves as the second terminal of the data write module 103. A control terminal of the second transistor M2 serves as the control terminal of the data write module 103. The threshold compensation module 104 includes a third transistor M4. A first terminal of the third transistor M4 serves as the first terminal of the threshold compensation module 104. A second terminal of the third transistor M4 serves as the second terminal of the threshold compensation module 104. A control terminal of the third transistor M4 serves as the control terminal of the threshold compensation module 104. The storage module 105 includes a first capacitor C1. A first terminal of the first capacitor C1 serves as the first terminal of the storage module 105. A second terminal of the first capacitor C1 serves as the second terminal of the storage module 105. The first initialization module 106 includes a fifth transistor M5. A first terminal of the fifth transistor M5 serves as the first terminal of the first initialization module 106. A second terminal of the fifth transistor M5 serves as the second terminal of the first initialization module 106. A control terminal of the fifth transistor M5 serves as the control terminal of the first initialization module 106. The first holding module 107 includes a second capacitor C2. A first terminal of the second capacitor C2 serves as the first terminal of the first holding module 107. A second terminal of the second capacitor C2 serves as the second terminal of the first holding module 107. The first blocking module 108 includes a sixth transistor M6. A first terminal of the sixth transistor M6 serves as the first terminal of the first blocking module 108. A second terminal of the sixth transistor M6 serves as the second terminal of the first blocking module 108. A control terminal of the sixth transistor M6 serves as the control terminal of the first blocking module 108. The first light-emitting control module 109 includes a seventh transistor M7. A first terminal of the seventh transistor M7 serves as the first terminal of the first light-emitting control module 109. A second terminal of the seventh transistor M7 serves as the second terminal of the first light-emitting control module 109. A control terminal of the seventh transistor M7 serves as the control terminal of the first light-emitting control module 109. The second light-emitting control module 1101 includes an eighth transistor M8. A first terminal of the eighth transistor M8 serves as the first terminal of the second light-emitting control module 1101. A second terminal of the eighth transistor M8 serves as the second terminal of the second light-emitting control module 1101. A control terminal of the eighth transistor M8 serves as the control terminal of the second light-emitting control module 1101. The second initialization module 111 includes a ninth transistor M9. A first terminal of the ninth transistor M9 serves as the first terminal of the second initialization module 111. A second terminal of the ninth transistor M9 serves as the second terminal of the second initialization module 111. A control terminal of the ninth transistor M9 serves as the control terminal of the second initialization module 111. The second blocking module 116 includes a tenth transistor M10. A first terminal of the tenth transistor M10 serves as the first terminal of the second blocking module 116. A second terminal of the tenth transistor M10 serves as the second terminal of the second blocking module 116. A control terminal of the tenth transistor M10 serves as the control terminal of the second blocking module 116. The third blocking module 117 includes an eleventh transistor M11. A first terminal of the eleventh transistor M11 serves as the first terminal of the third blocking module 117. A second terminal of the eleventh transistor M11 serves as the second terminal of the third blocking module 117. A control terminal of the eleventh transistor M11 serves as the control terminal of the third blocking module 117. For example, the first transistor to the eleventh transistor may all be P-type transistors or N-type transistors. The P-type transistors in the display panel are relatively mature in manufacturing and low in cost. Therefore, optionally, the first transistor to the eleventh transistor are all P-type transistors. The P-type transistors are characterized by turning off when the control terminal is at a high level and turning on when the control terminal is at a low level. Apparently, in some other embodiments, the first transistor to the eleventh transistor may also be N-type transistors. In this case, it is needed to set each signal of the scan signals, the enable signals, and the power-supply signals in a polarity opposite to the polarity of the each signal when the first transistor to the eleventh transistor are all P-type transistors. The working principle of the pixel driving circuit provided by the embodiments of the present disclosure is described below in conjunction with FIGS. 37 and 38.

Stage T0 is the light-emitting stage of a previous frame signal.

In stage T1, the rising edge of the enable signal input in the enable signal input terminal EM arrives. The first light-emitting control module 109 and the second light-emitting control module 1101 are turned off. The light-emitting module 102 stops emitting light, thereby turning on the display of a present frame.

In stage T2, the falling edge of a long scan signal arrives. The threshold compensation module 104 is turned on to facilitate subsequent initialization and charging. The threshold compensation module 104 is turned on before the initialization stage, it is possible to ensure the longest initialization time and the initialization effect.

Stage T3 is the initialization stage. That is, in the stage t3, both the long scan signal and the first scan signal are at low levels. Both the threshold compensation module 104 and the first initialization module 106 are turned on. The initialization signal is written to the control terminal of the driving module 101 to initialize the driving module 101 to ensure the driving module 101 to be turned on in the charging stage.

Stage T4 is the charging stage. In the stage T4, the first scan signal input in the first scan signal input terminal S1 is changed to a high level. The first initialization module 106 is turned off. However, the second scan signal input in the second scan signal input terminal S2 is at a low level. In this case, the data write module 103, and the first blocking module 108 are turned on. Since the long scan signal is still at a low level, the threshold compensation module 104 continues to be on. The data signal input in the data signal input terminal Data, after passing through the driving module 101, the first blocking module 108, and the threshold compensation module 104, is written to the control terminal of the driving module 101, making the potential of the control terminal of the driving module 101 change. When the potential of the control terminal of the driving module 101 changes so that the potential difference between the control terminal of the driving module 101 and the first terminal of the driving module 101 is the threshold voltage of the driving module 101, the driving module 101 is turned off, and the data signal stops writing. In this case, the potential of the control terminal of the driving module 101 is related to the threshold voltage of the driving module 101 and stored on the storage module 105.

In stage T5, both the first scan signal and the second scan signal are at high levels. The enable signal input in the enable signal input terminal EM is also at a high level. The process goes to a light-emitting preparation stage.

In stage T6, the enable signal is changed to be at a low level. Both the first light-emitting control module 109 and the second light-emitting control module 1101 are on. The light-emitting module 102 starts to emit light, and the drive current does not change with the drift of the threshold voltage of the driving module, making the light-emitting module have a better light-emitting stability.

Moreover, due to the holding effect of the first holding module 107, the potential of the anti-leakage node N1 is relatively stable so that the potential of the control terminal of the driving module 101 is also relatively stable. That is, the waveform G of the control terminal of the driving module 101 is relatively flat, thereby greatly improving the flicker problem.

In Stage T7, the black frame insertion stage arrives. In this stage, the enable signal becomes at a high level, controls the first light-emitting control module 109 and the second light-emitting control module 1101 to be off, thereby controlling the light-emitting module 102 to stop emitting light, thereby reducing the light-emitting time of the light-emitting module 102, and prolonging the service life of the light-emitting module 102.

Stage T8 is a reset stage of the light-emitting module. In this stage, the first scan signal and the second scan signal successively arrive to reset the light-emitting module. However, in this stage, the long scan signal is at a high level, i.e. the turn-off signal. Therefore, the second blocking module 116 and the third blocking module 117 are off. The initialization signal is blocked between the third blocking module 117 and the first initialization module 106 by the third blocking module 117. The data signal is blocked between the second blocking module 116 and the first blocking module 108, thereby making the potential of the anti-leakage node N1 and the potential of the control terminal of the driving module unchanged, a low-voltage difference and a low leakage current between the anti-leakage node N1 and the control terminal of the driving module 101 maintained, and the potential of the control terminal of the driving module relatively stable.

In Stage T9, after both the first scan signal and the second scan signal are pulled at high levels, the enable signal is set at a low level, the black frame insertion stage ends, and the light-emitting module is on, thereby making the current holding ratio of the driving module very high.

Anode is a waveform diagram of a signal on the anode of the light-emitting module 102. It can be seen from the timing diagram in FIG. 38, after the enable signal in the black frame insertion stage is set at a high level, the current flowing through the anode of the light-emitting module 102 does not rapidly drop to 0 and only becomes 0 after the low level of the second scan signal arrives. Only when the enable signal performs the black frame insertion, the light-emitting module is reset, the low-frequency brightness components can be completely converted into the high-frequency brightness components, thereby achieving the effect of reducing the flicker.

In this embodiment, the first blocking module 108 may also be a first double-gate transistor. The corresponding pixel driving circuit may further include a third holding module. The third holding module may be configured to hold the potential of a double-gate node of the first double-gate transistor. The first initialization module 106 is a second double-gate transistor. The pixel driving circuit further includes a fourth holding module configured to hold the potential of a double-gate node of the second double-gate transistor. The pixel driving circuit further includes a coupling module configured to hold the potential of the control terminal of the driving module 101. A first terminal of the coupling module is electrically connected to the control terminal of the driving module 101. A second terminal of the coupling module is electrically connected to the control terminal of the threshold compensation module 104. The third holding module may include a third capacitor. A first terminal of the third capacitor is electrically connected to the double-gate node of the first double-gate transistor. A second terminal of the third capacitor may access to one fixed signal, for example, may be electrically connected to the initialization signal input terminal, or may be electrically connected to the first power-supply signal input terminal, thereby reducing the number of signal lines in the pixel driving circuit, and facilitating implementing the narrow bezel of the display panel. The fourth holding module may include a fourth capacitor. A first terminal of the fourth capacitor C4 is electrically connected to the double-gate node of the second double-gate transistor. A second terminal of the fourth capacitor may access to one fixed signal, for example, may be electrically connected to the initialization signal input terminal, or may be electrically connected to the first power-supply signal input terminal, thereby reducing the number of signal lines in the pixel driving circuit, and facilitating implementing the narrow bezel of the display panel. The coupling module may include a fifth capacitor. A first terminal of the fifth capacitor serves as the first terminal of the coupling module. A second terminal of the fifth capacitor serves as the second terminal of the coupling module. The connection relationship and the effect of the third holding module, the fourth holding module, and the coupling module are the same as the connection relationship and the effect of the third holding module, the fourth holding module, and the coupling module in the preceding embodiments. Details are not repeated herein.

Optionally, in this embodiment, at least one of the first blocking module 108, the first initialization module 106, or the third blocking module 117 may be a thin film transistor (TFT).

Figure 39:
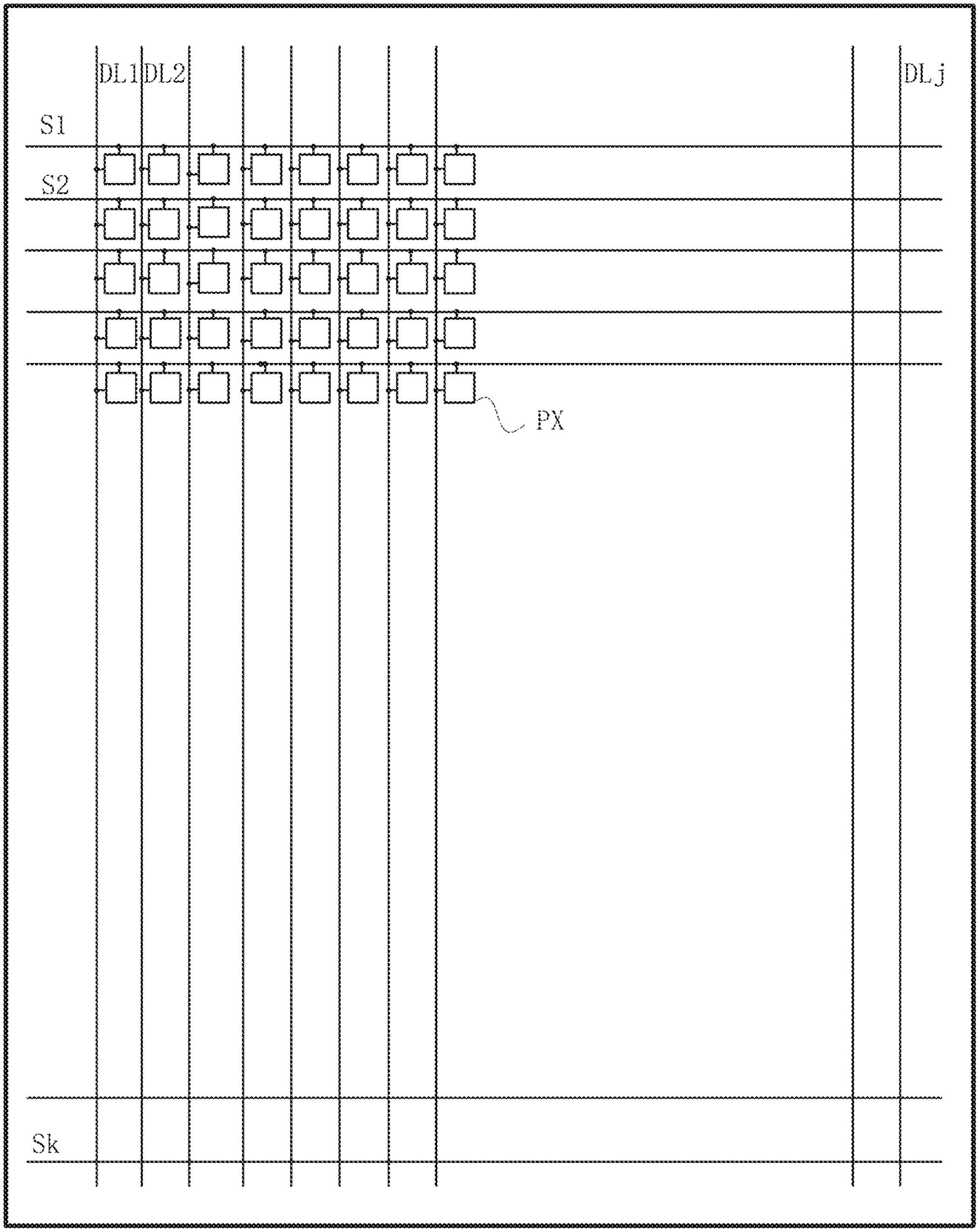
FIG. 39 is a structure diagram of a display panel according to another embodiment of the present disclosure.

This embodiment provides a display panel. FIG. 39 is a structure diagram of a display panel according to another embodiment of the present disclosure. Referring to FIG. 39, the display panel includes pixel driving circuits PX provided by any embodiment of multiple embodiments of the present disclosure. The display panel may include multiple scan lines (S1 to Sk) and multiple data lines (DL1 to DLj) interlacing with the multiple scan lines (S1 to Sk). The pixel driving circuits are located in areas defined by the scan lines and the data lines. For example, the scan lines may include a first scan line, and a second scan line. The first scan line and the second scan line are electrically connected to a first scan signal input terminal and a second scan signal input terminal, respectively, in the pixel driving circuit, thereby providing scan signals for the pixel driving circuit PX.

Figure 40:
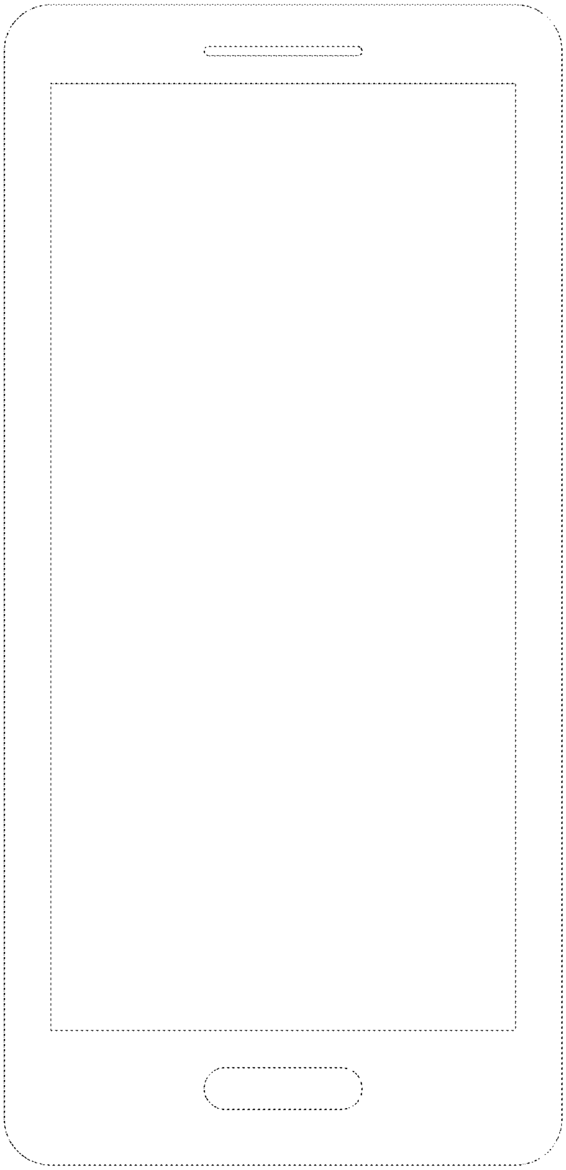
FIG. 40 is a structure diagram of a display device according to another embodiment of the present disclosure.

FIG. 40 is a structure diagram of a display device according to another embodiment of the present disclosure. Referring to FIG. 40, the display device includes a display panel according to an embodiment of the present disclosure. The display device may be a mobile phone, a tablet PC, a display, a smart watch, an MP3, an MP4, or another wearable device.

What is claimed is:

1. A pixel driving circuit, comprising:

a driving module configured to generate a driving current;

a light-emitting module configured to emit light in response to the drive current;

a threshold compensation module configured to compensate for a threshold voltage of the driving module in a charging stage, wherein the threshold compensation module is connected between an anti-leakage node and a control terminal of the driving module;

a first initialization module configured to initialize the control terminal of the driving module in an initialization stage, wherein the first initialization module is connected between an initialization signal input terminal and the anti-leakage node;

a first holding module configured to hold a potential of the anti-leakage node;

a second holding module configured to hold a potential of a first terminal of the driving module; and a first blocking module configured to block a conduction path between the anti-leakage node and the light-emitting module in a light-emitting stage.

2. The pixel driving circuit of claim 1, wherein a first terminal of the first holding module is connected to a fixed signal, and a second terminal of the first holding module is electrically connected to the anti-leakage node.

3. The pixel driving circuit of claim 1, further comprising:

a data write module configured to write a voltage corresponding to a data signal to a control terminal of the driving module in a charging stage; and a storage module configured to maintain a potential of the control terminal of the driving module.

4. The pixel driving circuit of claim 3, wherein a first terminal of the first initialization module is electrically connected to the initialization signal input terminal, and a control terminal of the first initialization module is electrically connected to a first scan signal input terminal of the pixel driving circuit;

a first terminal of the data write module is electrically connected to a data signal input terminal of the pixel driving circuit, a second terminal of the data write module is electrically connected to a first terminal of the driving module, and a control terminal of the data write module is electrically connected to a second scan signal input terminal of the pixel driving circuit;

a first terminal of the storage module is electrically connected to a first power-supply signal input terminal of the pixel driving circuit, and a second terminal of the storage module is electrically connected to the control terminal of the driving module;

the pixel driving circuit further comprises a first light-emitting control module and a second light-emitting control module, wherein a first terminal of the first light-emitting control module is electrically connected to the first power-supply signal input terminal, a second terminal of the first light-emitting control module is electrically connected to the first terminal of the driving module, and a control terminal of the first light-emitting control module is electrically connected to an enable signal input terminal of the pixel driving circuit; a first terminal of the second light-emitting control module is electrically connected to a second terminal of the driving module, a second terminal of the second light-emitting control module is electrically connected to a first terminal of the light-emitting module, and a control terminal of the second light-emitting control module is electrically connected to the enable signal input terminal; and a second terminal of the light-emitting module is electrically connected to a second power-supply signal input terminal of the pixel driving circuit; and a first terminal of the first holding module is electrically connected to the initialization signal input terminal or the first power-supply signal input terminal, and a second terminal of the first holding module is electrically connected to the anti-leakage node.

5. The pixel driving circuit of claim 4, wherein a first terminal of the first blocking module is electrically connected to the anti-leakage node, a second terminal of the first blocking module is electrically connected to a second terminal of the first initialization module and the second terminal of the driving module, and a control terminal of the first blocking module is electrically connected to the second scan signal input terminal; and a first terminal of the threshold compensation module is electrically connected to the control terminal of the driving module, a second terminal of the threshold compensation module is electrically connected to the anti-leakage node, and a control terminal of the threshold compensation module is electrically connected to the second scan signal input terminal.

6. The pixel driving circuit of claim 5, wherein the charging stage at least partially overlaps the initialization stage.

7. The pixel driving circuit of claim 4, wherein a first terminal of the threshold compensation module is electrically connected to the control terminal of the driving module, a second terminal of the threshold compensation module is electrically connected to the anti-leakage node, and a control terminal of the threshold compensation module is electrically connected to a long scan signal input terminal of the pixel driving circuit; a first terminal of the first blocking module is electrically connected to the anti-leakage node, a second terminal of the first blocking module is electrically connected to the second terminal of the driving module, and the control terminal of the first blocking module is electrically connected to the second scan signal input terminal or the long scan signal input terminal, wherein the long scan signal input terminal is set to input a conduction signal in each of the initialization stage and the charging stage.

8. The pixel driving circuit of claim 7, wherein a duration of a pulse width of a long scan signal covers at least the initialization stage and the charging stage.

9. The pixel driving circuit of claim 7, wherein the control terminal of the first blocking module is electrically connected to the long scan signal input terminal; and the second holding module is further configured to hold a potential of the first terminal of the driving module, and the long scan signal input terminal is set to input a conduction signal of a preset time between the charging stage and the light-emitting stage.

10. The pixel driving circuit of claim 4, further comprising: a second blocking module and a third blocking module, wherein a first terminal of the threshold compensation module is electrically connected to the control terminal of the driving module, a second terminal of the threshold compensation module is electrically connected to the anti-leakage node, and a control terminal of the threshold compensation module is electrically connected to a long scan signal input terminal of the pixel driving circuit; a first terminal of the first blocking module is electrically connected to the anti-leakage node, a second terminal of the first blocking module is electrically connected to a first terminal of the second blocking module, and a control terminal of the first blocking module is electrically connected to the long scan signal input terminal; a second terminal of the second blocking module is electrically connected to the second terminal of the driving module, a control terminal of the second blocking module is electrically connected to the second scan signal input terminal of the pixel driving circuit; and a first terminal of the third blocking module is electrically connected to the anti-leakage node, a second terminal of the third blocking module is electrically connected to a second terminal of the first initialization module, a control terminal of the third blocking module is electrically connected to the long scan signal input terminal, and the long scan signal input terminal is set to input a conduction signal in each of the initialization stage and the charging stage.

11. The pixel driving circuit of claim 10, wherein the long scan signal input terminal is set to input a turn-off signal in a black frame insertion stage.

12. The pixel driving circuit of claim 4, wherein the driving module comprises a first transistor, wherein a first terminal of the first transistor serves as the first terminal of the driving module, a second terminal of the first transistor serves as the second terminal of the driving module, and a control terminal of the first transistor serves as the control terminal of the driving module;

the data write module comprises a second transistor, wherein a first terminal of the second transistor serves as the first terminal of the data write module, a second terminal of the second transistor serves as the second terminal of the data write module, and a control terminal of the second transistor serves as the control terminal of the data write module;

the threshold compensation module comprises a third transistor, wherein a first terminal of the third transistor serves as a first terminal of the threshold compensation module, a second terminal of the third transistor serves as a second terminal of the threshold compensation module, and a control terminal of the third transistor serves as a control terminal of the threshold compensation module;

the storage module comprises a first capacitor, wherein a first terminal of the first capacitor serves as the first terminal of the storage module and a second terminal of the first capacitor serves as the second terminal of the storage module;

the first initialization module comprises a fifth transistor, wherein a first terminal of the fifth transistor serves as the first terminal of the first initialization module, a second terminal of the fifth transistor serves as a second terminal of the first initialization module, and a control terminal of the fifth transistor serves as the control terminal of the first initialization module;

the first holding module comprises a second capacitor, wherein a first terminal of the second capacitor serves as the first terminal of the first holding module, and a second terminal of the second capacitor serves as the second terminal of the first holding module;

the first blocking module comprises a sixth transistor, wherein a first terminal of the sixth transistor serves as a first terminal of the first blocking module, a second terminal of the sixth transistor serves as a second terminal of the first blocking module, and a control terminal of the sixth transistor serves as a control terminal of the first blocking module;

the first light-emitting control module comprises a seventh transistor, wherein a first terminal of the seventh transistor serves as the first terminal of the first light-emitting control module, a second terminal of the seventh transistor serves as the second terminal of the first light-emitting control module, and a control terminal of the seventh transistor serves as the control terminal of the first light-emitting control module; and the second light-emitting control module comprises an eighth transistor, wherein a first terminal of the eighth transistor serves as the first terminal of the second light-emitting control module, a second terminal of the eighth transistor serves as the second terminal of the second light-emitting control module, and a control terminal of the eighth transistor serves as the control terminal of the second light-emitting control module.

13. The pixel driving circuit of claim 1, wherein a first terminal of the second holding module is electrically connected to the first terminal of the driving module, and a second terminal of the second holding module is connected to a fixed signal.

14. The pixel driving circuit of claim 1, wherein the first blocking module is a first double-gate transistor; and the pixel driving circuit further comprises: a third holding module configured to hold a potential of a double-gate node of the first double-gate transistor.

15. The pixel driving circuit of claim 1, wherein the first initialization module is a second double-gate transistor; and the pixel driving circuit further comprises: a fourth holding module configured to hold a potential of a double-gate node of the second double-gate transistor.

16. The pixel driving circuit of claim 1, further comprising: a coupling module configured to adjust a potential of the control terminal of the driving module, wherein a first terminal of the coupling module is electrically connected to the control terminal of the driving module, and a second terminal of the coupling module is electrically connected to a control terminal of the threshold compensation module.

17. The pixel driving circuit of claim 1, wherein the first blocking module comprises a first sub-transistor in a double-gate transistor, and the threshold compensation module comprises a second sub-transistor in the double-gate transistor.

18. The pixel driving circuit of claim 1, wherein at least one of the threshold compensation module, the first initialization module or the first blocking module comprises a double-gate transistor.

19. A pixel driving circuit, comprising:

a driving module configured to generate a drive current;

a light-emitting module configured to emit light in response to the drive current;

a data write module configured to write a voltage corresponding to a data signal to a control terminal of the driving module in a charging stage;

a threshold compensation module configured to compensate for a threshold voltage of the driving module in the charging stage, wherein a first terminal of the threshold compensation module is connected to the control terminal of the driving module;

a storage module configured to maintain a potential of the control terminal of the driving module;

a first initialization module configured to initialize the control terminal of the driving module in an initialization stage, wherein the first initialization module is connected to an initialization signal input terminal; and a first holding module configured to hold a potential of an anti-leakage node, a second holding module configured to hold a potential of the first terminal of the driving module, wherein a first terminal of the second holding module is electrically connected to the first terminal of the driving module, and a second terminal of the second holding module is connected to a fixed signal; and wherein the threshold compensation module is a double-gate transistor, the anti-leakage node is a double-gate node of the threshold compensation module, and the first initialization module is electrically connected to a second terminal of the threshold compensation module.

20. The pixel driving circuit of claim 19, further comprising: a first blocking module configured to block a conduction path between the anti-leakage node and the light-emitting module in a light-emitting stage, wherein the first blocking module is electrically connected to the second terminal of the threshold compensation module, wherein a first terminal of the first initialization module is electrically connected to the initialization signal input terminal, a control terminal of the first initialization module is electrically connected to a first scan signal input terminal of the pixel driving circuit, and a second terminal of the first initialization module is electrically connected to the second terminal of the threshold compensation module;

a first terminal of the data write module is electrically connected to a data signal input terminal of the pixel driving circuit, a second terminal of the data write module is electrically connected to a first terminal of the driving module, and a control terminal of the data write module is electrically connected to a second scan signal input terminal of the pixel driving circuit;

a first terminal of the storage module is electrically connected to a first power-supply signal input terminal of the pixel driving circuit, and a second terminal of the storage module is electrically connected to the control terminal of the driving module;

the pixel driving circuit further comprising: a first light-emitting control module and a second light-emitting control module, wherein a first terminal of the first light-emitting control module is electrically connected to the first power-supply signal input terminal, a second terminal of the first light-emitting control module is electrically connected to the first terminal of the driving module, and a control terminal of the first light-emitting control module is electrically connected to an enable signal input terminal of the pixel driving circuit; a first terminal of the second light-emitting control module is electrically connected to a second terminal of the driving module, a second terminal of the second light-emitting control module is electrically connected to a first terminal of the light-emitting module, and a control terminal of the second light-emitting control module is electrically connected to the enable signal input terminal; and a second terminal of the light-emitting module is electrically connected to a second power-supply signal input terminal of the pixel driving circuit;

a first terminal of the first holding module is electrically connected to the initialization signal input terminal or the first power-supply signal input terminal, and a second terminal of the first holding module is electrically connected to the anti-leakage node;

the first terminal of the threshold compensation module is electrically connected to the control terminal of the driving module, and a control terminal of the threshold compensation module is electrically connected to a long scan signal input terminal of the pixel driving circuit; and a first terminal of the first blocking module is electrically connected to the second terminal of the threshold compensation module, a second terminal of the first blocking module is electrically connected to the second terminal of the driving module, a control terminal of the first blocking module is electrically connected to the long scan signal input terminal.

* * * * *